(12) United States Patent
Gabara

(10) Patent No.: US 9,319,665 B2
(45) Date of Patent: Apr. 19, 2016

(54) METHOD AND APPARATUS FOR A SELF-FOCUSING CAMERA AND EYEGLASS SYSTEM

(71) Applicant: Thaddeus Gabara, Murray Hill, NJ (US)

(72) Inventor: Thaddeus John Gabara, Murray Hill, NJ (US)

(73) Assignee: TrackThings LLC, Murray Hill, NJ (US)

( * ) Notice: Subject to any disclaimer, the term of this patent is extended or adjusted under 35 U.S.C. 154(b) by 386 days.

(21) Appl. No.: 13/922,171

(22) Filed: Jun. 19, 2013

(65) Prior Publication Data

US 2014/0375788 A1 Dec. 25, 2014

(51) Int. Cl.
*H04N 13/04* (2006.01)
*H04N 9/47* (2006.01)
*G06F 3/01* (2006.01)

(52) U.S. Cl.
CPC ............ *H04N 13/0484* (2013.01); *G06F 3/013* (2013.01)

(58) Field of Classification Search
None
See application file for complete search history.

(56) References Cited

U.S. PATENT DOCUMENTS

| 7,723,662 | B2 * | 5/2010 | Levoy | G02B 21/365 250/208.1 |
| 7,986,465 | B1 * | 7/2011 | Lo | G02B 3/14 359/665 |
| 8,300,025 | B2 | 10/2012 | Katayama | |
| 8,400,555 | B1 * | 3/2013 | Georgiev | H04N 5/23212 348/222.1 |
| 2006/0028400 | A1 * | 2/2006 | Lapstun | G02B 26/06 345/8 |
| 2008/0131019 | A1 | 6/2008 | Ng | |
| 2008/0142685 | A1 * | 6/2008 | Gazeley | H01L 27/14621 250/208.1 |
| 2009/0127440 | A1 * | 5/2009 | Nakai | G02B 3/0012 250/227.2 |
| 2009/0183125 | A1 | 7/2009 | Magal et al. | |
| 2010/0102941 | A1 | 4/2010 | Richter et al. | |
| 2010/0110027 | A1 | 5/2010 | Lipman et al. | |
| 2010/0226535 | A1 * | 9/2010 | Kimchi | G06F 3/013 382/103 |
| 2012/0001845 | A1 | 1/2012 | Lee | |
| 2012/0075168 | A1 | 3/2012 | Osterhout et al. | |
| 2012/0140038 | A1 * | 6/2012 | Bi | H04N 13/0022 348/46 |
| 2012/0147328 | A1 * | 6/2012 | Yahav | A61B 3/113 351/210 |
| 2012/0170038 | A1 * | 7/2012 | Bourgois | G01B 11/2441 356/400 |

(Continued)

OTHER PUBLICATIONS

Light-field Camera Wikipedia, http://en.wikipedia.org/wiki/Light-field_camera.

(Continued)

*Primary Examiner* — Joseph Ustaris
*Assistant Examiner* — Talha M Nawaz
(74) *Attorney, Agent, or Firm* — Thaddeus Gabara; Tyrean Patent Prosecution Law Firm

(57) ABSTRACT

An involuntary action adjusted by the accommodation of the crystalline lens of the eye provides the data to the embedded algorithm to get the new image. Instead of the user performing a voluntary action to control the embedded algorithm, an involuntary action by the user is used to control the embedded algorithm allowing the user to automatically adjust the Plane of Depth (POD) for a Light Field Photograph (LFP) image or an eyeglass image. The adjustment of eyeglass image is used by an accommodation system to control the mechanical system of lenses in an eyeglass to automatically focus the glasses over a range of PODs. In addition, a voluntary far/near button can be used manually to adjust the POD for both the LFP image and the eyeglass adjustment. The variation of the crystalline thickness to adjust the focus of nearby and distant objects is called accommodation.

21 Claims, 30 Drawing Sheets

(56) References Cited

U.S. PATENT DOCUMENTS

| | | | |
|---|---|---|---|
| 2013/0009853 A1 | 1/2013 | Hesselink et al. | |
| 2013/0044042 A1 | 2/2013 | Olsson et al. | |
| 2013/0107024 A1 | 5/2013 | Akeley | |
| 2013/0286163 A1* | 10/2013 | Dror | H04N 13/0429 348/47 |
| 2013/0342441 A1 | 12/2013 | Murase et al. | |
| 2014/0002794 A1* | 1/2014 | Hogan | A61B 3/0025 351/206 |
| 2014/0146148 A1* | 5/2014 | Maciocci | G06F 3/013 348/59 |
| 2014/0246917 A1* | 9/2014 | Proud | H02J 17/00 307/104 |

OTHER PUBLICATIONS

"Scale Model of Eye" http://hyperphysics.phy-astr.gsu.edu/hbase/vision/eyescal.html#c3.

p. 8, "Single Lens Stereo with a Plenoptic Camera" by Edward H. Adelson and John Y.A. Wang, IEEE Transactions on Pattern Analysis and Machine Intelligence, vol. 14, No. 2, Feb. 1992, pp. 99-106.

p. 16, "Light Field Photography with a Hand-held Plenoptic Camera" by Ren Ng Marc Levoy Mathieu Bredif Gene Duval Mark Horowitz and Pat Hanrahan, (http://graphics.stanford.edu/papers/lfcamera/). Stanford University Computer Science Tech Report CSTR 2005-02, Apr. 2005.

p. 27, Light-field Camera Wikipedia, http://en.wikipedia.org/wiki/Light-field_camera.

p. 31, "Lens Thickness with Age and Accommodation by Optical Coherence Tomography" by Kathryn Richdale, Mark A. Bullimore, and Karla Zadnik, Ophthalmic Physiol Opt. Sep. 2008 ; 28(5): 441-447.

p. 44, "Pelican Imaging's 16-lens array camera coming to smartphones next year" by Sharif Sakr posted May 2, 2013 at 11:30 AM., http://www.engadget.com/2013/05/02/pelican-imaging-array-camera-coming-2014/.

p. 47, "2-picosecond, GaAs photodiode optoelectronic circuit for optical correlation applications", by K. D. Li,a) A. S. Hou, E. ozbay, B. A. Auld, and D. M. Bloom, pp. 3104-3106 Appl. Phys. Lett., vol. 61, No. 26, Dec. 28, 1992.

p. 50, "Scale Model of Eye" http://hyperphysics.phy-astr.gsu.edu/hbase/vision/eyescal.html#c3.

"Single Lens Stereo with a Plenoptic Camera" by Edward H. Adelson and John Y.A. Wang, IEEE Transactions on pattern analysis and machine intelligence, vol. 14, No. 2, Feb. 1992; pp. 99-106.

"Light Field Photography with a Hand-held Plenoptic Camera" by Ren Ng, Marc Levoy, Mathieu Bredif, Gene Duval, Mark Horowitz and Pat Hanrahan, (http://graphics.stanford.edu/papers/lfcamera/). Stanford University Computer Science Tech Report CSTR 2005-02, Apr. 2005.

Light-field Camera Wikipedia; http://en.wikipedia.org/wiki/Light-field_camera.

"Lens Thickness with Age and Accommodation by Optical Coherence Tomography" by Kathryn Richdale, Mark A. Bullimore, and Karla Zadnik. Ophthalmic Physiol Opt. Sep. 2008 : 28(5): 441-447.

"Pelican Imaging's 16-lens array camera coming to smartphones next year" by Sharif Sakr posted May 2, 2013 at 11:30 AM., http://www.engadget.com/2013/05/02/pelican-imaging-array-camera-coming-2014.

"2-picosecond, GaAs photodiode optoelectronic circuit for optical correlation applications", by K. D. Li, A. S. Hou, E. Ozbay, B. A. Auld, and D. M. Bloom, pp. 3104-3106 Appl. Phys. Lett., vol. 61, No. 26, Dec. 28, 1992.

\* cited by examiner

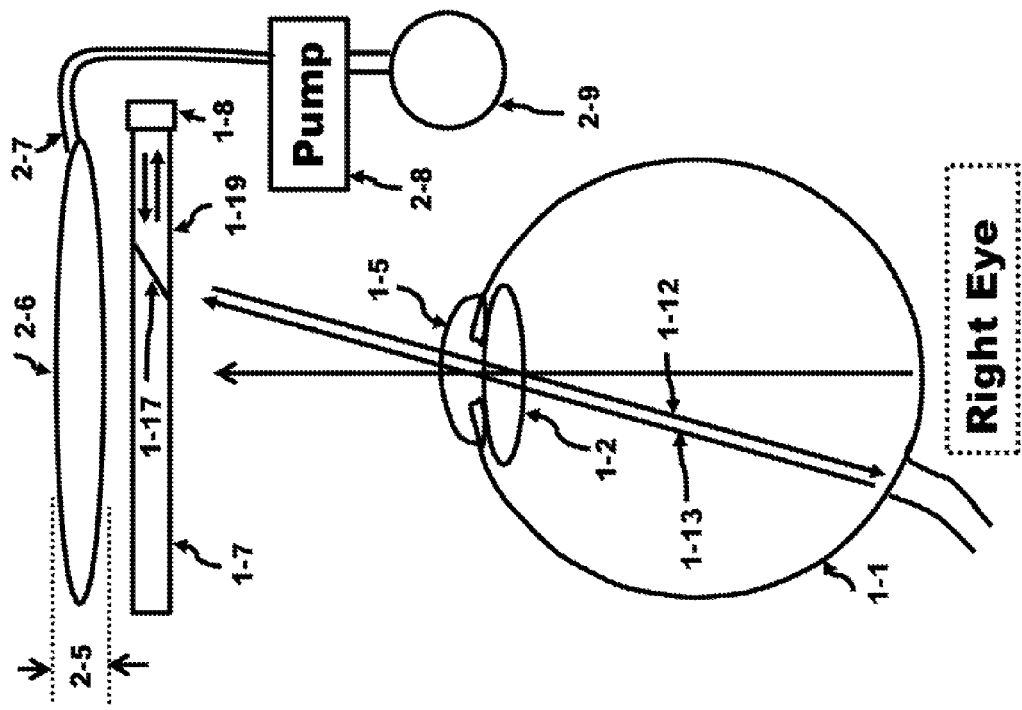
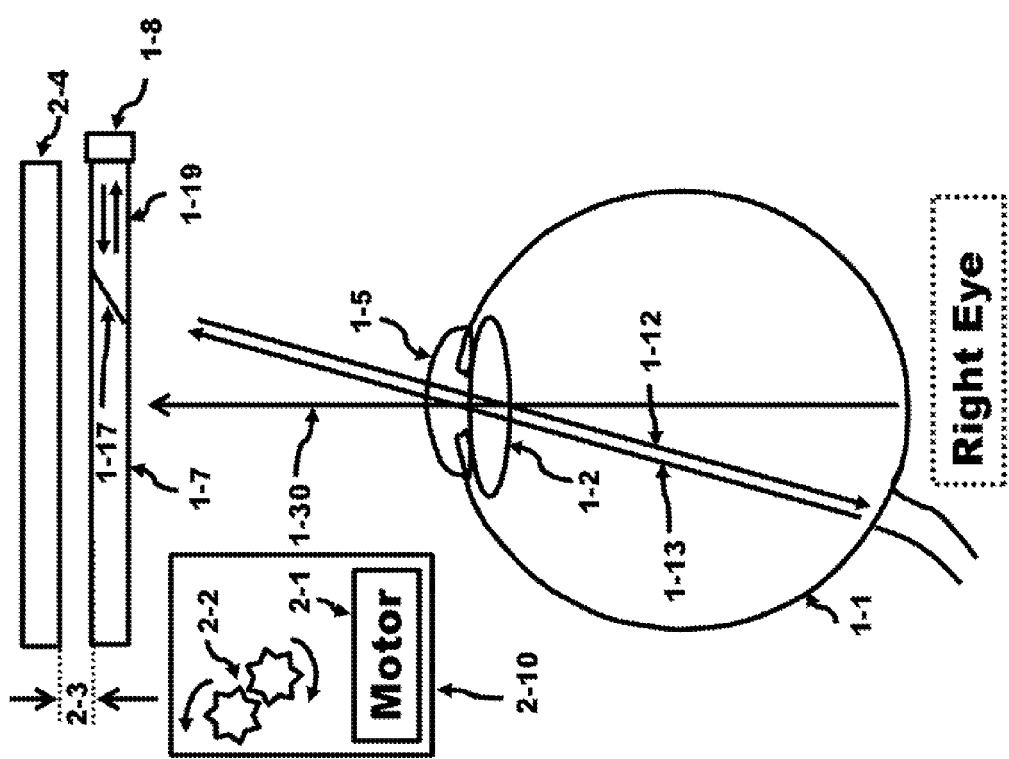
FIG. 2A
FIG. 2B

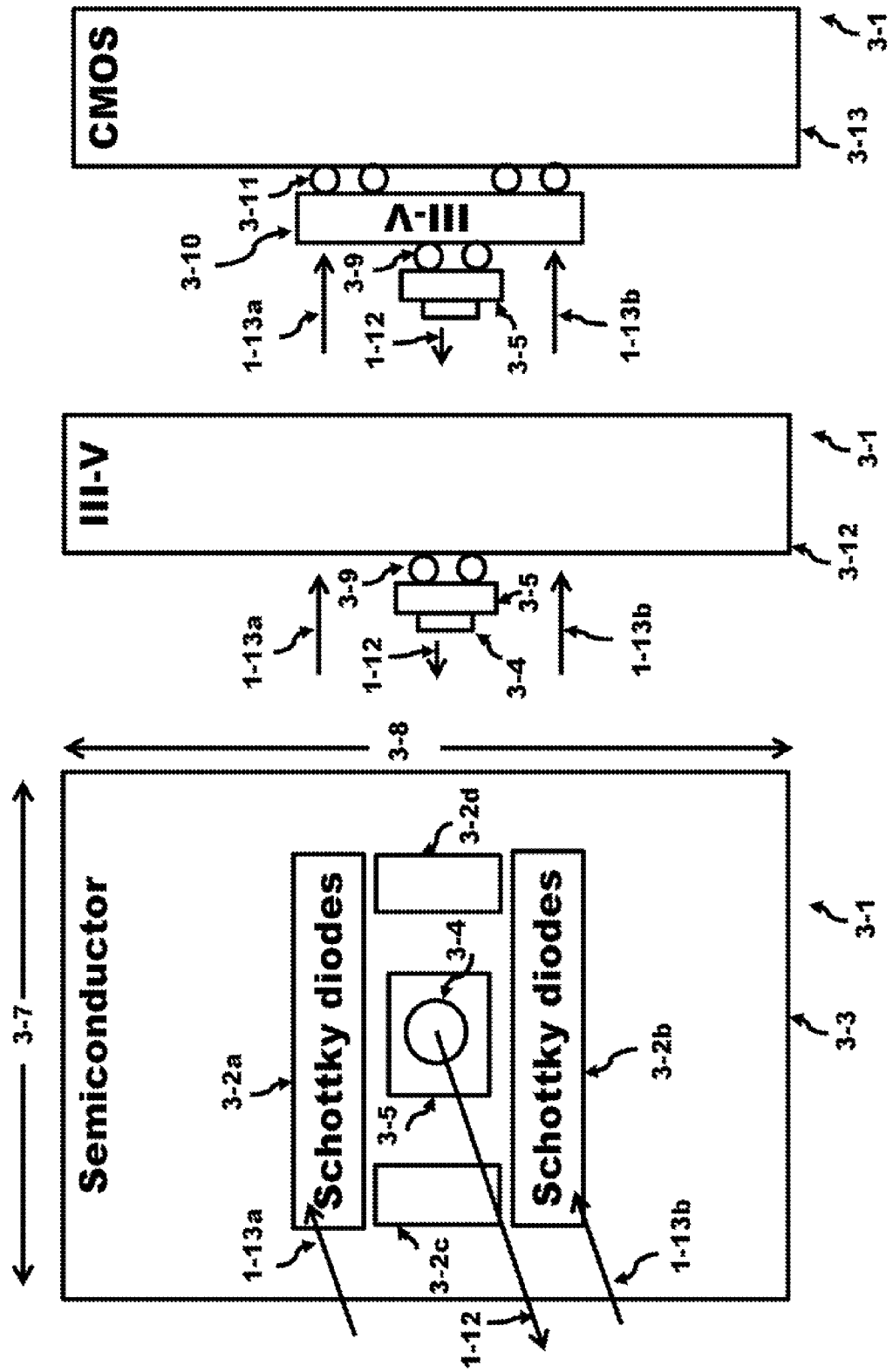

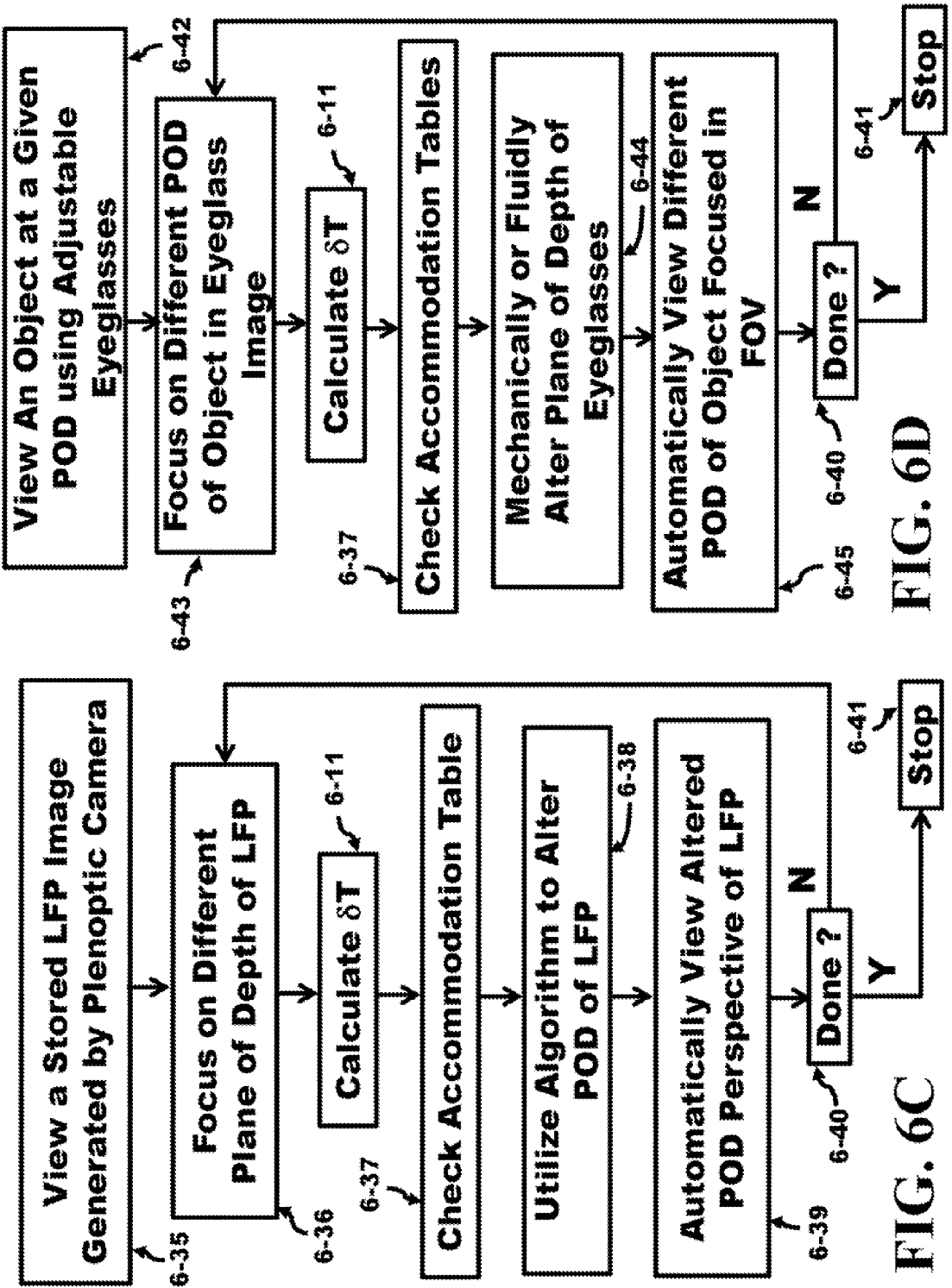

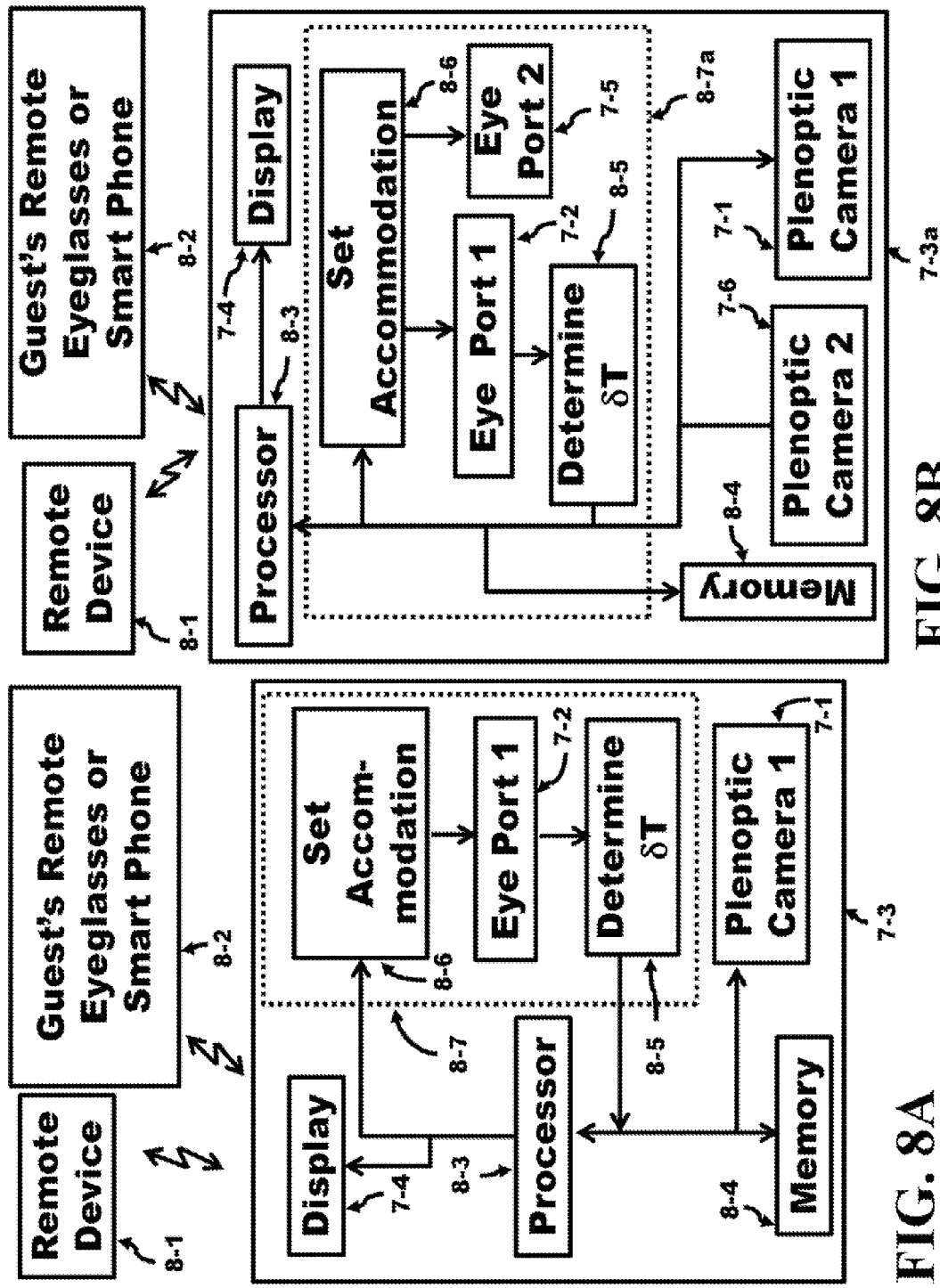

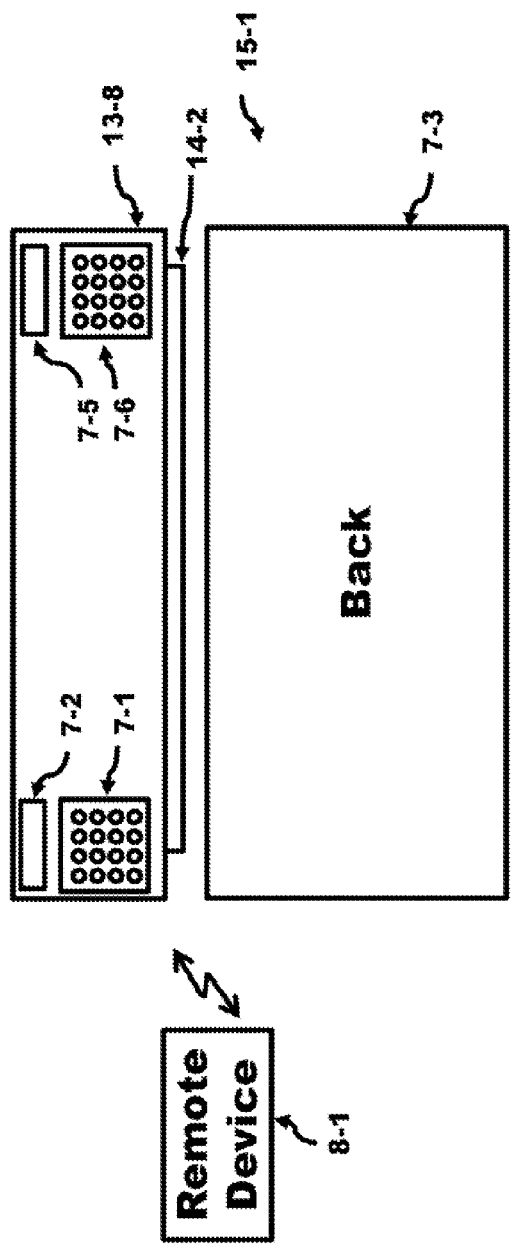
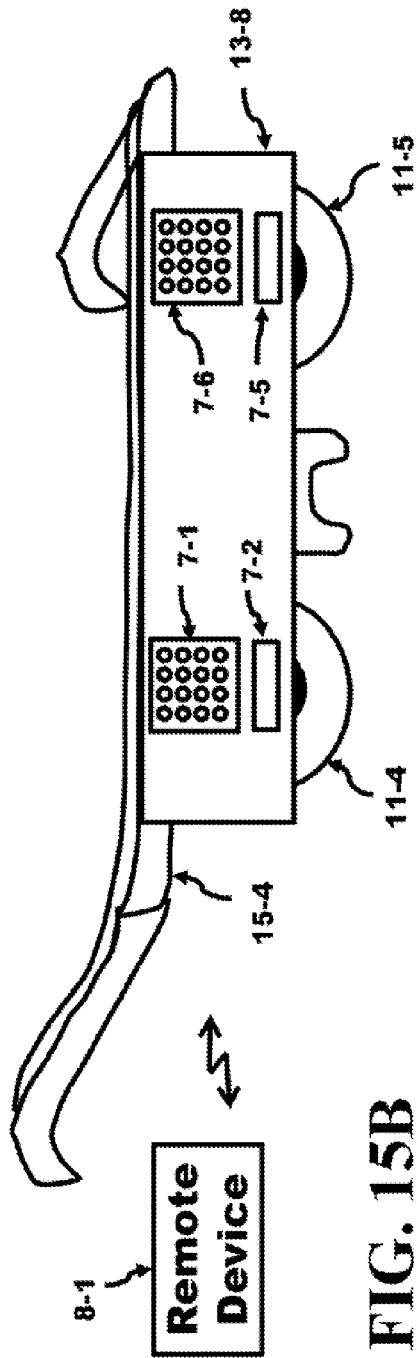
FIG. 15A
FIG. 15B

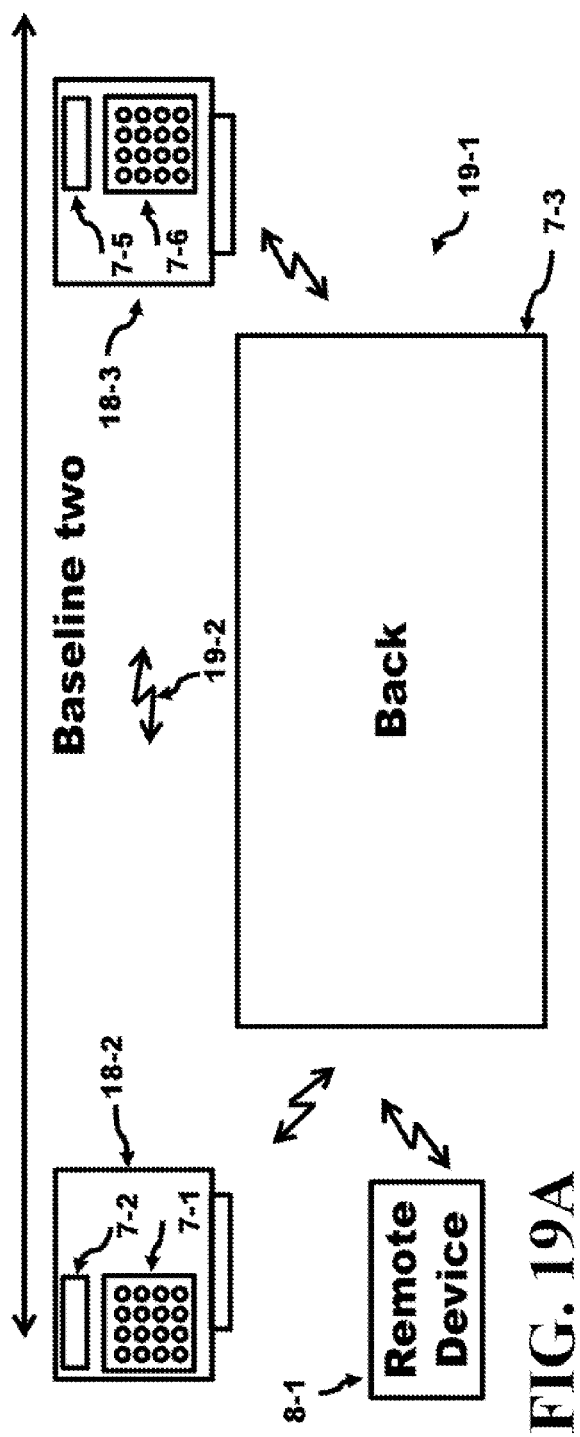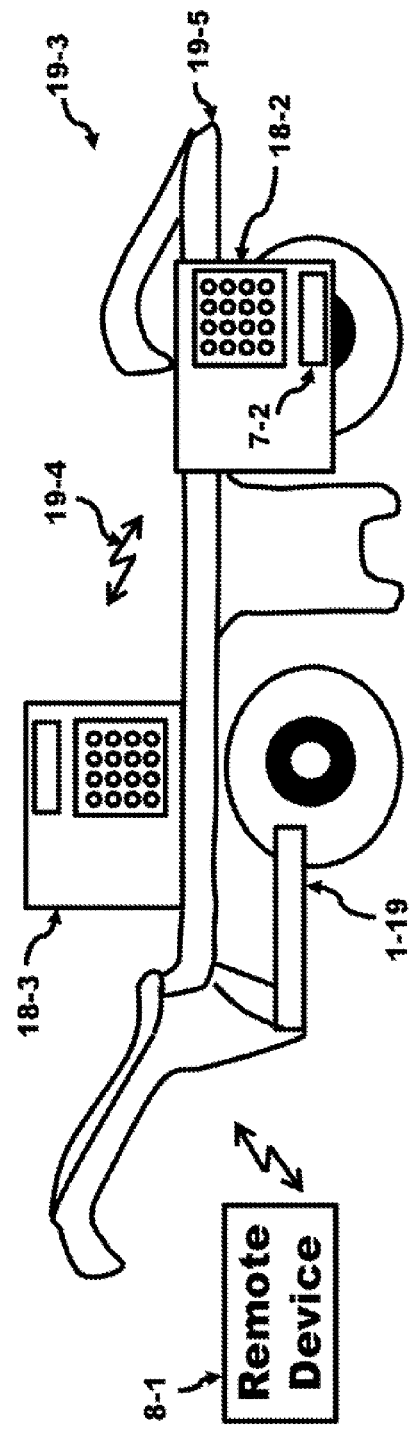

METHOD AND APPARATUS FOR A SELF-FOCUSING CAMERA AND EYEGLASS SYSTEM

BACKGROUND OF THE INVENTION

Portable wireless units (cellphones, smartphones, etc.) are offering the user with easy access to others users via multimedia, text, voice, images or videos. Similarly, the wireless systems interconnect to the Internet to store these components on a server. The camera on these wireless systems have been employed to store and/or send multimedia, photos and video for postings on the web, sharing with other users, or for personal perusal for a later date.

The camera typically shows an image that is focused at a particular depth. The other Plane of Depths (POD) in the Field of View (FOV) are out of focus. This photograph has been the mainstream of images and forms the basis of videos where one image after another is shown in sequence to present a moving image to the viewer or user. The focus of depth set by the photographer or movie producer and the user basically has no input to seeing the image or video at another POD.

Some smart phones provide a camera that captures still pictures or video (movies). Some wireless phones offer only one camera per wireless system typically located on the opposite side of the display screen. A camera can be as simple as a pinhole and image sensor or the pinhole can be replaced with a main lens. However, as the cost of the camera has been decreasing, a second camera has been placed on the same side as the display screen. These two cameras are typically on the reverse sides of the smart phone where the user can switch between the capture of images or video on either side of the smart phone.

Plenoptic cameras offer an ability to take a picture of a setting and refocus the image of the setting to a different POD using the original Light Field Photograph (LFP) image. A plenoptic camera comprises of a microlens array and at least one image sensor array. Each microlens captures all the light in its field of view (FOV) that arrives along the rays entering that particular microlens. The microlenses is placed in an array of 4×4, 6×6, 20×20, etc. Since each microlens is displaced from another in the array, each microlens captures all the light of a slightly different FOV or different viewpoint. Thus, the light striking one region of the microlenses array is different than the light striking another region of the microlenses array. The light information captured by the image sensor array due to a plurality of microlenses can be stored in memory. A computer algorithm can be developed to manipulate the light information retrieved from memory to generate how the image would appear when viewed from a different viewpoint. These different viewpoints can provide images having different POD while still using the original LFP image. The microlenses can be located between a main lens and the image sensor array. Several known software tools based on the computer algorithm, hereinafter called "embedded algorithm", can be manipulated to alter the POD of the LFP image dynamically without the need to take another LFP image.

The image taken by the plenoptic camera contains all the information for different PODs to be displayed by using the embedded algorithm. Currently, the embedded algorithm provides a slider bar on a display screen for the user to vary the slider to see the different PODs. Instead of using a slider bar, the user may need to enter data to alter the image. In either case, the user must perform a voluntary action in conjunction with the embedded algorithm to get the new image.

BRIEF SUMMARY OF THE INVENTION

Smart phones usually have at least one camera. The inventive technique is to place at least one plenoptic camera on the smart phone and use the algorithm to adjust (embedded algorithm-adjusted) an LFP image to a different POD. The image taken by the plenoptic camera contains all the information for different PODs to be displayed. This embedded algorithm manipulates the original LFP image via a user to alter the POD. The computer algorithm is embedded in the electronics system 20-12 illustrated in FIG. 20.

One of the inventive embodiments of this invention is for the user to use what is typically an involuntary action, the accommodation of the crystalline lens of the eye, to provide the data to the embedded algorithm to get the new image. Thus, instead of the user performing a voluntary action to control the embedded algorithm, an involuntary action by the user is used to control the embedded algorithm. This allows the user to automatically adjust the POD of an LFP image. This embedded algorithm is controlled by measuring the crystalline len's thickness of the user as the user attempts to focus on a different POD. The crystalline lens thickness variation, $\delta T$, can be used to determine whether to focus nearer or further. If the thickness decreases then the crystalline lens is decreasing in thickness; therefore, the user is focusing at a further object. If the thickness increases then the crystalline lens is increasing in thickness, therefore, the user is focusing at a nearer object. The variation of the crystalline thickness to adjust the focus of nearby and distant objects is called accommodation.

Another preferred embodiment of the invention is to use the crystalline lens thickness variation, $\delta T$, to automatically adjust the focus of adjustable focus eyeglasses. As the accommodation is measured, the variation of the crystalline thickness is used to automatically adjust the focus of the eyeglasses by providing data input to a μController which in turn automatically controls a mechanical device to adjust the focus of the eyeglasses. When the user adjusts their focus on nearer objects, the eyeglasses follow suit and adjust the lenses of the eyeglasses to focus on the nearer object accordingly. When the user adjusts their focus on farther objects, the eyeglasses follow suit and adjust the lenses of the eyeglasses to focus on the farther object accordingly.

Another preferred embodiment of the invention is an accommodation test system which measures the accommodation from a POD focused at infinity to a POD focused at the minimum distance. The test LFP image presented to the user has PODs at known depths ($\infty$, 100 m, 64 m, 32 m, 16 m, 8 m, 4 m, 2 m, 1 m, 0.75 m, 0.5 m, 0.25 m, etc.), for example. For each measurement, the T is measured, the $\delta T$ can be calculated, while the POD is read from the stimulus. The results are stored in a memory array and used to generate an accommodation table. This accommodation table can be used by the user as a reference model when the user focuses on different PODs of various LFP images. The values in the table can be interpolated.

Short distance (width of the microlenses array) 3-D images or videos occur with a single plenoptic camera. The imaging capabilities of this camera allow a single image to be taken after which the image can be post-processed by the embedded algorithm to recreate an image focused at another Plane of Depth (POD). The image is not retaken; instead, the original image contains the information to be focused at various Planes of Depth (POD). This image is called a short range 3-D image since the image comprises 3-D information based on the width or distance between the furthest camera microlens within the single plenoptic camera.

Long distance 3-D images or videos occur with at least two plenoptic cameras. The imaging capabilities of these cameras which each generate a single image allow these images to be post-processed by the embedded algorithm to recreate two final images focused at any desired POD. The two images are not retaken instead the original two images contains all the information so that the embedded algorithm can be used to focused the original images to similar planes of depth. These images are called a long range 3-D image since the images comprise 3-D information based on the distance between the two plenoptic cameras within the system.

A preferred embodiment of the invention is the apparatus comprising image sensors placed on the same side of a smart phone offering the capture of a long range 3-D picture or video. The image sensors in the camera can be manufactured in CMOS or CCD. These sensors comprise two plenoptic cameras placed on the same side where the embedded algorithm can be used to re-focus the captured long range 3-D image or long range 3-D video of different objects at various depth parallel planes. These cameras can be placed apart from one another as far as possible increasing the baseline. For the case of two plenoptic cameras, the displacement distance of the plenoptic cameras is equal to the average distance of between a user's eyes.

Another preferred embodiment of the invention is the apparatus comprising more than two cameras or plenoptic cameras placed on the same side to provide several different prospectives of a long range 3-D view from different angles. These cameras can be placed apart from one another as far as possible increasing the baseline. The long range 3-D view can be selected from the image captured by two or more of the plenoptic cameras.

Another preferred embodiment of the invention is the apparatus comprising the two plenoptic cameras includes at least two visual eye ports the user can view to see a playback of the recorded image or video. The image or video is a long range 3-D image or video since there is more than one plenoptic camera, each separated by baseline distances larger than the radius of each plenoptic camera. The image reconstruction apparatus can be formed from an LCD display with backlight illumination, an LED display with the three primary colors, laser scanning on the cornea, etc. and can be housed in the apparatus. The image reconstruction apparatus is located within the eye ports allowing the user to view a long range 3-D image or a video generated by the long range 3-D system of the camera or video ported to the smart phone via an external source. The smart phone with the long range 3-D camera system can be used to film videos or stills and the LCD display can be used to view the long range 3-D image or video results.

Another preferred embodiment of the invention is the apparatus comprising at least one plenoptic camera which is used to capture the short range 3-D image or video, the playback of the user using the LCDs or other image presentation apparatus (LEDs, backlit LCD, etc.) can measure the thickness of the user's optic lens in the eye. The thickness measurement can be used to calculate the accommodation the eye would have experienced. The accommodation data can automatically adjust the playback of the short range 3-D image or video to focus where the user is currently concentrating. This can be done to a short range 3-D image generated by a single plenoptic camera. The playback device senses the characteristics of the user's eyes and adjusts the short range 3-D image or video to the correct depth plane. The thickness of the user's crystalline lens measurement can be performed on the crystalline lens of one eye and shared with the other eye (assuming both eyes have the same depth characteristics) or can be performed on the crystalline lens of both right and left eye (specially tailored for each eye).

Another preferred embodiment of the invention is the apparatus comprising the camera that sends the long or short range 3-D signal to a pair of glasses with at least one projection system for each eyeglass lens. The camera captures the long or short range 3-D image and transmits the data to the glasses for the user to see the long or short range 3-D image.

Another preferred embodiment of the invention is the apparatus comprising at least one of the plenoptic cameras which can be displaced from the smart phone system and placed at a distance in order that the baseline distance between two plenoptic cameras is increased. The separate camera units can automatically determine the distance from the main camera by portable wireless techniques (RF, infrared, electromagnetic radiation with a carrier signal, etc.). A gyro and accelerometer placed within the displaced camera and the smart phone can be used to determine the relative position to one another. This information can be used to improve the quality of the reconstructed long range 3-D image or video.

Another preferred embodiment of the invention is the apparatus comprising the separable plenoptic cameras attached to either the smart phone or to the eyeglasses. Separable units comprising plenoptic cameras and eye ports can be attached to either the smart phone or to the eyeglasses by a mating surface. These separable units can be wireless coupled to a remote device, to a remote display, to other separable plenoptic cameras, or to other eyeglasses. The separable units can be mated to an eyeglass and positioned over the eye or eyes of the user. In addition, these separable cameras can be electrically wired through the mating device. The cameras can be placed at various distances apart from another offers greater flexibility in analyzing the depth of images. These images from these cameras are shared within the system. The smart phone can be in wireless contact with a remote system comprising another server, the Internet, another smart phone, another camera system, or the camera mounted on the eyeglass Another preferred embodiment of the invention is the apparatus comprising the camera and the attachable unit where each can each have their own power supply. When the attachable units are connected together a single port can be used to charge both power supplies. Although, the attachable unit can be charged independently from the camera when not in physical contact with the camera.

Another preferred embodiment of the invention is the apparatus and process for sharing long and short distance 3-D images between users. The first user takes an LFP image or video of an object using a plenoptic camera. The first user can focus the original LFP image using the crystalline lens measuring unit to any POD automatically or manually adjust the focus using a far/near button. In addition, the first user can send the LFP image to a second user. The second users can perform a process to align their accommodation information versus the function of the POD. Then, the second user can view the LFP image and their crystalline lens measuring unit can determine the POD being viewed setting the accommodation value or do so manually using the far/near button The accommodation value is sent to the first user who translates the second user's accommodation value into their accommodation value and observes the final image being perceived by the second user.

Another preferred embodiment of the invention is the apparatus that uses a delay line to match the round trip transit from the electromagnetic radiation source (LED) through the eye, bounce off the cornea, and return back to the source. This delay line can be matched to the user so that the timing of the sub-p sec window can be determined in an A-D (Analog to Digital) converter. The extracted data is correlated to the crystalline lens thickness and corresponding the accommodation of the eye. This information can then be used to auto-focus an adjustable mechanical eyeglass system or be used to automatically focus an LFP image to a different POD.

Another preferred embodiment is an accommodation test apparatus comprising: a source configured to emit an electromagnetic radiation; a crystalline lens of an eye propagates the radiation emitted from the source; a retina of the eye reflects the radiation in a direction of the crystalline lens; the crystalline lens propagates the reflected radiation from the retina; a detector configured to detect the reflected radiation; a plurality of Plane of Depths (PODs) in an Light Field Photograph (LFP) image; and a time difference in propagation delay is measured between the lens focused on a plane focused at a first POD and the lens attempting to focus on a second unfocused plane selected from the remaining plurality of PODs, further comprising: a laser to generate the electromagnetic radiation, further comprising: at least one Schottky diode to detect the reflected radiation. The apparatus, further comprising: a Light Field Photograph (LFP) image presents the focused plane at the first POD and a plurality of unfocused planes from the remaining plurality of PODs, further comprising: an embedded algorithm applies the time difference in propagation delay to an image processing system to focus the LFP image from the focused plane at the first POD to the second unfocused plane of the LFP image selected from the remaining plurality of PODs. The apparatus, further comprising: an eyeglass image generated by an eyeglass presents the focused plane at the first POD and the second unfocused plane selected from the remaining plurality of PODs, further comprising: an embedded algorithm applies the time difference in propagation delay to a mechanical system to bring the second unfocused plane of the eyeglass image into focus.

Another preferred embodiment is a time difference apparatus comprising: a plurality of Plane of Depths (PODs) in a Light Field Photograph (LFP) image; a first thickness of a crystalline lens of an eye focused on a first plane at a first POD; an electromagnetic radiation propagates through the first thickness in a first measured delay time; wherein the crystalline lens of the eye varies to a second thickness when attempting to focus on a second unfocused plane selected from the remaining plurality of PODs; the electromagnetic radiation propagates through the second thickness in a second measured delay time; and the time difference in propagation delay between the first measured delay time and the second measured delay time indicates a POD variation, further comprising: a laser to generate the electromagnetic radiation, further comprising: at least one Schottky diode to detect the time difference in propagation delay between the first measured delay time and the second measured delay time, further comprising: the LFP image presents the focused plane at the first POD and a plurality of unfocused planes from the remaining plurality of PODs, further comprising: an embedded algorithm applies the measured time difference to an image processing system to focus the LFP image of the second unfocused plane into focus by compensating for the POD variation. The apparatus, further comprising: an eyeglass image generated by an eyeglass presents the focused plane at the first POD and the second unfocused planes at the second POD, further comprising: an embedded algorithm applies the POD variation to a mechanical system to bring the second unfocused plane at of the eyeglass image into focus.

Another preferred embodiment is a method of using an accommodation system comprising the steps of: generating a Light Field Photograph (LFP) image with a Plane of Depth (POD) at infinity; presenting the LFP image to a user; measuring a first time with the accommodation test system; storing the first time in a memory; attempting to focus on a different POD in the LFP image; measuring a second time with the accommodation test system; calculating a time difference in propagation delay between the second time and the first time and interpolating for the different POD from an accommodation table; using an embedded algorithm to adjust the presented LFP image to focus on the different POD; and viewing the embedded algorithm-adjusted LFP image with the different POD, further comprising the steps of: waiting a time period before presenting the LFP image to the user, further comprising the steps of: providing at least one plenoptic camera to generate the Light Field Photograph (LFP) image, wherein the accommodation table stores each of the values of T, δT, and POD, further comprising the steps of: issuing a strobe to a source and detector unit, further comprising the steps of: coupling the embedded algorithm to an image processing system.

BRIEF DESCRIPTION OF THE DRAWINGS

Please note that the drawings shown in this specification may not necessarily be drawn to scale and the relative dimensions of various elements in the diagrams are depicted schematically. The inventions presented here may be embodied in many different forms and should not be construed as limited to the embodiments set forth herein. Rather, these embodiments are provided so that this disclosure will be thorough and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 2A depicts characteristics of a human eye with a probing beam used to measure the thickness of the crystalline lens and a mechanical eyeglass system that is automatically focused by the measured data using this inventive technique.

FIG. 2B shows the characteristics of a human eye with a probing beam used to measure the thickness of the crystalline lens and a fluid altering lens system that is automatically focused by the measured data using this inventive technique.

FIG. 3A illustrates a high speed microchip using Schottky diodes and a laser to measure the accommodation of the eye using this inventive technique.

FIG. 3B depicts a cross-sectional view of the FIG. 3A with the laser solder bumped on the III-V die using this inventive technique.

FIG. 3C illustrates a cross-sectional view of the FIG. 3A with the laser solder bumped on a III-V substrate which is solder bumped to the CMOS die using this inventive technique.

FIG. 6C depicts a flowchart to automatically adjust the accommodation of a light field photo in accordance with this inventive technique.

FIG. 6D illustrates a flowchart to automatically adjust the focusing of mechanically or fluidly based eyeglasses illustrating this inventive technique.

FIG. 8A illustrates an example eye port system configured to receive, transmit and display images or videos using one plenoptic camera in accordance with this inventive technique.

FIG. 8B depicts a two eye port system configured to receive, transmit and display images or videos using two plenoptic cameras in accordance with the inventive technique.

FIG. 15A illustrates the back of a smart phone and an attachable unit comprising two plenoptic cameras and two eye ports segregated in accordance with this inventive technique.

FIG. 15B shows the attachable unit comprising two plenoptic cameras and two eye ports coupled to eyeglasses in accordance with this inventive technique.

FIG. 19A shows the back of a smart phone and two attachable units each comprising a plenoptic camera and an eye port, both segregated from the wireless unit by a distance and wirelessly connected to the wireless unit in accordance with this inventive technique.

FIG. 19B shows the two attachable units each comprising a plenoptic camera and an eye ports coupled to glasses in accordance with this inventive technique.

DETAILED DESCRIPTION OF THE INVENTION

Figure 1B:
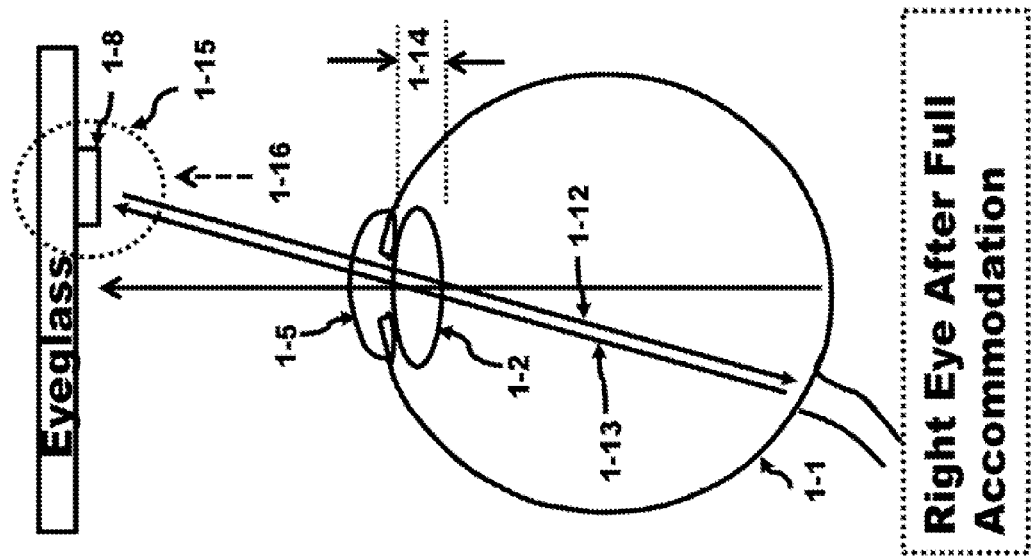
FIG. 1B depicts the characteristics of a human eye with a probing beam used to measure the thickness of the crystalline lens corresponding to an accumulated condition using this inventive technique.
Figure 1A:
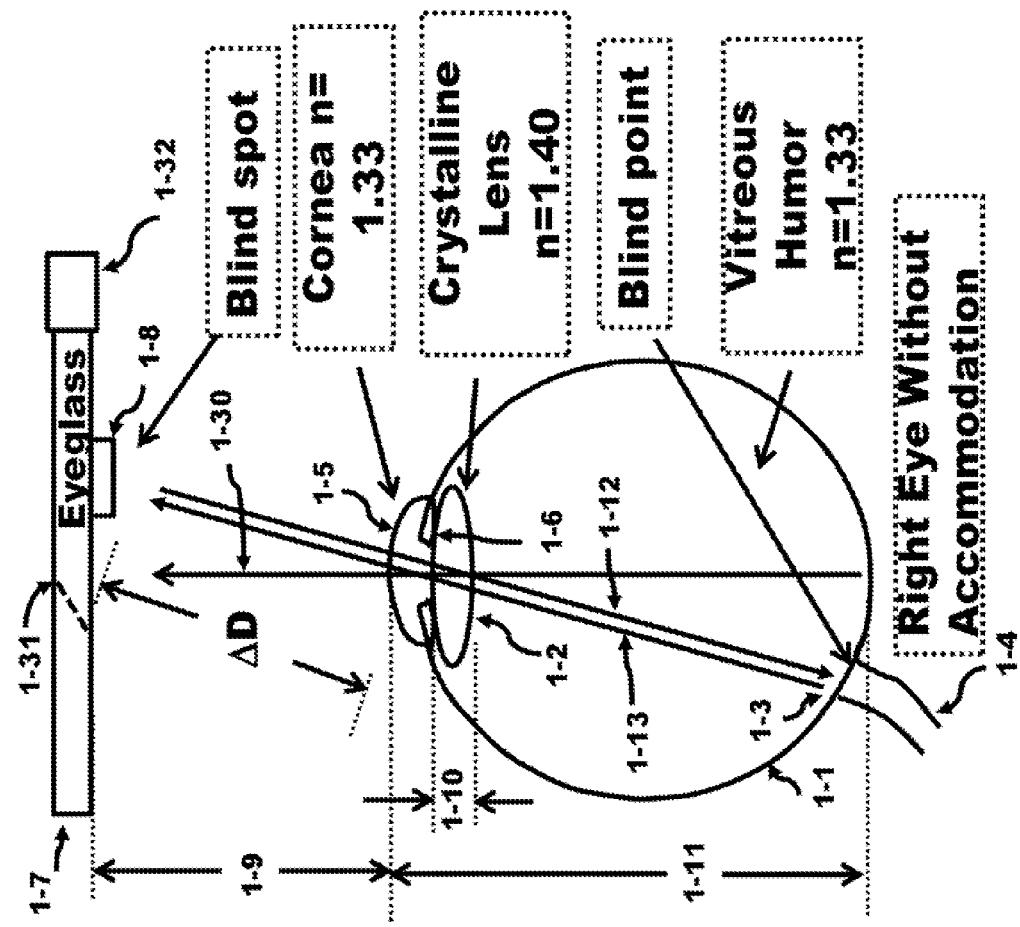
FIG. 1A shows the characteristics of a human eye with a probing beam used to measure the thickness of the crystalline lens corresponding to a non-accumulated condition using this inventive technique.

FIG. 1A presents a pictorial of the right eye, an eyeglass, a source of electromagnetic radiation, a sensor of electromagnetic radiation, and components of the right eye. The eye measuring system 1-33 comprises a source and a detector 1-8 of electromagnetic radiation to measure the total flight path of the electromagnetic radiation propagation. The electromagnetic radiation exits the source propagates in the right eye 1-1 towards the blind point 1-3 and bounces off the blind point. The incident electromagnetic radiation was reflected from the blind point on the back surface of the eye 1-1 offering at least two advantages; 1) the position of the transparent material 1-19 is located at what is known as being in the blind spot of the eye, a physical location outside the eye where the eye cannot sense the object; and 2) the incident radiation reflects off the surface of the blind point 1-3 on the backside of the eye 1-1 and since this blind point 1-3 does not have light gathering rods or cones, the incident radiation is not sensed by the eye. The light rays from the blind spot enter the eye and land on the blind point of the retina. The blind spot occurs because the blind point does not have light detecting photoreceptive cells. As the electromagnetic radiation passes through the right eye, the variation in index of refraction of the crystalline lens 1-2 causes a change in delay as the crystalline lens 1-2 accommodates to various focus planes of depth. The propagation of the electromagnetic radiation leaves the source of the source and detector 1-8 and propagates along the arrow 1-12. The length of propagation in free space is from the source of the source and detector 1-8 the cornea 1-5. Once the radiation passes the cornea which is a first focusing portion of the eye 1-1, the electromagnetic radiation experiences an index of refraction of approximately 1.33 in the cornea 1-5, experiences an index of refraction ($n_{cl}$) of 1.40 propagating through the crystalline lens 1-1, experiences an index of refraction of approximately 1.33 in the vitreous humor before being reflected from the blind point 1-3. At this point, the reflected electromagnetic radiation propagates back towards the source and detector 1-8. The reflected ray 1-13 follows the same path as path 1-12 except in reverse moving through the vitreous humor, through the crystalline lens 1-2, through the cornea 1-5 and a distance $\Delta D$ through free space back to the source and detector 1-8. The distance through the cornea, the crystalline lens 1-2, and the vitreous humor until the ray hits the blind point is approximately 2.4 cm. The crystalline lens has as a minimum thickness 1-10 when focusing at infinity or the lens is without accommodation. The source and detector 1-8 is a high-speed integrated circuit that is able to distinguish differences in time in the sub picosecond range. The source and detector 1-8 is shown mounted on an eyeglass 1-7. Although, the eyeglass has been indicated as rectangular in nature, the lens can be convex, concave, or mixture of both. Simultaneously, the right eye is viewing a projected image on the eyeglass along the optic axis 1-30 of the eye 1-1 which focuses the image on the retina of the eye or a prism 1-31 is inserted in the eyeglass 1-7. Another possibility allows an image stimulus to be provided in the LED or LCD source 1-32 that propagates in the eyeglass and reflects off the prism 1-31 and focuses on the surface of the retina of the eye, collected by photoreceptors, and is sent to the brain by the optic nerve 1-4. The first distance 1-11 through the eye along the optic axis 1-30 the second distance 1-9 through free space after summation is also about 2.4 cm.

The thickness variation of the crystalline lens 1-2 can be determined as the eye accommodates to different PODs. When the eye is focused to a POD at infinity, the crystalline lens 1-2 has the minimum thickness 1-10. Under this case, the delay for the emitted ray 1-13 to leave this source of the source and detector 1-8 and for the reflected ray 1-12 to be captured by the detector of the source and detector 1-8 has time duration of $T_{far}$.

In FIG. 1B, the right eye after full accommodation causes a POD closest to the eye 1-1 to be focused by the eye 1-1. The crystalline lens 1-2 achieves the maximum thickness 1-14 using the involuntary ciliary muscle control to place the lens in a state of full accommodation. This technique uses what is an involuntary muscle control of the crystalline lens 1-2 and lets the user partially control this involuntary muscle control. Under this case, the delay for the emitted ray 1-12 to leave this source of the source and detector 1-8 and for the reflected ray 1-13 to be captured by the detector of the source and detector 1-8 has time duration of $T_{near}$. $T_{near}$ is typically greater than $T_{far}$ since the crystalline lens 1-2 has increased in thickness under the case for $T_{near}$. Other than the crystalline lens thickness variation, all the other dimensions of the eye 1-1 and free space remains the same. The time difference in propagation delay of $T_{near}$ and $T_{far}$ is the maximum $\delta T$ variation and different time difference in propagation delay ($\delta T$) can be measured and stored in memory as the eye is focused through different POD's ranging from the POD at infinity to the POD at minimum. The time difference in propagation delay is also measured when the eye focuses at a first POD and then the eye attempts to focus on a second different POD that is unfocused. A memory array holds the data and can be used to generate the accommodation tables.

The electromagnetic radiation propagates through the thickness of the crystalline lens 1-2 twice; the first case is towards the retina; and the second case is away the retina. The measured time delay for electromagnetic radiation to propagate through the crystalline lens comprising the summation of the first and second case. This is called the measured delay time. This time only accounts for the time passage for the electromagnetic radiation to propagate through the crystalline lens twice. This time does not account for the time to propagate in the Vitreous Humor or free space.

The crystalline lens 1-2 has an index of refraction 1.40 while the cornea and the vitreous humor have an index of refraction of approximately 1.33 which is very close to that of water. The thickness variation between the crystalline lens 1-2 focused at a POD of infinity and the crystalline lens 1-2 focused at a minimum POD provides the maximum $\delta T$ variation. Thus, the measurement of $\delta T$ can be used in conjunction with the accommodation tables to determine the current POD being focused on. The source and detector 1-8 mounted on the eyeglass is located within the dotted region 1-15. A perspective of the region 1-15 along the line 1-16 will be illustrated in a later figure.

The round trip distance between the source and detector 1-8 and the blind point 1-3 of the eye remains constant. The crystalline lens 1-2 during accommodation varies in thickness from 2.4 mm to 2.66 mm, or the Δ(0.26) mm, (for example, see: Kathryn Richdale, Mark A. Bullimore, and Karla Zadnik, "Lens Thickness with Age and Accommodation by Optical Coherence Tomography"; Ophthalmic Physiol Opt. 2008 September; 28(5): 441-447). The round trip make this Δ(0.52) mm or Δ(thickness)=0.52 mm and the estimated difference in time $\Delta T_{est}$ is:

$$\Delta T_{est} = \frac{\Delta(\text{thickness})(n_{cl} - n_{vh})}{c} \quad (1)$$

where c is the speed of light, $n_{cl}$ is the index of refraction in the crystalline lens and, $n_{vh}$ is the index of refraction in the vitreous humor. The estimated time is determined to be over 120 fs. Some circuit and layout techniques will be presented in FIG. 3 to FIG. 5 to address ways of measuring small time differences. Furthermore, the continual scaling of CMOS and III-V semiconductors and improvements of circuit techniques will constantly improve the ability to push the performance envelope. In addition, techniques to compensate noise considerations need to addressed, for instance, averaging, error correction methods, etc.

Figure 1D:
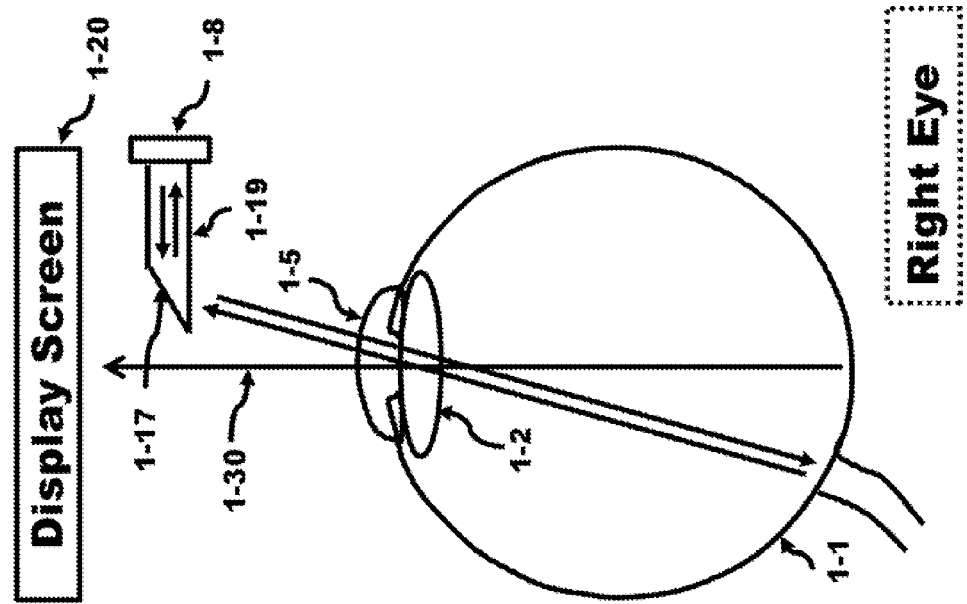
FIG. 1D illustrates characteristics of a human eye with a probing beam used to measure the thickness of the crystalline lens and a display screen system using this inventive technique.
Figure 1C:
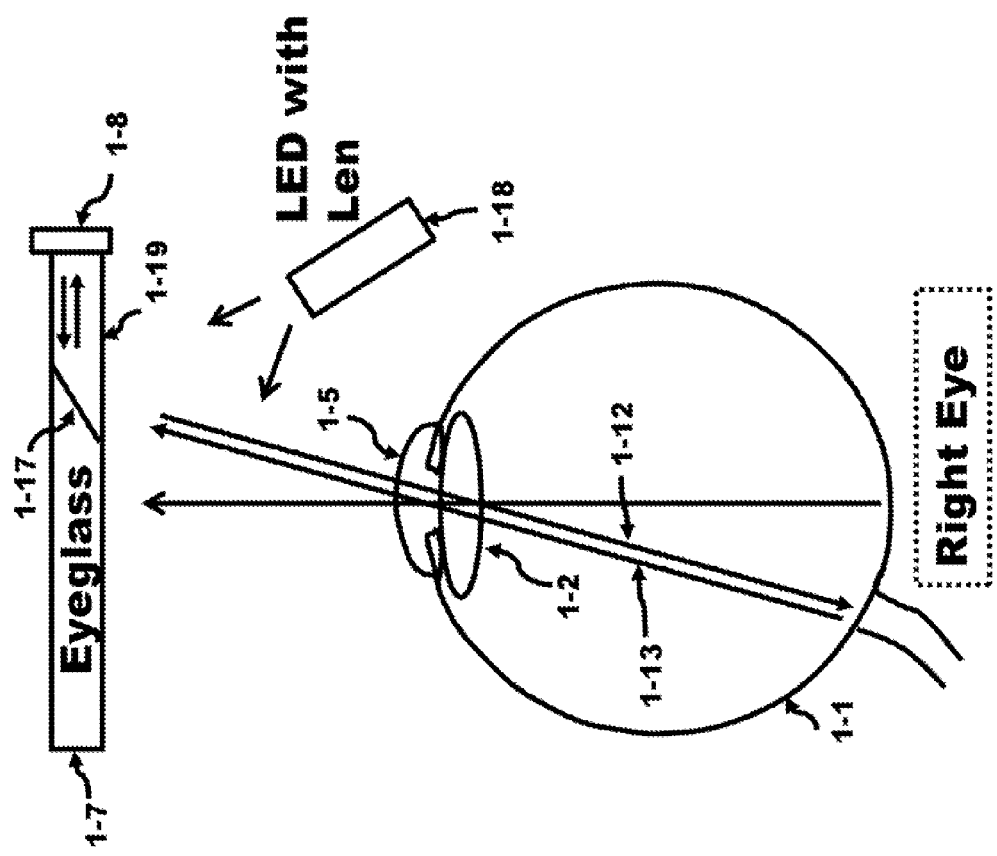
FIG. 1C shows characteristics of a human eye with a probing beam used to measure the thickness of the crystalline lens and an LED projection system using this inventive technique.

FIG. 1C illustrates the source and detector 1-8 at the edge of the eyeglass 1-7 where this source and reflected propagate along the transparent material 1-19 are reflected off the prism interface 1-17. These refracted waves 1-12 are emitted towards the blind point and the waves 1-13 are reflected from the blind point as the wave propagates in the cornea 1-5, the crystalline lens 1-2, and the vitreous humor. Meanwhile, the focusing information can be applied to a projection system using a Light Emitting Diode (LED) system by reflecting an image from the near surface of the eyeglass 1-7 and providing the proper focus for the image from the eyeglass onto the retina of the eye 1-1. An LED system could also be substituted for the LED system and the addition of a backlight and appropriate lensing in order for the propagation of an image to be reflected from the near surface of the eyeglass and focusing the image into the retina of the eye 1-1.

Although only the right eye has been shown, the left eye typically has a symmetrical behavior as the right eye 1-1 such that similar stimulus and measurements can be performed on the left eye as well. In some cases, only one measurement is required if the left and right are well matched since this one measurement can be shared between the two eyes. If the left and right eyes are not matched in the individual, the stimulus and measurements for both eyes are required, such that, each eye is measured individually.

FIG. 1D illustrates the right eye 1-1 viewing an LFP image being displayed on a display screen 1-20 along the optic axis 1-30 of the eye. Meanwhile, the source and detector 1-8 propagates the source and receives the reflected wave through a portion of a transparent material 1-19 where the end of the material is angled with the prism interface 1-17. The source propagates in the cornea 1-5 and the crystalline lens 1-2 onto the blind point and is reflected back to the source and detector 1-8. The user views the LFP image being displayed on a display screen 1-20 and attempts to focus on a different POD. The display screen can be on a smart phone, a tablet, notebook, etc. and can be wireless coupled to the accommodation system. As the eye attempts to focus on this new POD, the crystalline lens changes in thickness. The thickness variation is measured by the accommodation system. The measured accommodation of the eye 1-1 is applied as an input to the embedded algorithm that causes the LFP image being displayed on a display screen 1-20 to present the image corresponding to the different POD.

Figure 1F:
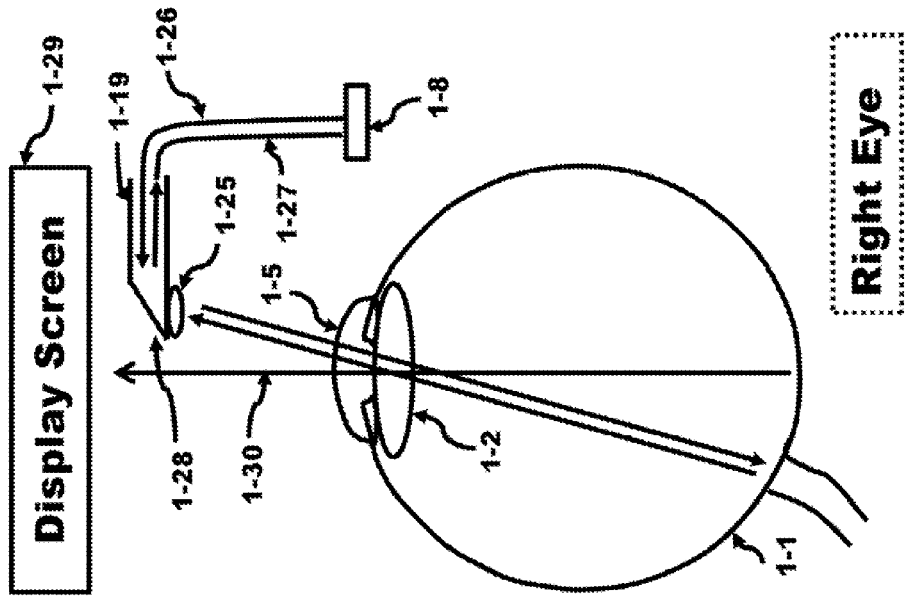
FIG. 1F shows characteristics of a human eye with a probing beam driven by optical fibers used to measure the thickness of the crystalline lens and observing the image on a smart phone display using this inventive technique.
Figure 1E:
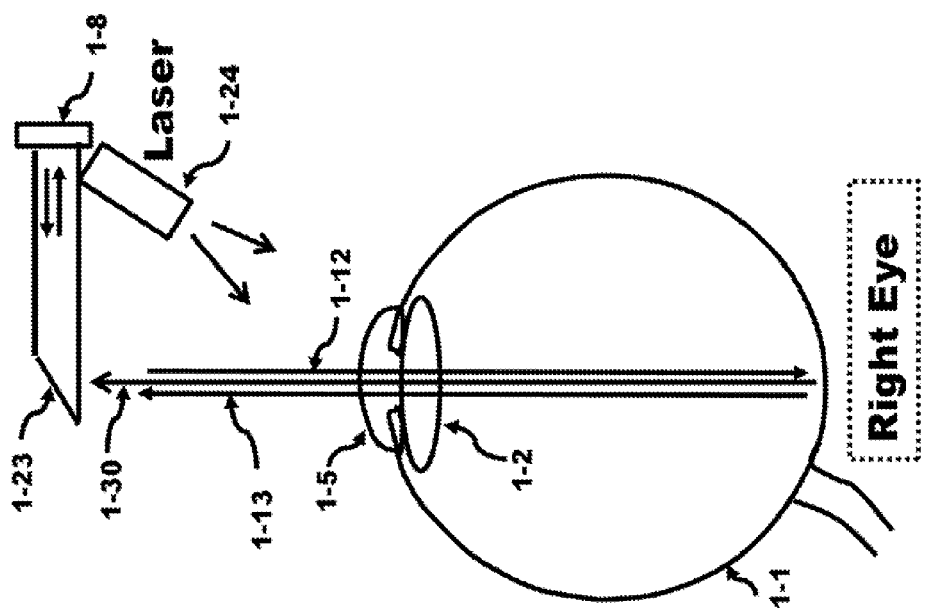
FIG. 1E depicts characteristics of a human eye with a perpendicular probing beam used to measure the thickness of the crystalline lens and laser scanning system (Visual Retinal Display VRD) to write on the cornea using this inventive technique.

FIG. 1E illustrates the electromagnetic radiation from the source and detector 1-8 entering the eye along the optical axis 1-30. In this case, the incident electromagnetic radiation 1-12 is reflected from the retina at the backside of the eye and reflected back as the electromagnetic radiation 1-13 through the vitreous humor, the crystalline lens 1-2, the cornea 1-5 and the free space between the cornea and the prism 1-23. In addition, a laser system 1-24 is projecting an image that is written directly onto the retina of the eye. This type of system is known as the virtual retina display (VRD). There are additional ways of introducing images into the eye by bouncing reflected light from the curved surface of the lens directly into the eye, different forms of projection onto the front surface of the eyeglass, a fiber-optic system with focusing lenses arranged to focus the image directly onto the retina of the eye, and other techniques which are currently well-known in the art. FIG. 1E also illustrates that the sense and probing of the thickness of the crystalline lens 1-2 can also be done along the optical axis of the eye. It is important that the material 1-23 is as transparent as possible. The image can also be introduced into the transparent material 1-23 by inserting the electromagnetic radiation corresponding to the image using an LCD or LED system. The information bearing the image would be presented by a driver (not shown) which is parallel to the source and detector 1-8. The reflected electromagnetic radiation corresponding to the image from the prism 1-23 will be focused onto the retina of the eye 1-1.

FIG. 1F illustrates the source and detector 1-8 at the end of a pair of fiber-optic wires 1-27 and 1-26. These fiber-optic wires are fused with the transparent material 1-19. A prism interface 1-28 reflects the wave and focuses it by the lens 1-25 coupled to the surface of the transparent material 1-19. The prism reflected wave impinges directly onto the blind point of the eye after propagation through free space, the cornea 1-5, the crystalline lens 1-2, and it the vitreous humor. Meanwhile, the right eye 1-1 viewing an LFP image being displayed on a display screen 1-20 along the optic axis 1-30 of the eye. The display screen can be on a smart phone, a tablet, notebook, etc. and can be wireless coupled to the accommodation system.

A current mechanical lenses system can comprise any moving structure external to the eye which adjusts a current focus of the lenses system. As an individual gets older, the focusing ability of the natural eye is diminished. An external lenses system such as eyeglasses can be used to compensate for the lack of natural accommodation that the crystalline lens once had. Currently, the mechanical adjust is performed by a user's physical action to twist, turn, move a knob or sensing unit. For example, by adjusting a lever, moving the head to activate an accelerometer within the eyeglasses to control focus, etc.

A mechanical lenses system for eyeglasses can be controlled directly by the use of the accommodation system instead of the user intentionally moving a physical structure. FIG. 2A illustrates the measurement of the accommodation using the source and detector 1-8 transmitting and receiving electromagnetic radiation, the transparent material 1-19 embedded in the eyeglass 1-7, the prism 1-17 reflecting the transmitted and received electromagnetic radiation to the eye 1-1 from/to the source and detector 1-8, and the source path 1-12, the blind point and the reflected path 1-13 through the right eye 1-1 which includes the crystalline lens 1-2 in the cornea 1-5. The optical axis 1-30 perpendicular to the first eyeglass 1-7 and the second eyeglass 2-4 displaced by a gap 2-3 from the first eyeglass. The gap 2-3 can be increased or decreased using the motor assembly 2-10 which comprises a motor 2-1 and some gears 2-2 that can vary the gap 2-3 between these two eyeglass elements. Although, these eyeglasses have been indicated as rectangular in nature, the eyeglasses can be convex, concave, or both. These eyeglasses present an eyeglass image to the user. As the distance 2-3 between the two eyeglasses is varied, the focus plane of an eyeglass image onto the retina of the right eye 1-1 is adjusted.

In FIG. 2A, when the user tries to focus their eye to a different POD of the eyeglass image, the right eye is being measured by the accommodation system providing a first T. As the user adjusts their focus to a desired POD from the initial POD, the accommodation system measures a second T. The difference between the first T and the second T provides a time difference in propagation delay ($\delta T$) corresponding to the accommodation of the right eye. An accommodation table uses this $\delta T$ to determine the desired POD. Thus, as the user focuses on the desired POD of the eyeglass image, the accommodation system provides the inputs to the µController. The µController issues commands and electrical signals to the motor assembly 2-10. This stimulus adjusts the motor such that the physical eyeglasses are brought into focus for the desired POD that the individual desired. Thus, the user does not intentionally vary a physical part to adjust the eyeglasses; instead, the crystalline lens 1-2 of the eye is involuntarily focused by the user attempting to adjust their focus to the desired POD There are many forms of mechanical adjustments that are being used to address the self-focusing of eyeglasses through mechanical means. Another example, in FIG. 2B, the accommodation system comprising the source and detector 1-8, the transparent material 1-19 the incoming rays 1-13, and outgoing rays 1-12, through the cornea 1-5, the crystalline lens 1-2 and reflected off of the blind point of the right eye 1-1 back to the source and detector 1-8 is used to measure the $\delta T$ in the crystalline lens 1-2 between a current POD and a desired POD. An accommodation table uses this $\delta T$ to determine the desired POD. The $\delta T$ translates into a thickness difference in the crystalline lens 1-2. This variation in the thickness occurs because the individual is trying to focus to a desired POD. As the user focuses on the desired POD, the accommodation system provides the inputs obtained from the accommodation table to the µController. The µController issues commands and electrical signals to the liquid pump 2-8. The pump 2-8 uses the fluid reservoir 2-9 to adjust the clear fluid flow to the input port 2-7 of the adjustable curvature lens 2-6 in order to adjust the radius of curvature of lens 2-6 by adjusting the thickness 2-5. This thickness change can be viewed as a mechanical change to the lens 2-6. Once the desired POD is obtained, the accommodation system senses that the variation in the thickness decreases and the user is viewing the desired POD in focus. In addition, as the user refocuses his eye to a new POD, the accommodation system measures the thickness variation and adjusts the pump 2-8 (to extract or add fluid) from/to the lens 2-6. The lens 1-7 may not be necessary. This application of measuring the crystalline lens thickness provides a way of adjusting mechanical eyeglasses by focusing the typically involuntary ciliary muscle control of the crystalline lens 1-2.

FIG. 3A illustrates a top view of the source and detector integrated circuit 3-1. The integrated circuit 3-1 as a dimension of width 3-7 and height 3-8. The integrated circuit 3-1 comprises a semiconductor substrate 3-3 with high-speed Schottky diodes 3-2a through 3-2d. These form a part of the detector and can distinguish sub-picosecond variations in delay. The response of the incident wave front 1-13a and 1-13b is measured by a circuit incorporating these Schottky diodes. In the center is another semiconductor substrate 3-5 with a laser 3-4 that emits the source of the electromagnetic radiation 1-12. These could be femto-sec pulsed lasers. The entire integrated circuit may have dimensions on the order of about one or two millimeters on a side.

A side view of a structure similar to FIG. 3A is illustrated in FIG. 3B. The integrated circuit 3-1 comprises a III-V substrate 3-12 with a second laser substrate 3-5 solder bumped 3-9 to the II-V substrate. In addition, on the substrate 3-5 is the laser 3-4 which emits the electromagnetic radiation 1-12. The Schottky diodes can be improved in performance to detecting the incident wave front 1-13a and 1-13b if they are grown in III-V as illustrated in FIG. 3C. In this case, the laser substrate 3-5 is solder bumped 3-9 to the III-V substrate 3-10. The III-V chip 3-10 is solder bumped 3-11 to the CMOS substrate 3-13 forming the integrated circuit 3-1. The incident rays 1-13a and 1-13b fall on the Schottky diodes fabricated in the III-V substrate 3-10. The laser emits the electromagnetic radiation 1-12 from the laser substrate 3-5. The CMOS substrate 3-13 contains additional circuitry such as A/D converters, clocking circuitry, timing circuitry, and an interface to a microprocessor, and circuitry that is well known in the art to properly operate CMOS circuitry. These CMOS circuits are used to measure the $\delta T$ in the crystalline lens 1-2.

Figure 4:
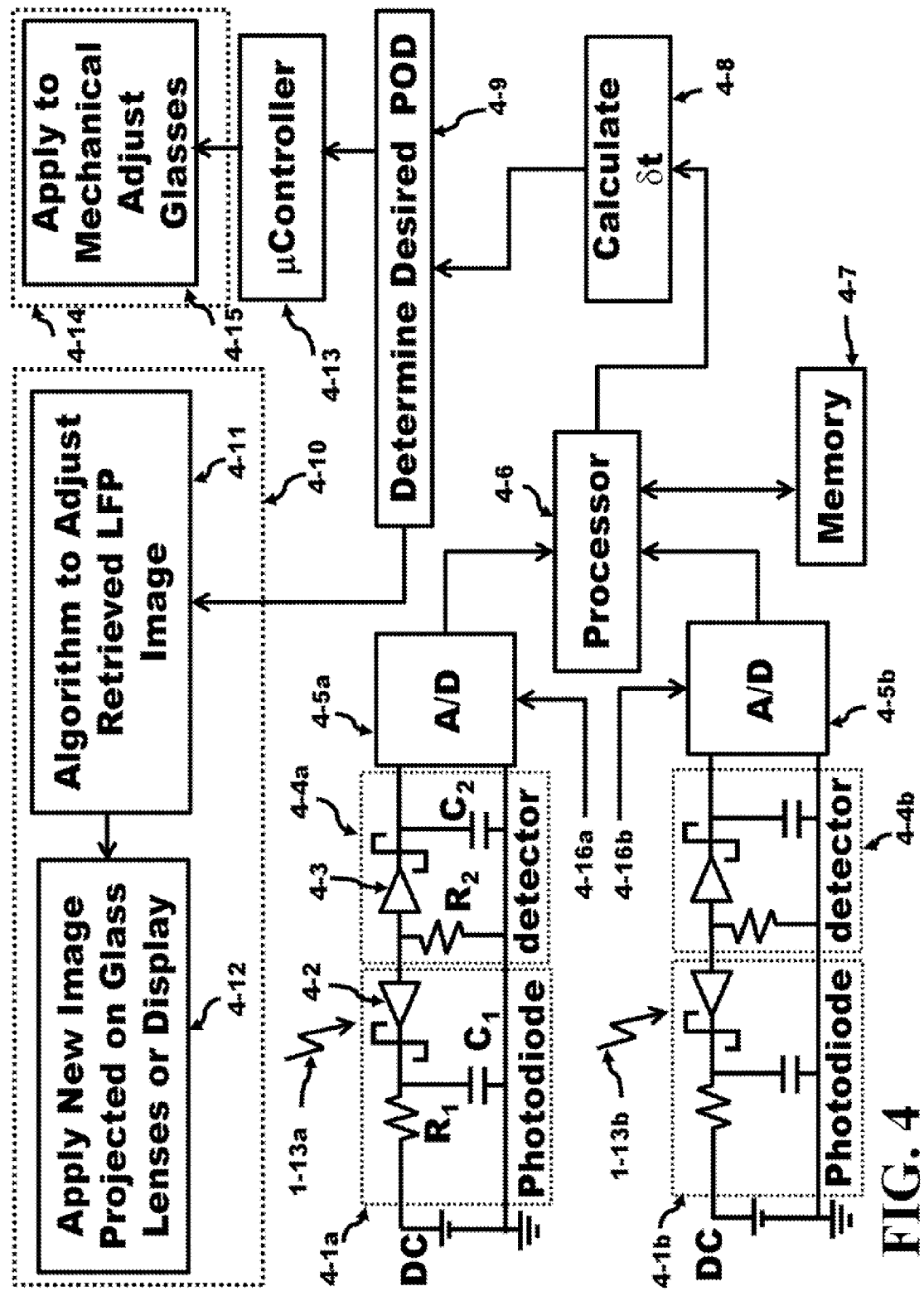
FIG. 4 shows the circuitry and block diagrams used to measure the lens thickness corresponding to the accommodation variations and applies the resultant measurements to a light field photo or mechanical eyeglasses using this inventive technique.

FIG. 4 illustrates the high-speed circuitry formed from the Schottky diodes. The Schottky diodes are used in a photodiode circuit 4-1a and in the duplicate photodiode circuit 4-lb. Schottky diodes are also used in the detectors 4-4a and 4-4b. The photodiode circuit comprises a capacitor $C_1$ and resistor $R_1$ coupled to a DC voltage. The Schottky diode 4-2 is sensitive to electromagnetic radiation 1-13a and couples R1 to R2. The duplicate hotodiode in the photodiode 4-1b intercepts the electromagnetic radiation 1-13b. The outputs of the photodiodes are applied to a detectors 4-4a and 4-4b. The 4-4a detector comprises the resistance $R_2$ placed across the output of the photodiode and a Schottky diode 4-3 in series with a capacitor $C_2$. The output is extracted across the capacitor C2 and is applied to a high-speed A/D converter 4-5a. The number of photodiode and detector circuits can be greater than or less than two, although only two are illustrated. The output of the duplicate detector circuit 4-4b is applied to the high-speed A/D 4-5b. The A/D converter 4-5a is clocked by the signal 4-16a while the A/D converter 4-5b is clocked by the signal 4-16b. The digital outputs of the A/D converters are applied to the processor 4-6 interacting with in memory 4-7. The processor is used to calculate $\delta T$ 4-8 which determines the desired POD 4-9. An accommodation table provides data concerning the desired POD and is applied to a µController 4-13. The µController's outputs are applied to the block 4-14 containing the mechanical adjust system for the glasses 4-15.

Besides mechanical glass control, the output of the Desired POD 4-9 can be applied to the block 4-10. An embedded algorithm uses the retrieved LFP image and the desired POD to adjust the retrieved LFP image 4-11 with a current POD to an image with the desired POD. The newly desired POD generates the image with the corresponding POD and is applied or projected onto the glass lenses or a display 4-12.

Figure 5A:
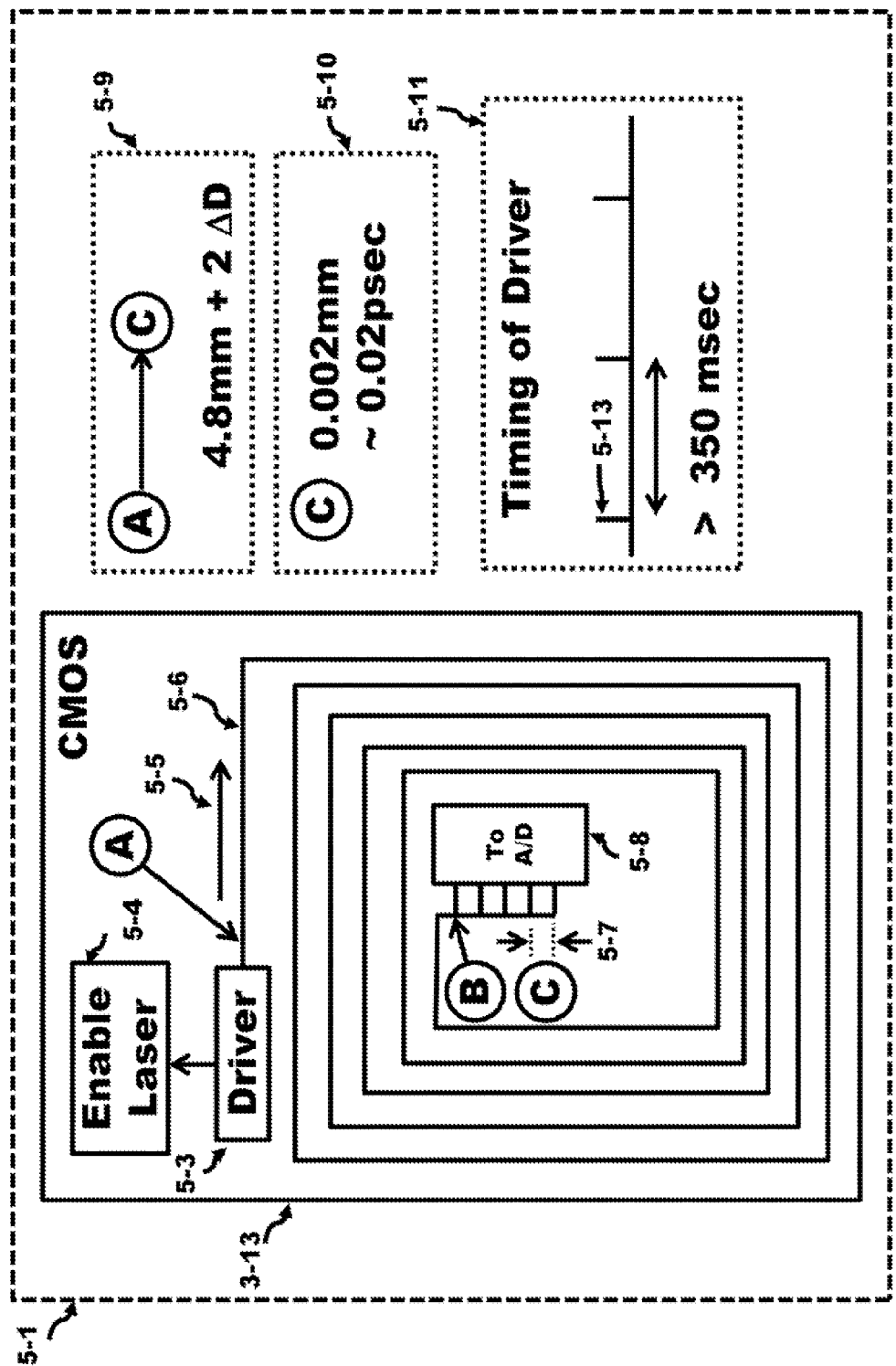
FIG. 5A depicts a microstrip design to perform the self-timing in accordance with this inventive technique.

FIG. 5A illustrates one particular layout that may exist on the surface of the CMOS substrate along with some timing parameters associated with driving this particular layout 5-1. The layout comprises a microstrip line designed to carry a short pulse over a distance of several centimeters. The overall description 5-1 illustrates the CMOS substrate 3-13 and the corresponding timing parameters 5-9 through 5-11. The microstrip line on the CMOS substrate 3-13 couples to a driver 5-3 which launches the signal at node A of the microstrip line and propagates that signal on the microstrip line in the direction of 5-5. When the signal arrives at node B of the microstrip line, the signal is tapped at several points separated by the distance 5-7 until the signal terminates at node C of the microstrip line. These tap points are equivalent to the nodes 4-16a and 4-16b. A termination impedance (not shown) is used to terminate the microstrip line. The propagation time for the wavefront along the microstrip line from node A to node C should equal to the propagation time for the electromagnetic radiation to make the round trip path from the source and detector 1-8 to the eye then reflected back along the reverse path back to the source and detector 1-8 which is a distance of about 4.8 mm plus 2 ΔD 5-9. ΔD is shown earlier and is the distance in free space between the laser and the surface of the eye. Node C has proper termination to prevent the waveform from being reflected of the end of the microstrip line. The tap points between node B and node C are sent to the A/D 5-8. The tap points along the microstrip line have a separation 5-7 which are used to generate short divisions of time 5-10 which are applied to a sequence of A/D's in the circuit block 5-8 (nodes 4-16a and 4-16b). When the driver 5-3 sends the wavefront signal on the microstrip line 5-6, a pulse is simultaneously sent to enable the laser 5-4 so that the laser will admit electromagnetic radiation which will propagate toward the eye and reflect off the blind point where a portion will make its way back to the source and detector 1-8 located on the CMOS substrate 3-13. Although the source and detector 1-8 is not illustrated in FIG. 5A, the circuitry for the photo detectors were described earlier. The goal of this the circular layout for the microstrip line is to pack as much microstrip on the surface of the CMOS substrate to achieve the desired propagation time. Various layout strategies can be used for the layout. As mentioned earlier, the T of the laser light to propagate through free space through the eye and reflected back through the eye through free space to the photodetector has the same time duration as the propagation of the waveform along the microstrip line 5-6 from node A to node C. Thus, these two systems will be timed equally to ensure that the timing for capturing the return electromagnetic radiation by the photodiodes occurs at the right time. The division of the microstrip line 5-7 shown between node B and node C should have a delay increment of approximately 0.02 ps 5-10. The δT from viewing a POD at infinity to a POD at minimum is equal to the laser light to propagate along a 2 micrometer distance in an index of refraction of 1.4 5-10. The accommodation is a relatively rapid process and occurs within the eye in about 350 ms 5-11 which sets the repetitive rate of the pulses. Thus, the power dissipation of the timing circuit can be reduced since the wavefronts can be created with a separation greater than 350 ms 5-11. In box 5-11, the wavefront pulses are illustrated as 5-13 which further reduces the over power dissipation since the driver has a very short duty cycle. To perform noise rejection, the pulse may be quickly repeated in short bursts to achieve numerous measurements and utilize well known noise reduction techniques to improve the measurement of the delay.

Figures 5B, 5C:
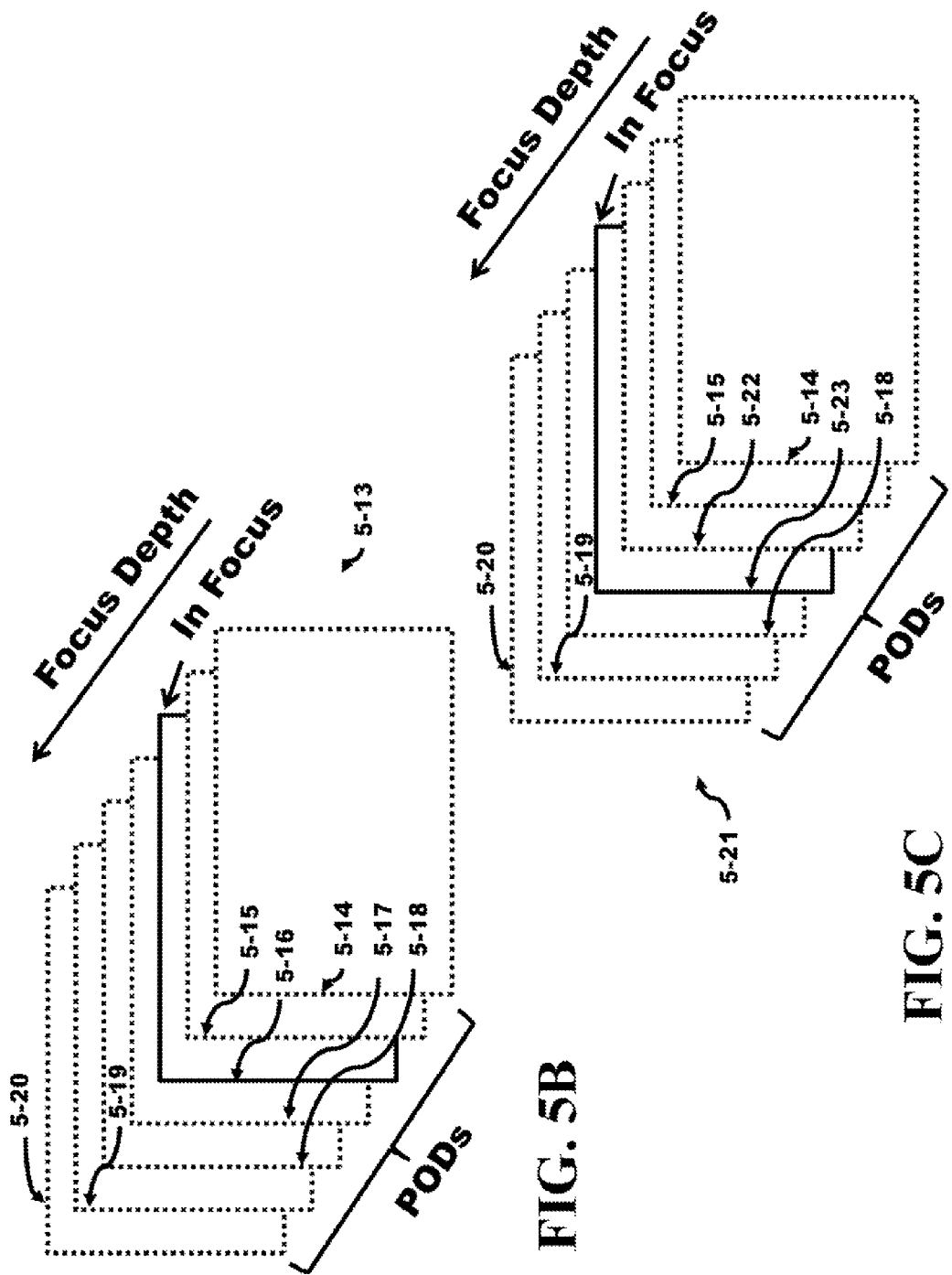
FIG. 5B illustrates a POD of an LFP image where the third plane from the front is in focus in accordance with this inventive technique.
FIG. 5C shows a POD of an LFP image where the fourth plane from the front is in focus in accordance with this inventive technique.

FIG. 5B and FIG. 5C illustrates LFP plenoptic images which contain several PODs and the focus depth where currently only one of the PODs are in focus. A plenoptic LFP image contains all the information necessary to bring any one of the PODs into focus. In FIG. 5B, 5-13 illustrates a particular image that contains several PODs ranging from 5-14 through 5-20. Only POD 5-16 is in focus, the remaining PODs 5-14, 5-15, 5-17 through 5-20 are out of focus. To bring the other PODs into focus requires an embedded algorithm that manipulates the overall LFP image of the plenoptic camera system such that a different POD is brought into focus. This is illustrated in FIG. 5C, a plenoptic LFP image 5-21 with the POD 5-23 being in focus while the remaining PODs 5-14, 5-15, 5-22, and 5-18 through 5-20 are out of focus. These PODs were generated by the plenoptic system which provides special characteristic that the image taken by the plenoptic system contains information about all the PODs that exists on the LFP image. The nature of this LFP image is one where the embedded algorithm associated with the plenoptic system image allows the LFP image to be manipulated using this embedded algorithm such that a different POD is brought into focus.

Figure 6A:
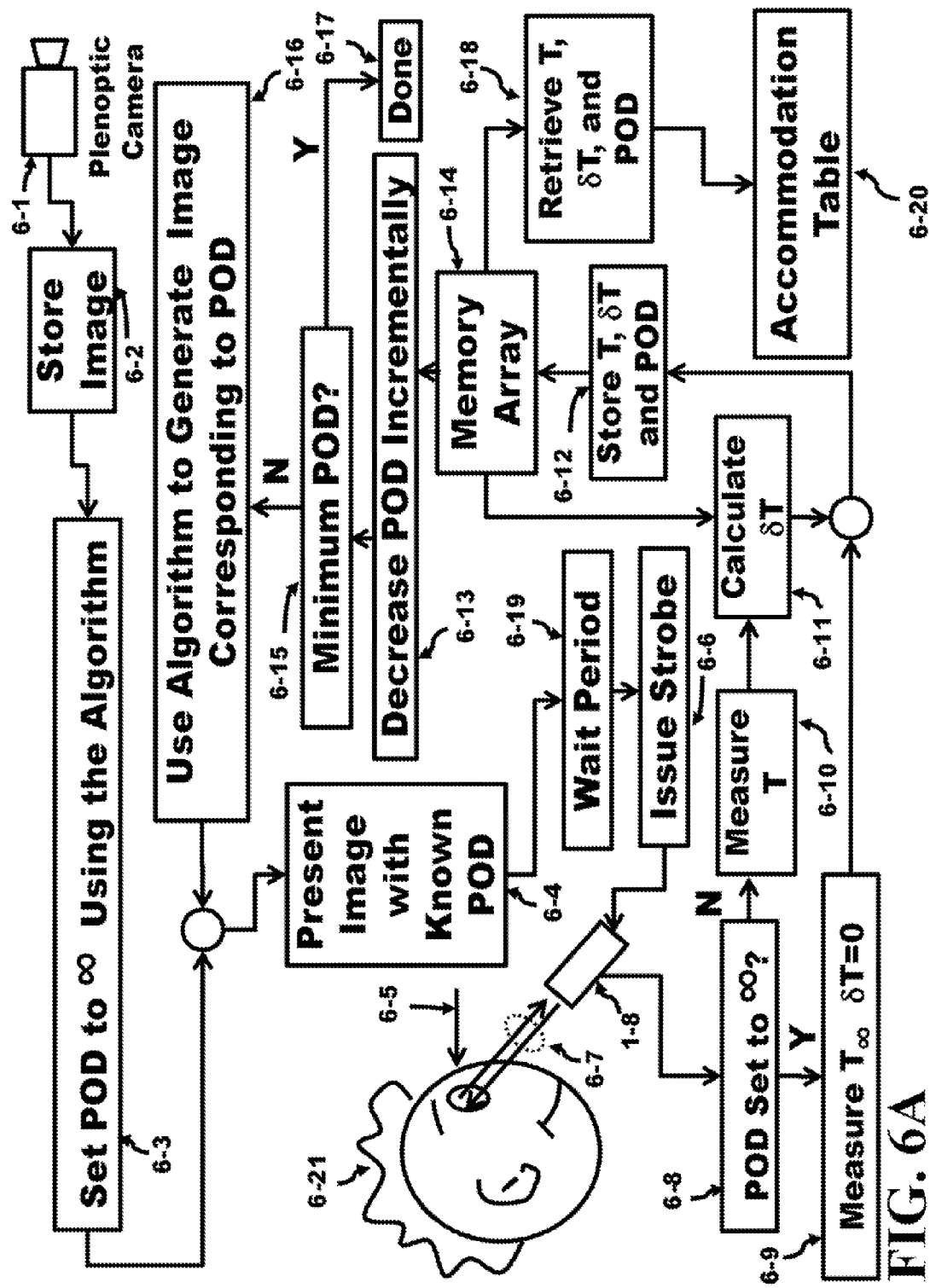
FIG. 6A depicts a flowchart to automatically test, measure, store, and retrieve T, δT, and POD and generate an Accommodation Table of a user's crystalline lens viewing a Stored Image in accordance with this inventive technique.

FIG. 6A illustrates a process which collects the results of the accommodation test system applied to the test LFP image 6-5 being viewed by the user 6-21. The test LFP image is generated by a plenoptic camera presented to the user has PODs at known distances (∞, 100 m, 64 m, 32 m, 16 m, 8 m, 4 m, 2 m, 1 m, 0.75 m, 0.5 m, 0.25 m, etc.), for example. As the individual or user 6-21 is presented an LFP image at a known POD, the accommodation test system monitors the thickness of the user's crystalline lens 1-2 to measure the thickness variation from a previous measurement and apply that thickness variation, δT, to generate a accommodation table 6-20. The POD is decreased incrementally 6-13 and applied to the embedded algorithm associated with the plenoptic camera to alter the LFP image to be so such that a different POD is brought into focus. The data is collected and used to generate the accommodation table 6-20.

The test LFP image has PODs at known depths (∞, 100 m, 64 m, 32 m, 16 m, 8 m, 4 m, 2 m, 1 m, 0.75 m, 0.5 m, 0.25 m, etc.), for example, and is captured by the image sensor array in the plenoptic camera 6-1 formed by a plurality of microlenses can be stored in memory, a computer embedded algorithm can be developed to manipulate the light information retrieved from memory to generate how the image would appear when viewed from a different POD. The image is stored 6-2 into a local memory. This test LFP image stored 6-2 contains all the information such that the image and the embedded algorithm can refocus the existing LFP image to any one of the POD's. The stored image is recalled from memory and is provided to generate the POI) at co using the embedded algorithm 6-3 associated with the plenoptic camera 6-1. This image focused at a known POD (∞) is presented 6-4 to the user 6-21 along the optical path 6-5 and enters the user's eye. Meanwhile, the accommodation test system is monitoring the crystalline lens 1-2 of the user 6-21 by using the source and detector 1-8 which probes the user's crystalline lens by the incident and reflected electromagnetic radiation 6-7. The probing provides information concerning the thickness and the variation in thickness of the crystalline lens. Since the POD is set at infinity, the crystalline lens has the minimum thickness. The user views the test LFP image 6-4. A wait period 6-19 occurs to insure that the user accommodates to the test LFP image. This wait period could be as long as 350 ms. A strobe is issued 6-6 to align the timing required to capture the reflected waveform within the photodetectors of the source and detector 1-8. As mentioned earlier, this strobe can be a burst comprising a number of individual closely spaced pulses of laser energy to obtain numerous measurements for noise reduction purposes. The result of the measurement is applied to block 6-8 to determine if the POD is set at infinity 6-8. If the answer is yes, then measure the delay T, and setting δT to zero 6-9. If the answer is no, then the POD is not set to infinity and perform the measurement T 6-10 and calculate δT 6-11 based on the previous time measurement. Each measurement of T, calculation of δT, and known POD is stored 6-12 in a memory array 6-14. The process at this point proceeds two ways: 1) the results T, δT, and POD are retrieved from the memory array 6-18 and these are used to generate an accommodation table 6-20 which will be described in FIG. 6B; and 2) decrease POD incrementally 6-13 and determine if the minimum POD has been approached 6-15. If not, use the embedded algorithm to generate a test LFP image corresponding to POD 6-16 and then present the test LFP image with known POD to the user 6-4. This process continues until the minimum plane of that 6-15 occurs at which point the process is done 6-17 and the complete accommodation table is generated 6-20.

Figure 6B:
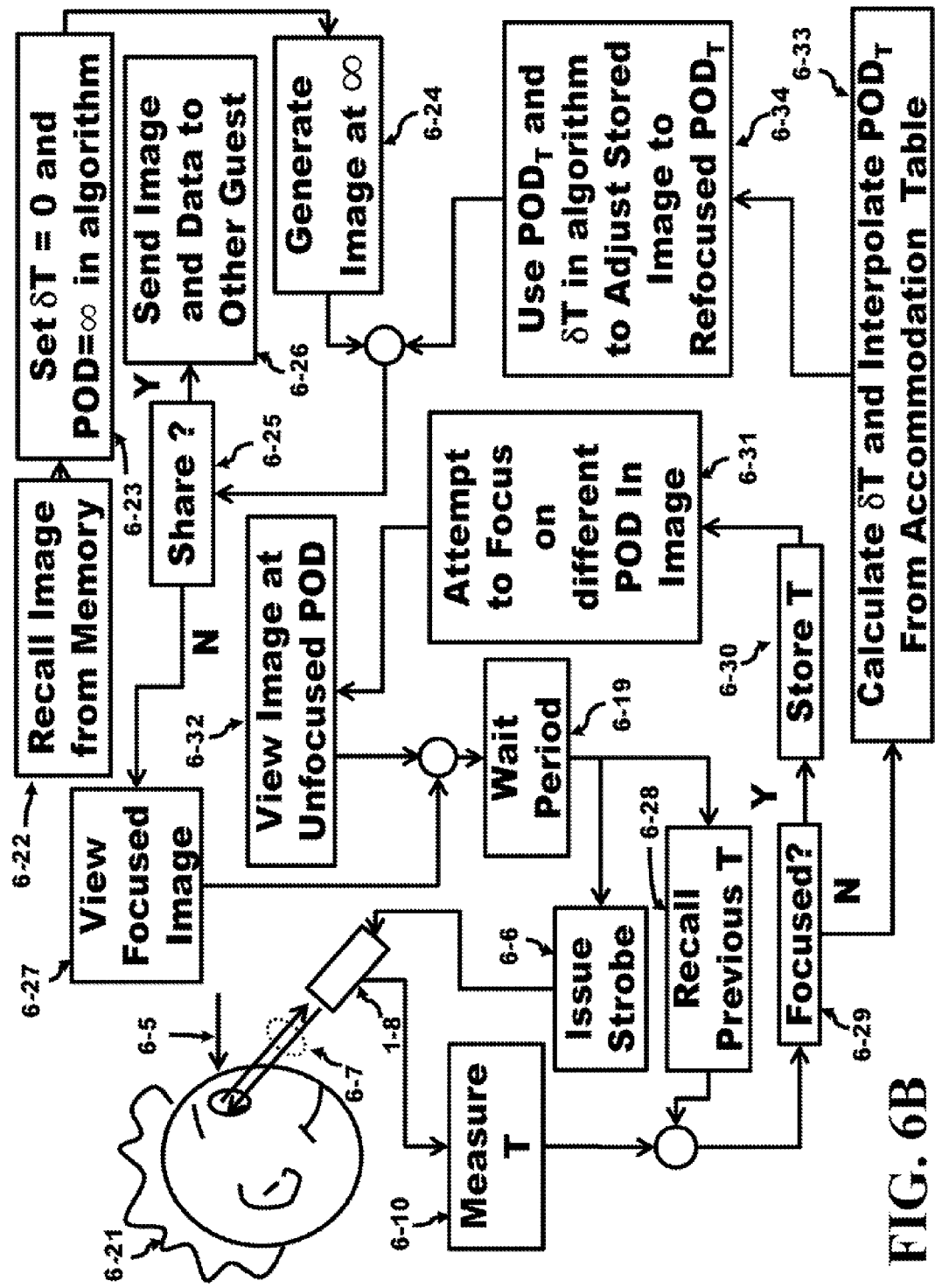
FIG. 6B illustrates a flowchart to automatically measure a user's crystalline lens characteristics as the user focuses on different PODs in an image read from memory in accordance with this inventive technique.

The system in FIG. 6B anticipates the users 6-21 attempt to focus at a different POD. The user attempts to refocus the current in-focus plenoptic LFP image to a different POD. This event occurs because the user sees the out of focus POD and attempts to focus on it. The crystalline lens changes in thickness and since the user 6-21 is monitored by the accommodation system, the variation of the crystalline lens 1-2 of the user 6-21 illustrates that a newly desired POD is being selected by the user. Once the newly desired POD is achieved, the user can view the image at the newly desired POD or decide to focus on a different POD within the image and allow the accommodation system in conjunction with the plenoptic LFP image and the embedded algorithm to once again refocus the current original image to this newly different POD.

A plenoptic LFP image is recalled from memory 6-22 and the POD is set to ∞ using the embedded algorithm 6-23 after which the LFP image at infinity is generated 6-24. The LFP image can be shared with others 6-25 whereby the LFP image and parameter data concerning the LFP image is sent to guest 6-26. Otherwise, the user views the focused image 6-27 along the visual path 6-5. Although not illustrated, when the LFP image is presented to the user, a superimposed text can indicate that the user should focus on the image as is. While the user is viewing the image, a source and detect unit 1-8 emits and receives the reflected radiation 6-7 from the user's eye. After the user views the focused image 6-27, a wait period occurs 6-19 and then a strobe (or strobe burst, this will not be mentioned again) is issued 6-6 to the source and detector 1-8 to emit and receive the reflected radiation 6-7 and measure T 6-10. The previous T, if it exists, is recalled from memory 6-28. If the user 6-21 had viewed the focused image 6-29, then store T 6-30 and the user should attempt to focus on a different POD in the image 6-31. The user should attempt to view the image at the unfocused different POD 6-32. Although not illustrated, when the LFP image is presented to the user, a superimposed text can indicate that the user should attempt to view the unfocused different POD. A 350 ms wait period occurs 6-19 and then a strobe issued 6-6 to the source and detector 1-8 to emit and receive the reflected radiation 6-7 and measure T 6-10. The previous T is recalled from memory 6-28. If the user 6-21 had not viewed the focused image 6-29, calculate δT (by taking the difference between T and the previous T) and interpolate the $POD_T$ from the accommodation table 6-33. Then use this information of $POD_T$ and δT in the embedded algorithm to adjust the LFP image at the unfocused different $POD_T$ 6-34. The LFP image can be shared with others 6-25 whereby the LFP image and parameter data concerning the LFP image is sent to guest 6-26. Otherwise, the user views the focused image 6-27 along the visual path 6-5.

FIG. 6C is a simplified version of the flowchart given in FIG. 6B. First, view an LFP image generated by a plenoptic camera 6-35. The user focuses on a different POD in the LFP 6-36 image. The accommodation system is used to calculate δT 6-11 from the measured current T and previous T. The results are checked against the accommodation table 6-37. At this point, the embedded algorithm which alters the POD of the LFP image 6-38 is utilized to refocus the original LFP image to the second POD that the user attempted to view when the second POD was out of focus. Once the second POD is brought into focus, the newly focused second POD LFP image is by the user 6-39. If the user wants to continue the process 6-40 then the user will focus on another different POD of the LFP image 6-36 and repeat the process steps. Once the user is satisfied then the user can terminate or stop 6-41 the process.

FIG. 6D illustrates a flowchart which automatically adjusts the POD of an a single lens or both lenses of an eyeglass. An object in a FOV (eyeglass image) is viewed at a given POD using automatically adjustable eyeglasses 6-42. The user focuses on a different POD in the eyeglass image 6-43. The accommodation system is used to calculate δT 6-11 from the measured current T and previous T. Use the calculated value and check the accommodation tables 6-37 to extract out the given POD and mechanically or fluidly alter the POD of the eyeglasses 6-44 so that the eyeglasses focus on this different POD. This allows the user to automatically view this different POD focused in the FOV 6-45. If the user wants to look at a second different POD then move to block 6-43 and repeat the process, otherwise when done 6-40 stop 6-41 the process.

Figure 7A:
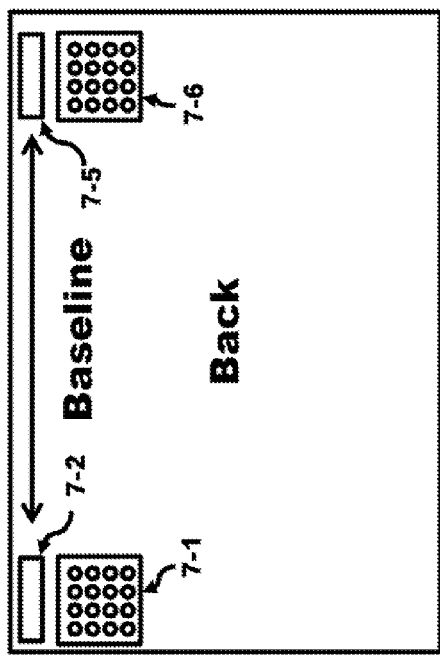
FIG. 7A depicts the back of a smart phone (other examples: tablet, notebook, etc.) with a plenoptic camera and eye port in accordance with the present invention.
Figure 7B:
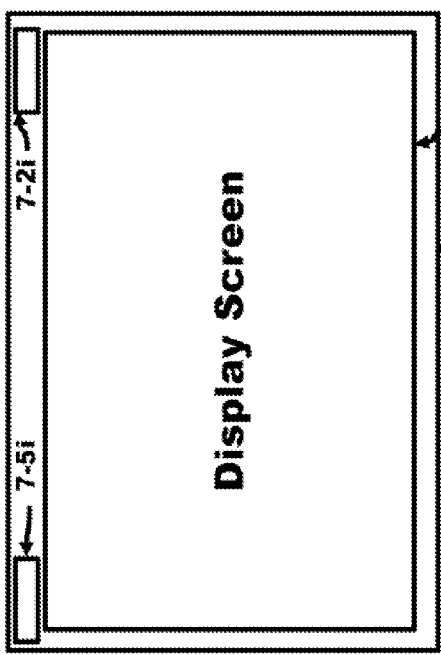
FIG. 7B shows the front of a smart phone with a display screen and one eye port in accordance with the present invention.

FIG. 7A illustrates the back of a smart phone 7-3 such as a cell phone. The back contains a plenoptic camera lens 7-1 and camera assembly; however, the front can contain the plenoptic camera lens 7-1, at the expense of increased smart phone size since the display screen is already occupying the front. The plenoptic camera is a 4×4 array of individual cameras with microlenses which takes the image simultaneously and combines the images together into one LFP image. In addition, above the plenoptic camera is an output view port 7-2 which offers a FOV to the user from the other side of the cell phone. For example, see FIG. 17B and the FOV 17-5 corresponding to the output view port of the portable unit 7-3a. FIG. 7B presents the front surface of the smart phone 7-3. The screen display 7-4 can display the plenoptic image captured by the plenoptic camera lens 7-1. The input view port 7-2i can be used by the user to view an LFP image created by the plenoptic camera that may be superimposed over an image of the FOV at the output eye port 7-2 or display an image completely due to the output from the plenoptic camera.

Figure 7C:
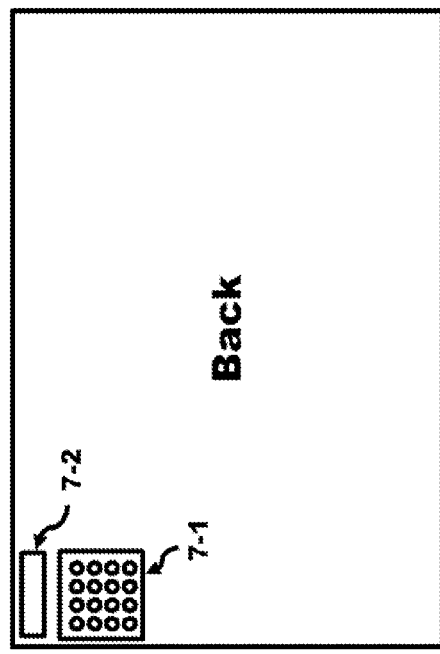
FIG. 7C depicts the back of a smart phone with two plenoptic cameras and two eye ports in accordance with this inventive technique.
Figure 7D:
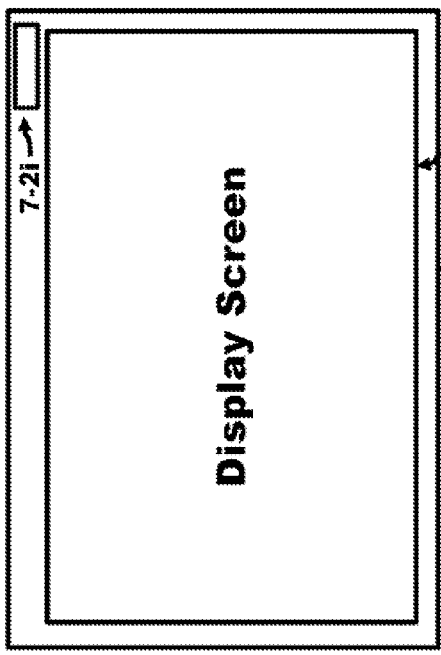
FIG. 7D shows the front of a smart phone with a display screen and two eye ports in accordance with the present invention.

FIG. 7C illustrates the back of a smart phone 7-3a such as a cell phone. The back contains two plenoptic cameras 7-1 and 7-6. Both are a 4×4 array, although other array sizes are possible, of individual cameras with microlenses which takes the image simultaneously and combines the images of each plenoptic camera together into an LFP image. In addition, above each plenoptic camera is an output view port 7-2 and 7-5 which offers a stereoscopic FOV to the user. For example, see FIG. 17B and the FOV 17-4 and 17-5 corresponding to the output view ports of the portable unit 7-3a. FIG. 7D presents the front surface of the smart phone 7-3a. The screen display 7-4 can display the plenoptic image captured by both plenoptic camera lenses 7-1 and 7-6. The input view port 7-2i and input view port 7-5i can be used by the user to view a stereoscopic image created by the plenoptic cameras which may be superimposed over an image of the FOV collected at the output eye ports 7-2 and 7-5 or display an LFP image completely due to the output from both plenoptic cameras. The baseline distance separation of the plenoptic cameras help to improve the Long Range (LR) stereoscopic 3-D image that can be focused to different PODs. The LR stereoscopic 3-D image improves as the baseline distance increases.

Figure 20A:
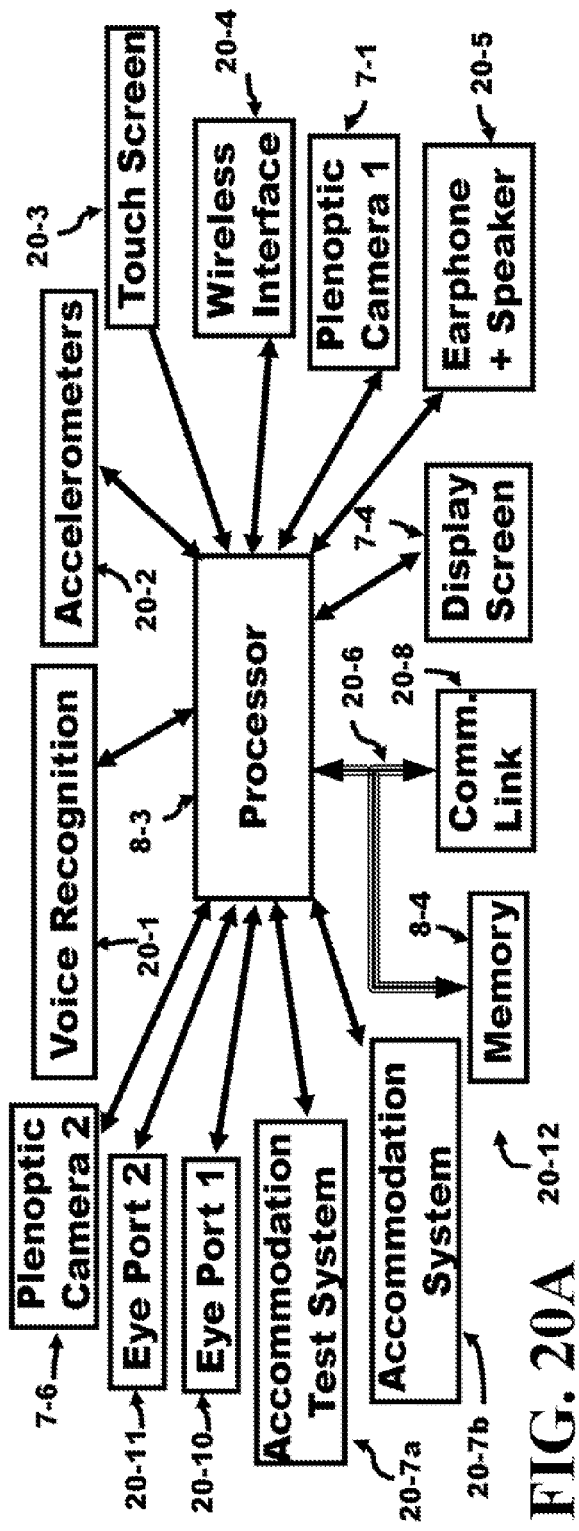
FIG. 20A shows a block diagram of a smart phone in accordance with this inventive technique.

FIG. 8A illustrates an block diagram of an apparatus with a plenoptic camera that can be coupled to guest's remote eyeglasses or smart phones. The portable unit 7-3 comprises a processor 8-3 coupled to a display 7-4 and an accommodation system 8-7. FIG. 20A comprises a more detailed list of items in the portable unit. The processor 8-3 is also coupled to a memory 8-4 and the plenoptic camera 7-1. The accommodation system 8-7 contains the apparatus to set the accommodation 8-6 which includes the eye port 7-2 providing a SR stereoscopic 3-D image (since there is only one plenoptic camera) that can be focused to different PODs. Inside the eye port is the source and detector 1-8 that is used to determine the $\delta T$ 8-5. The results of the $\delta T$ are applied to the processor which then sets the accommodation 8-6 of the LFP image. Not illustrated within 7-3 is the wireless communication link coupling the wireless device 7-3 to a remote device 8-1. The remote device 8-1 can be the Internet, the intranet, the cloud, or any servers that can transfer data to/from the wireless device 7-3. In addition a wireless communication link is can be established to guest's remote glasses or smart phones 8-2. The communication link can be cellular, Wi-Fi, Bluetooth, or any other known wireless standard that can transfer data between two locations.

FIG. 8B illustrates the smart phone 7-3a comprising two plenoptic cameras 7-1 and 7-6 and two eye ports 7-2 and 7-5. The portable unit 7-3a comprises a processor 83 coupled to a display 7-4 and a set accommodation system 8-7a. FIG. 20A comprises a more detailed list of items in the portable unit. The processor 8-3 is also coupled to a memory 8-4 and the plenoptic cameras 7-1 and 7-6. The set accommodation system 8-7a contains the apparatus to set the accommodation 8-6 which includes two eye ports 7-2 and 7-5 providing a LR stereoscopic 3-D image (since the two plenoptic cameras can be separated by a large baseline) that can be focused to different PODs. Inside at least one eye port is the source and detector 1-8 that is used to determine the $\delta T$ 8-5. The results of the $\delta T$ are applied to the processor 8-3 which then sets the accommodation 8-6. Not illustrated within 7-3a is the wireless communication link couple coupling the wireless device 7-3a to a remote device 8-1. The remote device 8-1 can be the Internet, the intranet, the cloud, or any servers that can transfer data to/from the wireless device 7-3a. In addition a wireless communication link can be established to guest's remote glasses or smart phones 8-2. The communication link can be cellular, Wi-Fi, Bluetooth, or any other known wireless standard that can transfer data between two locations.

Figure 9A:
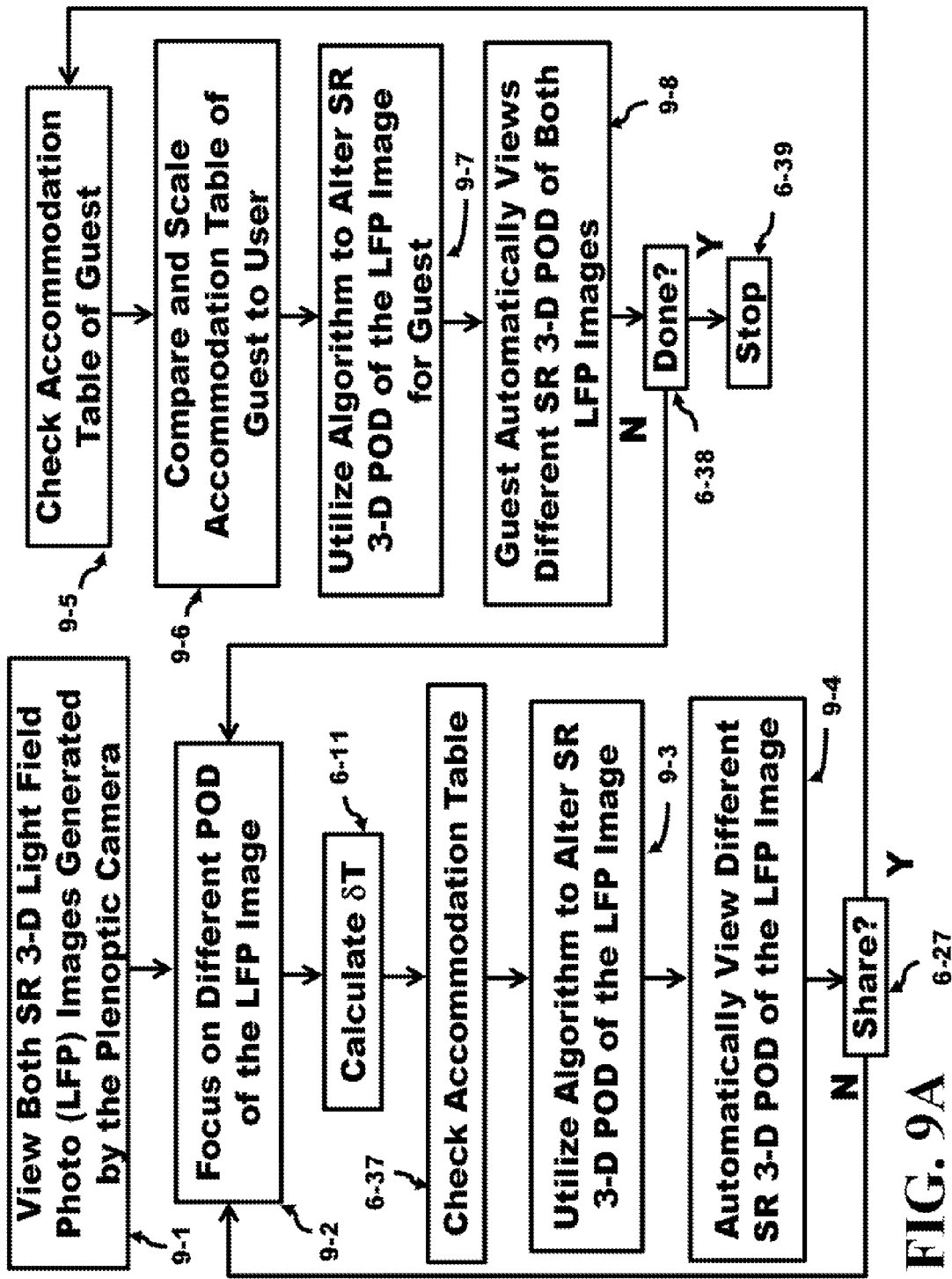
FIG. 9A illustrates a flowchart performing accommodation and sharing images or videos in accordance with this inventive technique.

FIG. 9A presents a flowchart that allows a user to share their images at various PODs with guests. As the user focuses to a different POD, the corresponding LFP image is presented to the guest so that both the user and the guest can view the identical LFP image at a particular POD. This is called sharing an LFP image set to a particular POD by the user. Note that the plenoptic image has a short range (SR) 3-D adjustment when one plenoptic camera is utilized and has a long-range (LR) 3-D stereoscopic adjustment when two plenoptic cameras are utilized. As the user changes the POD, the wireless communication link of the wireless device and the guest's wireless device couples and transfers the newer representation of the POD to the guest.

The process in FIG. 9A begins by viewing both SR 3-D LFP images generated by the plenoptic camera 9-1 where this image can be extracted from memory that can be local, on another smart phone, on the Internet, Intranet, cloud or any servers storing images. The image can also be generated by the user's or guest's plenoptic camera. The user can focus on a different POD of the LFP image 9-2. The accommodation system can be used to measure $\delta T$ 6-11 and the extracted data can be checked against an already existing data in an accommodation table 6-37 that can be stored in an array memory. The processor can then utilize the embedded algorithm to alter the SR 3-D POD of the LFP image 9-3. At this point, the user automatically views the different SR 3-D POD of the LFP image 9-4. The information associated with the different SR 3-D POD image can be shared 6-27 with a guest. The guest receives the data and the SR 3-D POD image and checks the guest's accommodation table 9-5. Then, the guest's microprocessor compares and if necessary scales the accommodation table of the guest's image to the user's image 9-6. The guest's microprocessor utilizes the embedded algorithm to alter the SR 3-D POD of the LFP image for the guest 9-7. Then, the guest can automatically view the different SR 3-D POD of the LIP image which the user currently sees 9-8. If complete or Done 6-38 then stop 6-39; otherwise, return control to the user so the user can focus on a different SR 3-D POD of the LFP image 9-2. Although, FIG. 9A illustrates the user being the master and the guest being the slave, it is also possible for both the user and the guest to be masters such that the image being viewed by both user and guest can be modified by either the user or the guest and shared amongst the two. Each different LFP image are viewed, one by the right eye, the other by the left eye. These LFP images are visually blended together by the viewer's mind to appear as one LFP image to the user showing the SR 3-D POD of the LFP image.

Figure 9B:
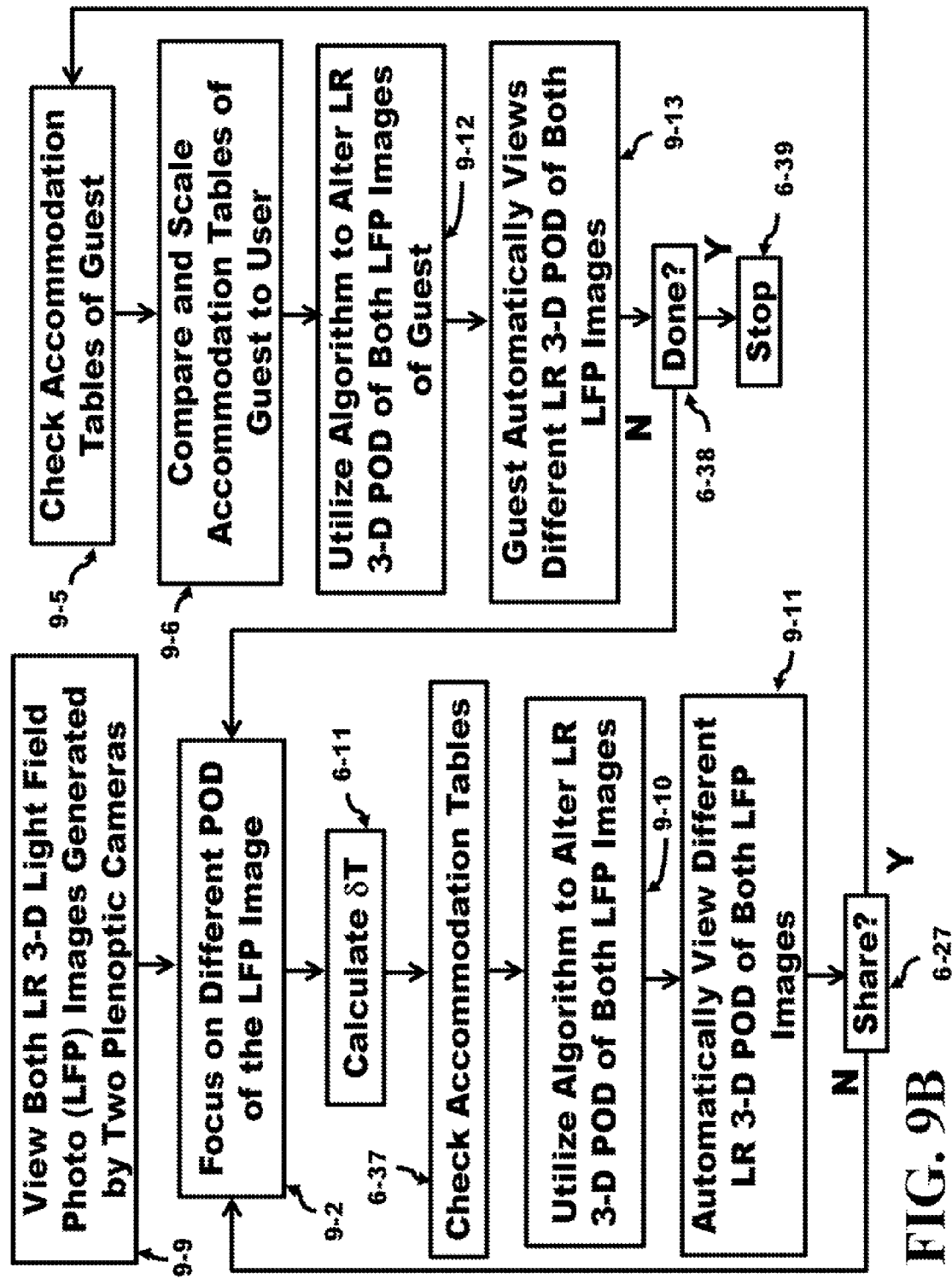
FIG. 9B shows a flowchart performing long range 3-D accommodation and sharing long range 3-D images or long range 3-D videos in accordance with this inventive technique.

The process in FIG. 9B begins by viewing both LR 3-D LFP images generated by two plenoptic cameras 9-9 where this image can be extracted from memory that can be local, on another smart phone, on the Internet, Intranet, cloud or any servers storing images. The image can also be generated by the user's or guest's plenoptic cameras. The user can focus on a different POD of the LFP image 9-2. The accommodation system can be used to measure $\delta T$ 6-11 and the extracted data can be checked against an already existing data in an accommodation table 6-37 that can be stored in an array memory. The processor can then utilize the embedded algorithm to alter the LR 3-D POD of both LFP images 9-10. At this point, the user automatically views the different LR 3-D POD of the LFP image 9-11. The information associated with the different LR 3-D POD image can be shared 6-27 with a guest. The guest receives the data and the LR 3-D POD image and checks the guest's accommodation table 9-5. The guest's microprocessor compares and if necessary scales the accommodation table of the guest's image to the user's image 9-6. Then, the guest's microprocessor utilizes the embedded algorithm to alter the LR 3-D POD of both LFP images for the guest 9-12. The guest can automatically view the different LR 3-D POD of both LFP images 9-13 which the user is currently viewing 9-11. If complete or Done 6-38 then stop 6-39 otherwise, return control to the user so the user can focus on a different LR 3-D POD of the LFP image 9-2. Although, FIG. 9A illustrates the user being the master and the guest being the slave, it is also possible for both the user and the guest to be masters such that the image being viewed by both user and guest can be modified by either the user or the guest and shared amongst the two. Each different LFP image are viewed, one by the right eye, the other by the left eye. These LFP images are visually blended together by the viewer's mind to appear as one LFP image to the user showing the LR 3-D) POD of the LFP image.

Figure 10A:
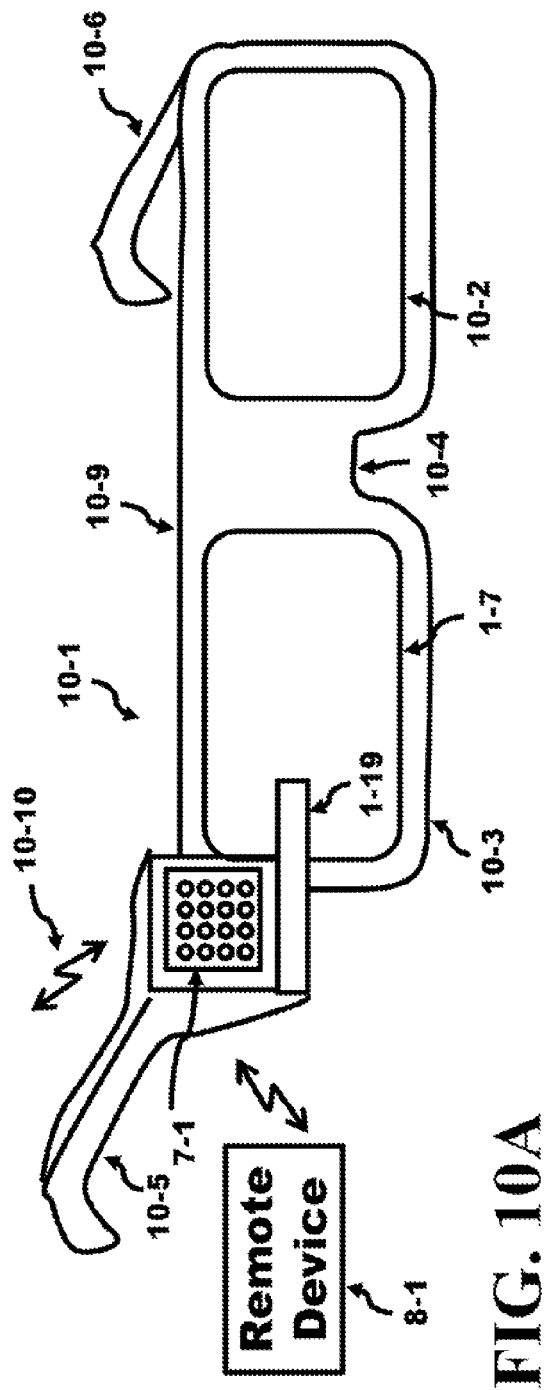
FIG. 10A depicts eyeglasses with one plenoptic camera in communication with a network in accordance with the present invention.

FIG. 10A illustrates glasses 10-1 comprising plenoptic camera 7-1, memory, an accommodation system, and an accommodation test system. The glasses also comprises at least one wireless communication interface 10-10, a primitive keyboard (not illustrated), lenses 1-7 and 10-2, a top frame 10-9 and a lower frame 10-3, if necessary, to hold the lenses, a nose support 10-4, support arms 10-5 and 10-6 that can be set perpendicular to the plane of the frame which holds the eyeglasses in position on the user's head by placing the arms over the top of the ear, a transparent bar 1-19, and an assembly formed within the arm 10-5. The assembly comprises the electronics to operate the glasses, the camera, the remaining portion of the accommodation system, a speaker and earphone (not illustrated), a module for voice recognition, and voice generation (for example, see FIG. 20B and FIG. 21). The glasses can form a wireless communication link with a remote device 8-1 to store or retrieve data from the Internet. The wireless communication link 10-10 is used to communicate locally with other glasses or smartphones. The transparent bar 1-19 feeds data to the accommodation system or accommodation test system. Images or videos can be projected onto the lenses 1-7, 10-2, or both, such that, these images are sent to and focused onto the retina of the eye.

LFP images are shared using devices coupled by a wireless communication network. The devices can take various forms. When the user and the guest share LFP images, the apparatus that the user and the guest use can be varied. For example, the user can use a projection system housed on eyeglasses while the guest can use a projection system housed on eyeglasses, the eye ports of a attachable wireless unit, the eye ports of the smart phone, or the display screen of a smart phone to share and transfer images. Similarly, the guest can use a projection system housed on eyeglasses while the user can use a projection system housed on eyeglasses, the eye ports of a attachable wireless unit, or the eye ports of the smart phone to share and transfer images. These combinations are not exhaustive and other combinations can easily be conceived.

Figure 10B:
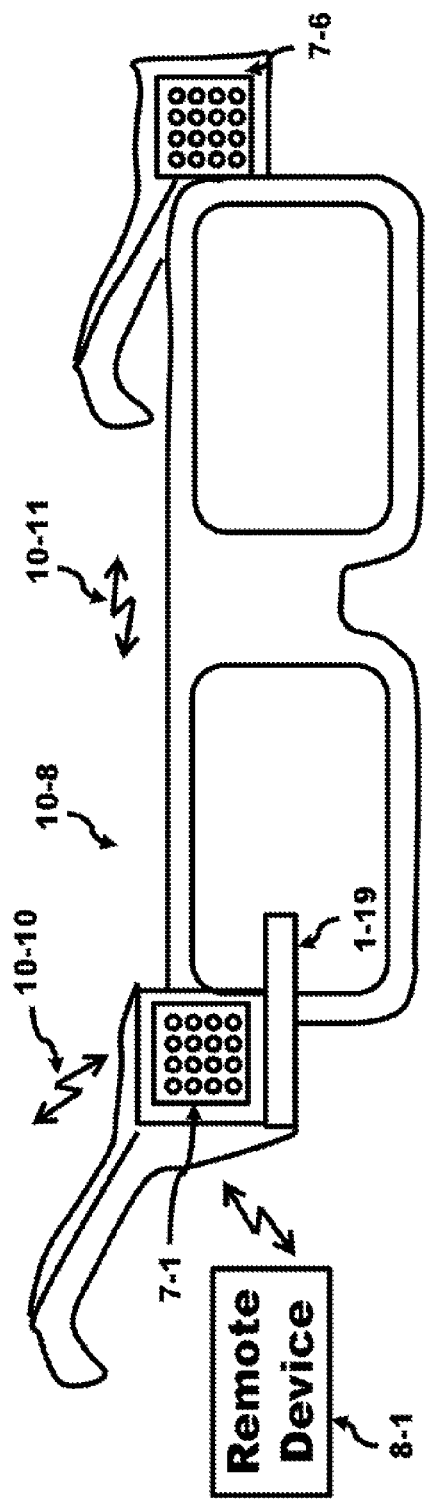
FIG. 10B shows eyeglasses with two plenoptic cameras in communication with a network in accordance with the present invention.

FIG. 10B illustrates glasses 10-8 comprising two plenoptic cameras 7-1 and 7-6, an accommodation system, and an accommodation test system. The glasses also comprises at least one wireless communication interface 10-10, a primitive keyboard (not illustrated), lenses, a top frame and a lower frame to hold the lenses, a nose support, support arms that can be set perpendicular to the plane of the frame of the frame which holds the eyeglasses in position on the user's head by placing the arms over the top of the ear, at least one transparent bar 1-19, and at least one assembly formed within one of the arms. The assembly comprises the electronics to operate the glasses, the camera, the remaining portion of the accommodation system, accommodation test system, a speaker and earphone (not illustrated), a module for voice recognition, and voice generation. The glasses can form a wireless communication link with a remote device 8-1 to store or retrieve data from the Internet. The wireless communication link 10-10 is used to communicate locally with other glasses or smartphones. The transparent bar 1-19 feeds data to the accommodation system or accommodation test system. Images or videos can be projected onto one lens, or both, such that, these images are sent to and focused onto the retina of the eye. A third wireless communication link 10-11 allows communication between the left and right arms. The third wireless communication link 10-11 can be replaced with a wired connection connecting the left and right arms.

Figure 11A:
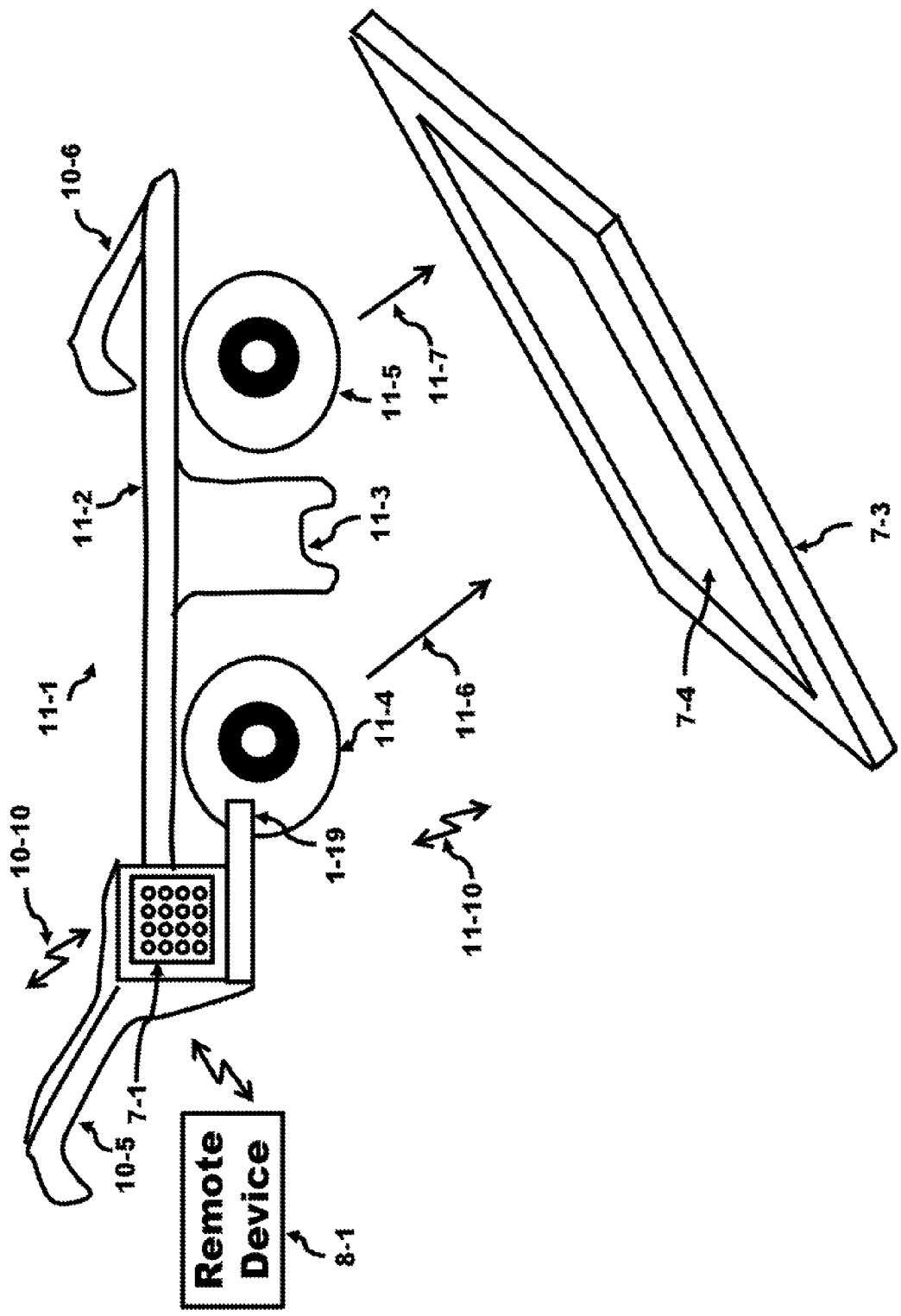
FIG. 11A depicts glasses with one plenoptic camera in communication with a network and visual view of a display screen in accordance with the present invention.

FIG. 11A illustrates a guest using the combination of eyeglasses 11-1 and smart phone 7-3 with a display screen 7-4 to view what the user is sending the guest. The eyeglasses do not have lens but provide a frame 11-2 to hold the transparent material 1-19 to probe the guest's eyes and a wireless interface 10-10 that couples the eyeglasses of the guest to the apparatus associated with the user. The display screen 7-4 of the smart phone 7-3 is coupled to the guests eyeglasses by wireless interconnect 11-10. The guest's right eye 11-4 views 11-6 the image on the display screen of the wireless unit while the guest's left eye 11-5 views 11-7 the image on the display screen 7-4 of the wireless unit 7-3. The glasses contained a frame 11-2 with a nose rest 11-3 and arms 10-5 and 10-6 when open are perpendicular to plane comprising 11-2. An assembly in the arm 10-5 comprises the electronics to operate the glasses, the camera, the remaining portion of the accommodation system, accommodation test system, a speaker and earphone (not illustrated), a module for voice recognition, and voice generation. On the frame 11-2 is a plenoptic camera 7-1 and a transparent bar 1-19. The transparent bar can contain a prism to reflect an incident electromagnetic wave into the right eye 11-4 and then reflect a reflected electromagnetic wave from the eye to a source and detector 1-8 to measure the crystalline lens characteristics of the guest's eye 11-4. The remote device 8-1 can be the Internet, the intranet, the cloud, or any servers that can transfer data to/from the eyeglasses 11-1.

Figure 11B:
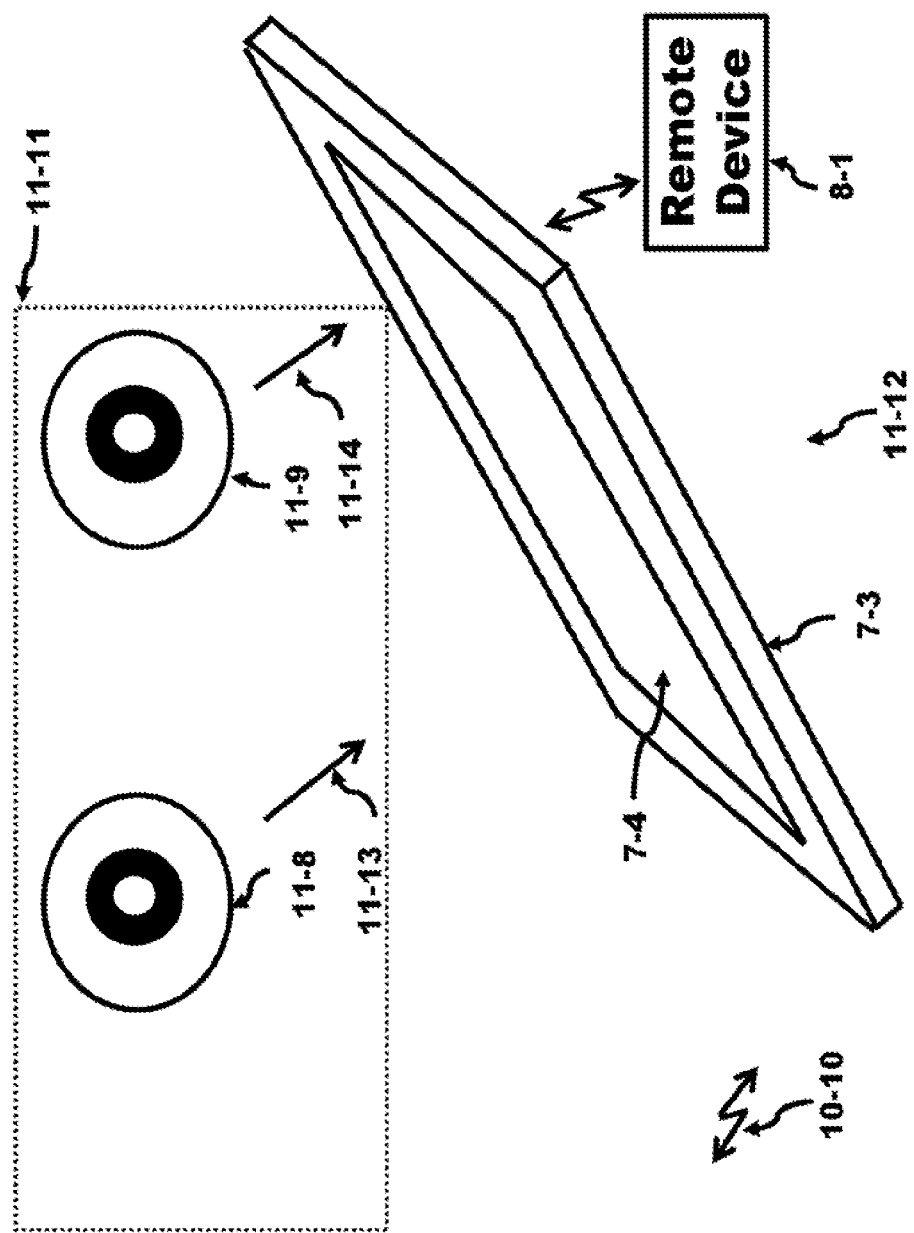
FIG. 11B shows a guest in visual view of a display screen in communication with a network in accordance with the present invention.

FIG. 11B illustrates a guest 11-11 using a display screen 7-4 to view what the user is sending the guest. The wireless interface 10-10 that couples the smart phone 7-3 of the guest to the apparatus associated with the user. The display screen 7-4 of the smart phone 7-3 is viewed by the guest's eyes 11-8 and 11-9. The guest's right eye 11-8 views 11-13 the image on the display screen of the wireless unit 7-3 while the guest's left eye 11-9 views 11-14 the image on the display screen 7-4 of the wireless unit 7-3. The remote device 8-1 can be the Internet, the intranet, the cloud, or any servers that can transfer data to/from the wireless unit 7-3.

Figures 12A, 12B:
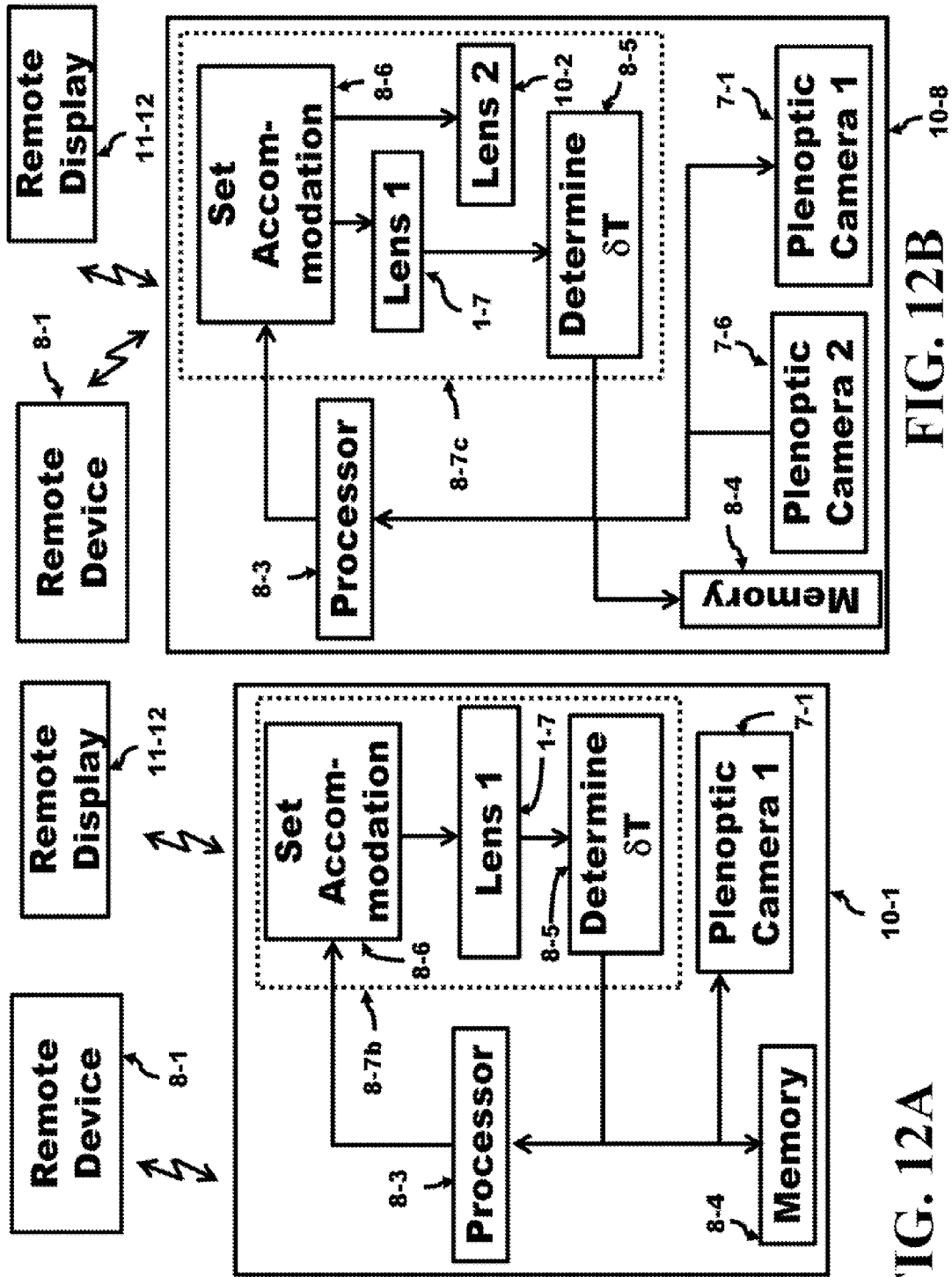
FIG. 12A depicts an example crystalline lens system configured to receive, transmit and display images or videos using one plenoptic camera in accordance with the inventive technique.
FIG. 12B illustrates an example dual crystalline lens system configured to receive, transmit and display images or videos using two plenoptic cameras in accordance with this inventive technique.

FIG. 12A illustrates a user's eyeglasses 10-1 with a plenoptic camera 7-1 that can be coupled to guest's remote display. The eyeglasses 10-1 have an electronics system that comprises a processor 8-3, memory 8-4, and other components (see FIG. 20B and FIG. 21) coupled to an accommodation system 8-7b. The processor 8-3 is also coupled to a memory 8-4 and the plenoptic camera 7-1. The accommodation system 8-7b contains the apparatus to set the accommodation 8-6 which includes the lens 1-7 providing a SR stereoscopic 3-D image that can be focused to different PODs. A source and detector 1-8 associated with the lens is used to determine the δT 8-5. The results of the δT are applied to the processor which then sets the accommodation 8-6. Not illustrated within 10-1 is the wireless communication link coupling the eyeglasses 10-1 to a remote device 8-1. The remote device 8-1 can be the Internet, the intranet, the cloud, or any servers that can transfer data to/from the eyeglasses 10-1. In addition, a wireless communication link is can be established to guest's remote display 11-2. The communication link can be cellular, Wi-Fi, Bluetooth, or any other known wireless standard that can transfer data between two locations.

FIG. 12B illustrates a user's eyeglasses 10-8 comprising two plenoptic cameras 7-1 and 7-6 and two lens 1-7 and 10-2. The eyeglasses 10-8 comprises a processor 8-3 coupled to an accommodation system 8-7c. The processor 8-3 is also coupled to a memory 8-4 and the plenoptic cameras 7-1 and 7-6. The accommodation system 8-7c contains the apparatus to set the accommodation 8-6 which includes two lenses 1-7 and 10-2 providing a LR stereoscopic 3-D image that can be focused to different PODs. Associated with at least lens is the source and detector 1-8 that is used to determine the δT 8-5. The results of the δT are applied to the processor 8-3 which then sets the accommodation 8-6. Not illustrated within 10-8 is the wireless communication link couple coupling the eyeglasses 10-8 to a remote device 8-1. The remote device 8-1 can be the Internet, the intranet, the cloud, or any servers that can transfer data to/from the eyeglasses 10-8. In addition a wireless communication link can be established to guest's remote display 11-12. The communication link can be cellular, Wi-Fi, Bluetooth, wig be, or any other wireless standard that can transfer data between two locations.

Figure 13A:
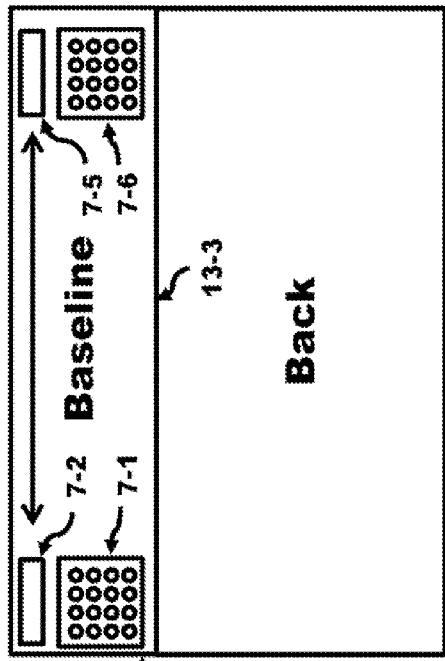
FIG. 13A shows the back of a smart phone (other examples: tablet, notebook, etc.) with an attachable unit with plenoptic camera and eye port in accordance with this inventive technique.
Figure 13B:
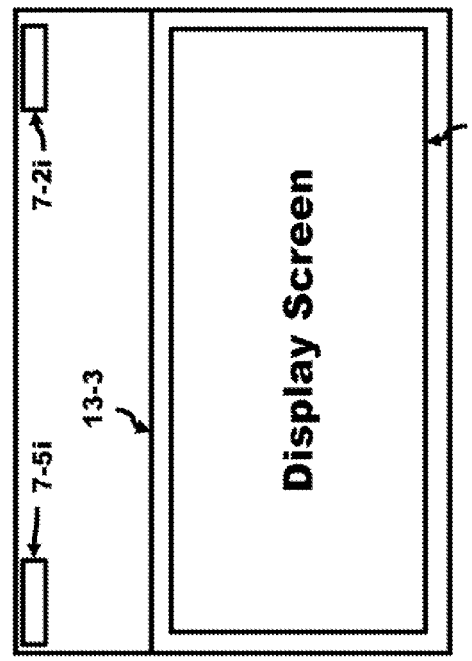
FIG. 13B depicts the front display screen of a smart phone with an attachable unit plenoptic camera and eye port in accordance with the present invention.

FIG. 13A illustrates the back of a smart phone 7-3, for example, a smart phone coupled at an interface 13-3 to a attachable unit 13-4 that contains a plenoptic camera 7-1 and output eye port 7-2. The attachable unit can also be coupled to a smart phone orientated with the front side substituted for the back side. The attachable unit 13-4 can also offer (although not shown) either the camera 7-1 or the eye port 7-2 separately, or the camera 7-1 or the eye port 7-2 on the opposite side. The coupling at the interface 13-3 can be magnetic, electrical, mechanical, wirelessly, or any combination therein. This apparatus allows a smart phone to be coupled to a plenoptic camera. The front of the smart phone 7-3 is presented in FIG. 13B. The display screen 7-4 typically exists on a smart phone 7-3 the interface 13-3 couples the attachable unit 13-4 to the smart phone and contains an input eye port 7-2i. The ability to couple attachable units to a smart phone adds flexibility to the system. The attachable unit coupled to the smart phone can also be used in other situations as shown shortly. These attachable units can contain cameras, eye ports, wireless access, electronics, power supplies, etc. The attachable unit which contains a plenoptic camera 7-1 allows the formation of a SR stereoscopic 3-D image that can be focused to different PODs by an accommodation system. In addition, each eye port can have a far/near button to manually adjust the focus of the LFP image.

Figure 13C:
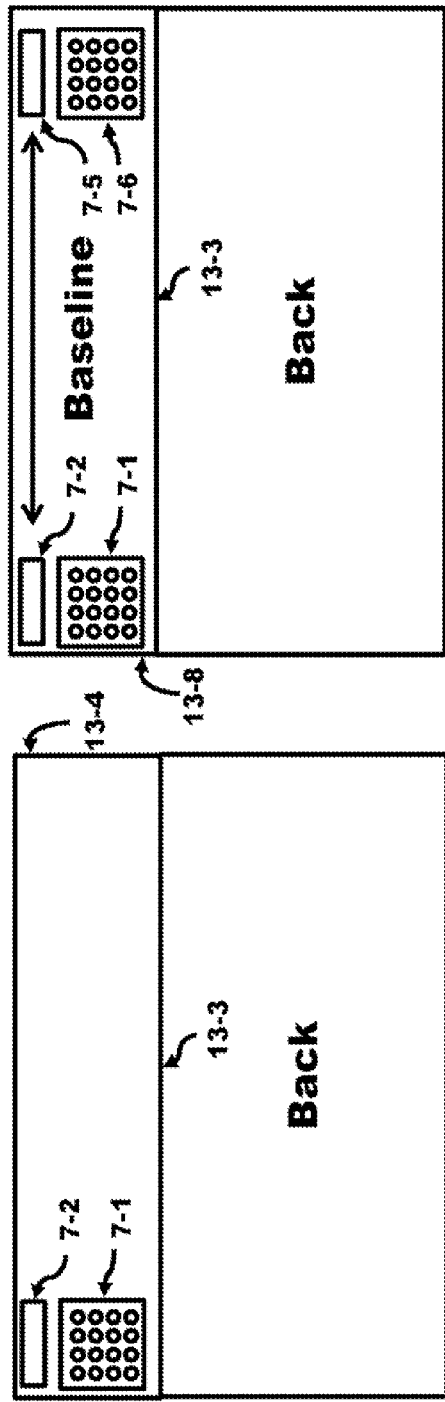
FIG. 13C shows the back of a smart phone with an attachable unit with two plenoptic camera and two eye ports in accordance with the present invention.
Figure 13D:
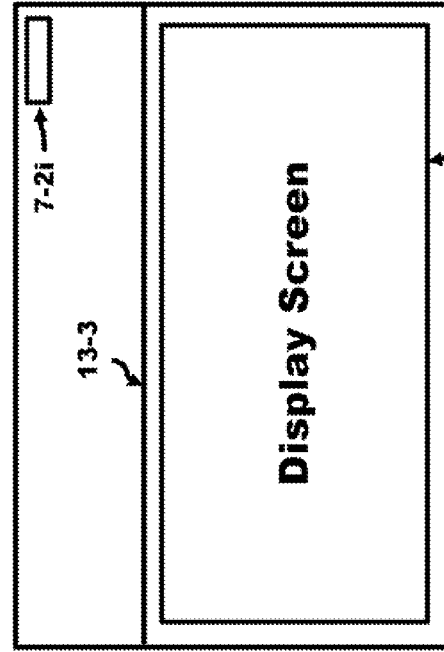
FIG. 13D illustrates the front display screen of a smart phone with an attachable unit with two plenoptic cameras and two eye ports and in accordance with the present invention.

FIG. 13C illustrates the back of a smart phone 7-3, for example, a smart phone coupled at an interface 13-3 to a attachable unit 13-8 that contains two plenoptic cameras (7-1 and 7-6) and two output eye ports (7-2 and 7-5). The attachable unit can also be coupled to a smart phone orientated with the front side substituted for the back side. The baseline distance separation of the plenoptic cameras help to improve the LR stereoscopic 3-D image that can be focused to different PODs. The LR stereoscopic 3-D image improves as the baseline distance increases. The coupling at the interface 13-3 can be magnetic, electrical, mechanical, wirelessly, or any combination therein. A communication link (wireless or wired through the interface 13-3) couples the smart phone to the attachable unit 13-8. This apparatus allows a smart phone to be coupled to two plenoptic cameras. The front of the smart phone 7-3 is presented in FIG. 13D. The display screen 7-4 typically exists on a smart phone 7-3 the interface 13-3 couples the attachable unit 13-4 to the smart phone 7-3 and contains two input eye ports 7-2i and 7-5i. The ability to couple attachable units to a smart phone adds flexibility to the system. The attachable unit attached to the smart phone can also be used in other situations as shown shortly. These attachable units can contain two or more cameras, two or more eye ports, wireless access, electronics, power supplies, etc. The attachable unit which contains two plenoptic cameras 7-1 and 7-5 allows the formation of a LR stereoscopic 3-D image that can be focused to different PODs by an accommodation system. Each eye port can have a far/near button to manually adjust the focus of the LFP image.

Figure 14A:
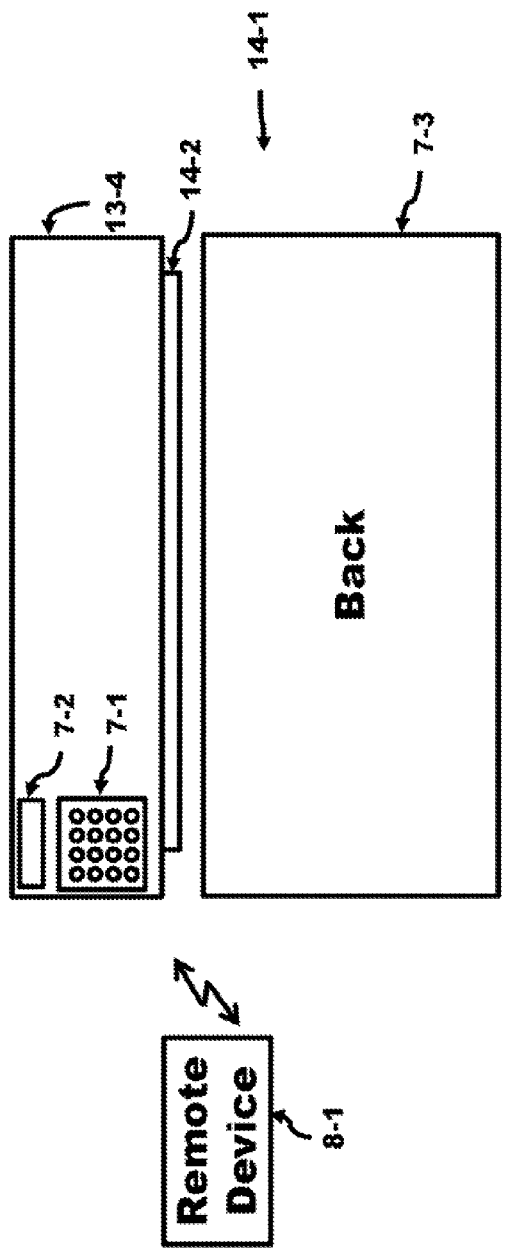
FIG. 14A shows the back of a smart phone and an attachable unit comprising a plenoptic camera and eye port segregated in accordance with the present invention.

FIG. 14A illustrates an apparatus 14-1 with two elements: a smart phone 7-3 and an attachable unit 13-4 with a first mating surface. The top of a smart phone 7-3 has a second mating surface and can be coupled to an attachable unit 13-4 via the mating surfaces. The attachable unit 13-4 contains a plenoptic camera 7-1 and output eye port 7-2. The physical connectivity between 13-4 and 14-3 can be magnetic or mechanical, while the electrical conductivity can be wireless or wired. A communication link (wireless or wired through the interface 13-3) couples the smart phone to the attachable unit 13-4. This apparatus allows a smart phone to be coupled to an external plenoptic camera. The remote device 8-1 can be the Internet, the intranet, the cloud, or any servers that can transfer data to/from the smart phone 7-3. A far/near button (not shown) can be incorporated in the attachable units.

Figure 14B:
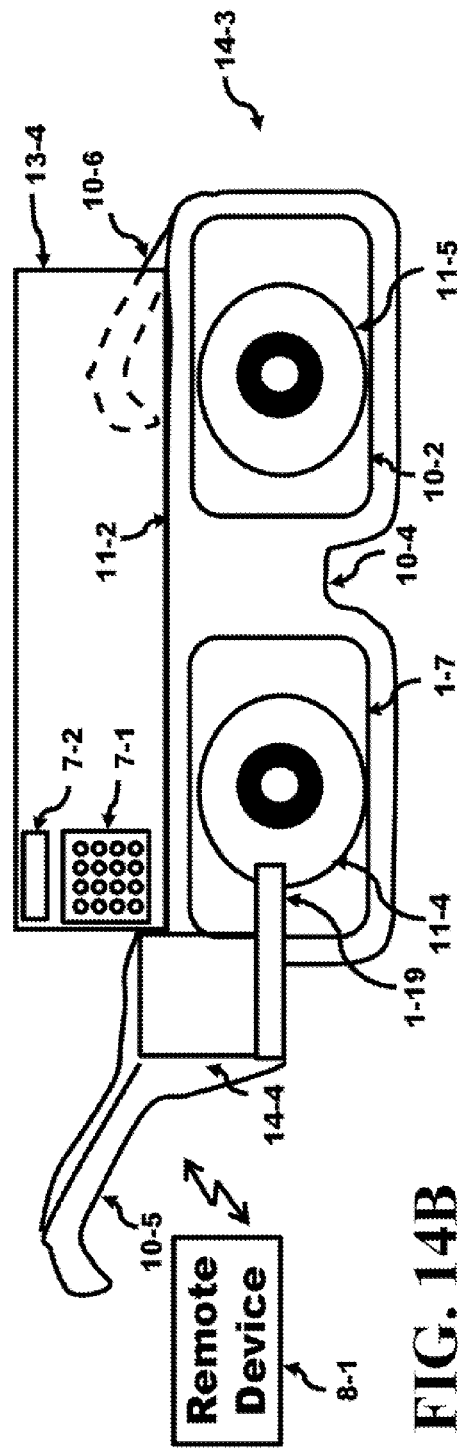
FIG. 14B depicts the attachable unit comprising a plenoptic camera and eye port coupled to eyeglasses in accordance with the inventive technique.

FIG. 14B illustrates the attachable unit 13-4 coupled to the eyeglasses 14-3 using the mating surfaces. The attachable unit 13-4 contains an output eye port 7-2 and a plenoptic camera 7-1. The eyeglasses 14-3 contained a frame 11-2, and nose rest 10-4, lenses 1-7 and 10-2, a transparent material 1-19, electronics 14-4 and two arms 10-5 and 10-6. The eyes of the user are shown as 11-4 and 10-5. The attachable device 13-3 coupled to the eyeglasses 14-3 introduces the plenoptic camera to the eyeglasses. The physical connectivity between 13-4 and 14-3 can be magnetic or mechanical, while the electrical conductivity can be wireless or wired. The remote device 8-1 can be the Internet, the intranet, the cloud, or any servers that can transfer data to/from the smart eyeglasses 14-3. A far/near button (not shown) can be incorporated in the attachable units.

FIG. 15A illustrates an apparatus 15-1 with two elements: a smart phone 7-3 and an attachable unit 13-8. The top, or for that matter any side, of a smart phone 7-3 can be coupled to an attachable unit 13-8. The attachable unit 13-8 contains two plenoptic cameras is (7-1 and 7-6) and two output eye port (7-2 and 7-5). A coupling interface 14-2 can be magnetic, electrical, mechanical, wirelessly, or any combination therein. This apparatus allows a smart phone to be coupled to a plurality of plenoptic cameras. Not illustrated within 13-8 is the wireless communication link couple coupling the attachable unit 13-8 to a remote device 8-1. The remote device 8-1 can be the Internet, the intranet, the cloud, or any servers that can transfer data to/from the attachable unit 13-8. The communication link can be cellular, Wi-Fi, Bluetooth, or any other known wireless standard that can transfer data between two locations.

FIG. 15B illustrates the attachable unit 13-8 coupled to the eyeglasses 15-4. The attachable unit 13-8 contains and two output eye port (7-2 and 7-5) and two plenoptic cameras (7-1 and 7-6). The eyeglasses contained a frame, and nose rest 10-4, and two arms. The eyes of the user are shown as 11-4 and 10-5. The attachable device 13-8 coupled to the eyeglasses 15-4 introduces the plenoptic camera to the eyeglasses. Furthermore, the eye ports are aligned with the pupils of the user's eyes 11-4 and 11-5. Thus, the attachable unit can be coupled to an eyeglass frame and allow the user to view a LR stereoscopic 3-D image that can be focused to different PODs. The accommodation system in at least one of the eye ports is not shown. The physical connectivity between 13-8 and 15-4 can be magnetic or mechanical, while the electrical conductivity can be wireless or wired. Not illustrated within 13-8 is the wireless communication link coupling the attachable unit 13-8 to a remote device 8-1. The remote device 8-1 can be the Internet, the intranet, the cloud, or any servers that can transfer data to/from the attachable unit 13-8. The communication link can be cellular, Wi-Fi, Bluetooth, wig be, or any other wireless standard that can transfer data between two locations. The attachable unit which contains two plenoptic cameras 7-1 and 7-5 allows the different PODs are focused by an accommodation system. Each eye port can have a far/near button to manually adjust the focus of the LFP image.

Figure 16:
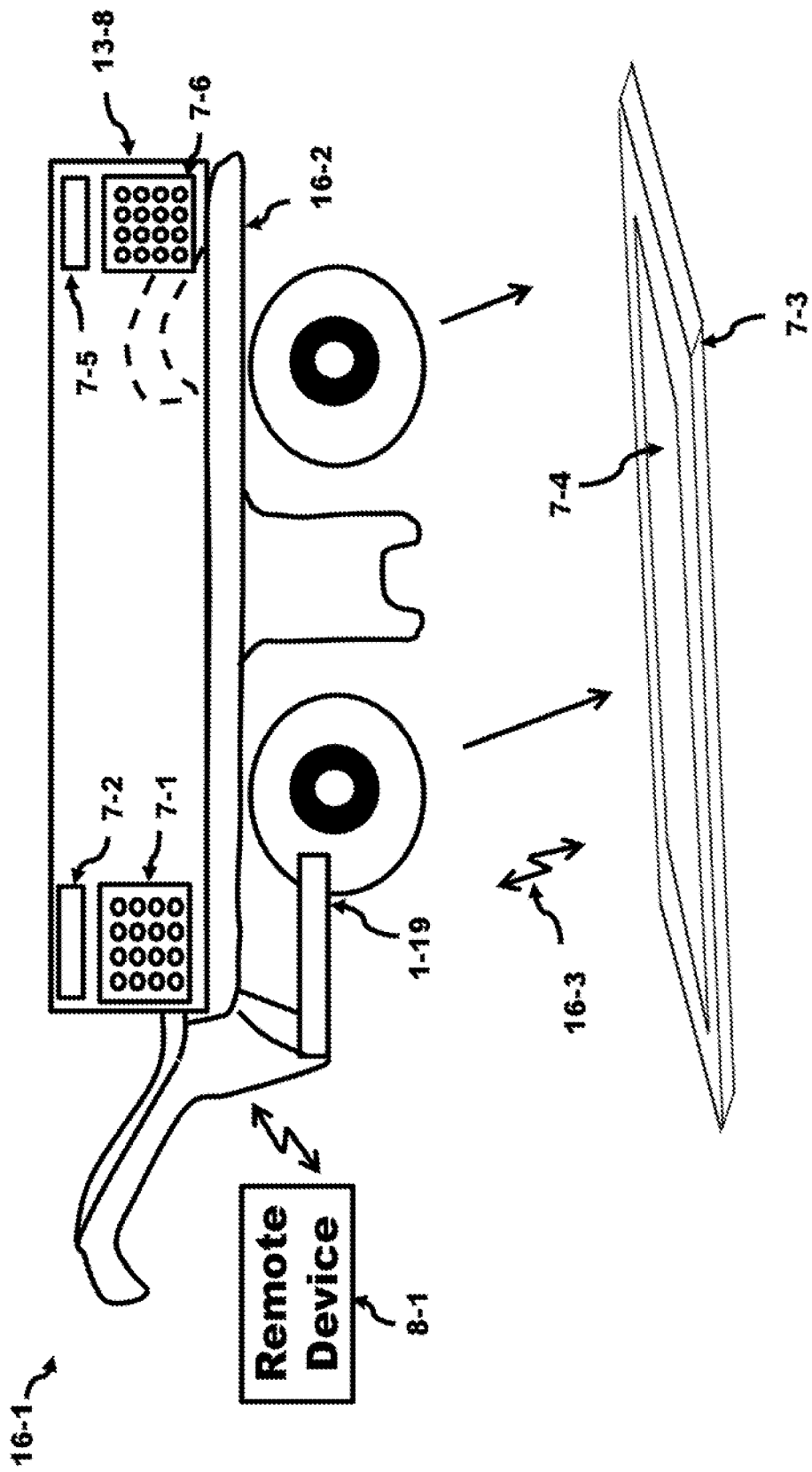
FIG. 16 depicts the attachable unit comprising two plenoptic cameras and two eye ports coupled to eyeglasses with user viewing a display screen in accordance with the present invention.

FIG. 16 illustrates eyeglasses 16-1 the attachable unit 13-8 coupled to the top frame 16-2 of the eyeglasses. The eyeglasses do not contain lenses but instead view the display screen 7-4 of a smart phone 7-3. The transparent material 1-19 is coupled to the glasses 16-1. The transparent material can perform the accommodation test. The attachable unit 13-8 contains two plenoptic cameras 7-1 and 7-6 and two eye ports 7-2 and 7-5. A wireless communication link 16-3 exists between the eyeglass 16-1 and all smart phones 7-3. The remote device 8-1 is wirelessly coupled to the Internet, the intranet, the cloud, or any servers that can transfer data to/from the attachable unit 13-8. The communication link can be cellular, Wi-Fi, Bluetooth, or any other known wireless standard that can transfer data between two locations. The remote device 8-1 is also coupled to the eyeglasses 16-1. The display screen 7-4 offers a SR stereoscopic 3-D image that can be focused to different PODs to the user.

Figure 17A:
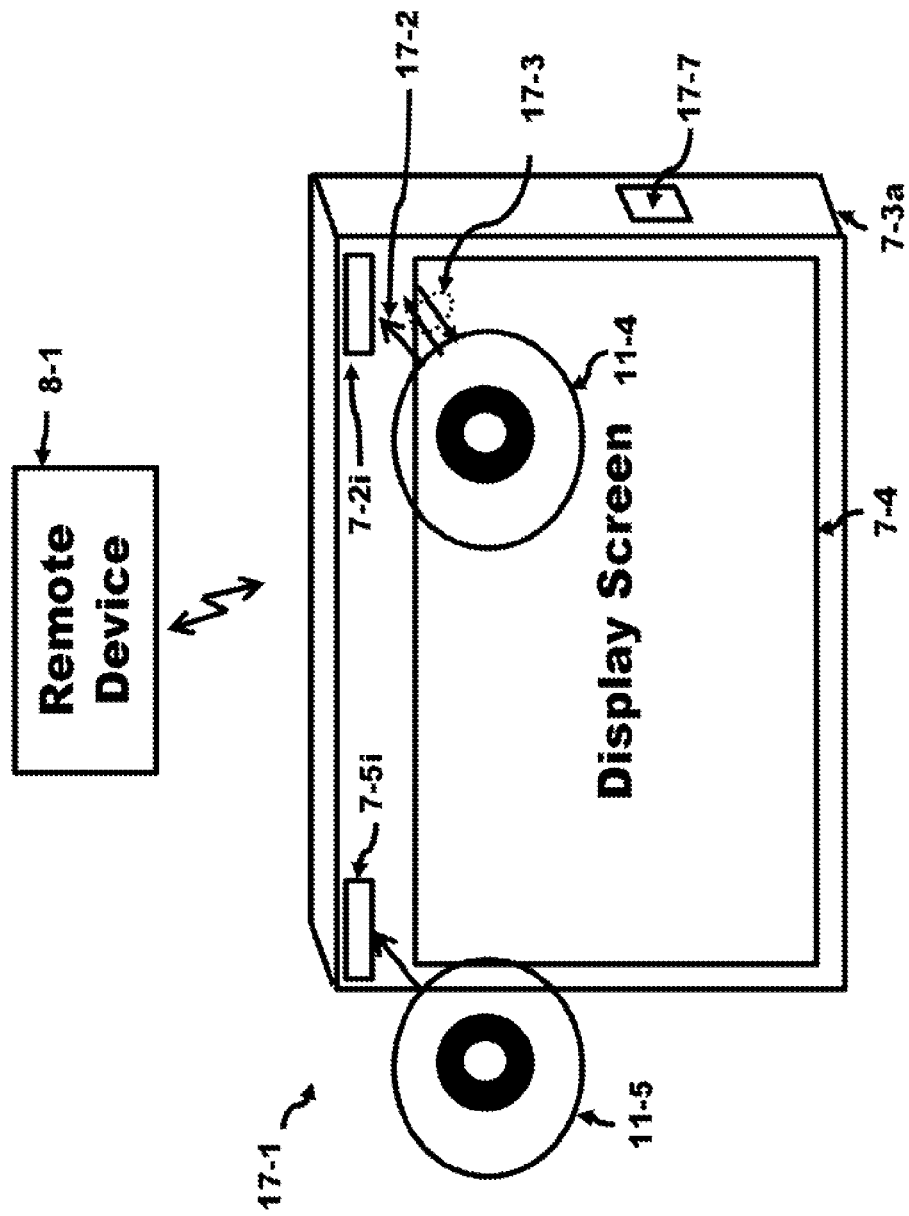
FIG. 17A illustrates a smart phone (other examples: tablet, notebook, etc.) with user viewing through two eye ports in accordance with the present invention.

FIG. 17A illustrates an apparatus 17-1 comprising a remote device 8-1 which is wirelessly coupled to a smart phone 7-3a. The smart phone 7-3a comprises a display screen 7-4 and two input eye ports 7-5i and 7-2i separated by a first baseline. A user can place their left eye 11-5 over the left input eye port 7-5i and the right eye 11-4 over the right input eye port 7-2i. Each input eye port can have a corresponding output eye port on the far side of the device aligned with the input eye port, although this situation is not required. Instead, the user can view an LFP image or LFP videos captured by at least two plenoptic cameras separated by a second baseline on the opposite side of the remote device. These LFP images can also be obtained after being stored in memory, either on the device or accessible via the remote device 8-1. Or, the user can view LFP images generated by others and accessible via the remote device 8-1 or another wireless interface not shown. The optic axis 17-2 of the right eye 17-3 allows the user to view a miniature display screen within the input eye port 7-21. The miniature display screen can be formed from an LCD array or an LED array and focuses the image on the retina of the user's eyes. The incident and reflected electromagnetic radiation 17-3 is generated by the source and detect unit 1-8 located inside the input eye port 7-2i. The results of the source and detector 1-8 are part of the accommodation system which is used to measure the accommodation of the right eye so that the image can be focused to different POD's. In place of the accommodation system, a far/near button 17-7 can be used manually to adjust the focus of the plurality of PODs. A second button (not shown) can be used to adjust for any differences between the left and the right eye. For instance, the far/near button adjusts the LFP image either towards a POD that is farther away or nearer for the right eye (assuming the left eye is identical, then nothing more needs to be done). The second button only "fine" adjusts the far/near for the left eye in case, the left eye is not the same as the right eye. As the user views the left and right eye ports, the far/near button 17-7 provides a signal to an electronics system 20-12 which uses the embedded algorithm to focus the LFP image to various PODs. A memory can store the left and the right LFP image from the left and the right plenoptic cameras, respectively. The electronics system 20-12 extracts the left and the right LFP image from memory and presents the left and the right LFP image to a left and a right input eye port, respectively. These images can also be shared with a guest via a wireless interface. The guest can view the varying focused LFP image as the user alters the POD. The remote device 8-1 is wirelessly coupled to the Internet, the intranet, the cloud, or any servers that can transfer data to/from the smart phone 7-3a. The communication link can be cellular. Wi-Fi, Bluetooth, or any other known wireless standard that can transfer data between two locations. The remote device 8-1 is coupled to the smart phone 7-3a. The display screen 7-4 offers a SR stereoscopic 3-D image that can be focused to different PODs for the user, or a projection system in each of the left and the right input eye ports focuses the left and the right LFP image onto the retina of a corresponding left and right eye ports 7-5i and 7-2i to present a LR stereoscopic 3-D image that can be focused to different PODs by the user. The embedded algorithm applies the time difference in propagation delay in an electronic system to focus the LFP image from the focused plane at the first POD to the second unfocused plane of the LFP image selected from the remaining plurality of PODs. A wireless interface couples the focused LFP images at the first POD to a second portable wireless unit. Another projection system in each of the left and the right input eye ports of the second unit projects the focused LFP images at the first POD onto the retina of a corresponding left and right eye of a guest.

Figure 17B:
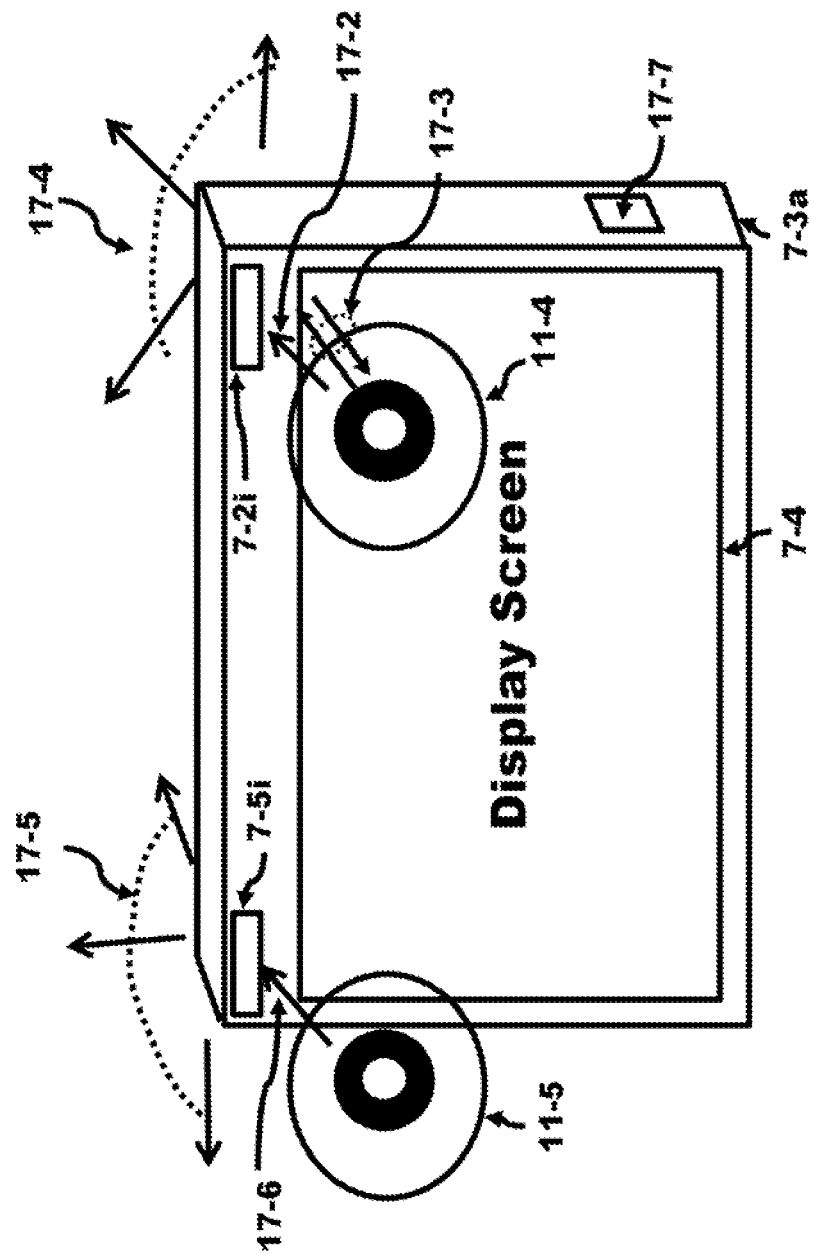
FIG. 17B depicts a smart phone with user viewing through two eye ports to two plenoptic cameras in accordance with the present invention.

FIG. 17B illustrates a smart phone 7-3a. The smart phone 7-3a comprises a display screen 7-4, two input eye ports 7-5i and 7-2i, and two plenoptic cameras on the far side. A user can place their left eye 11-5 over the left input eye port 7-5i and the right eye 11-4 over the right input eye port 7-2i. The optic axis 17-2 of the right eye 11-4 viewing through the right input eye port 7-2i allows the user to view a FOV 17-4 via a corresponding output eye port (not shown) on the opposite side of the device 7-3a and the optic axis 17-6 of the left eye 11-5 viewing through the left input eye port 7-5i allows the user to view a FOV 17-5 via a corresponding output eye port (not shown) on the opposite side of the device 7-3a. The FOV can be the LFP images supplied by the plenoptic cameras or the LFP images form memory. The miniature display screen can also be formed from an LCD array or an LED array inside the input eye ports to display the images obtained from the plenoptic cameras (not shown) on the back side of the smart phone 7-3a. The incident and reflected electromagnetic radiation 17-3 is generated by the source and detector 1-8 located inside the input eye port 7-5i. The results of the source and detector 1-8 are part of the accommodation system which is used to measure the accommodation of the right eye so that the image can be focused to different POD's. In place of the accommodation system, the far/near button 17-7 provides a signal to an electronics system which uses the embedded algorithm to focus the LFP image to various PODs. As the user views the left and right eye ports, the far/near button can be used focus the LFP image to various PODs. These images can also be shared with a guest via a wireless interface. The display screen 7-4 offers a SR stereoscopic 3-D image that can be focused to different PODs for the user, while the eye ports 7-5i and 7-2i present a LR stereoscopic 3-D image that can be focused to different PODs by the user.

These images in FIG. 17B can be presented to the user in one of several modes. One mode is for the plenoptic cameras to capture these images and feed them directly to the miniature display screen. Another mode is for the plenoptic cameras to capture these images and store them into memory to be further processed before presenting them to the miniature display screen. For instance, a processor can be used to post-process the images before presentation, for example, to account for baseline length differences between the input eye ports and the plenoptic cameras. Yet, another case is to post-process previously captured images that were stored in memory, combine these images with the newly captured images of the output eye ports and present the combined image to the miniature display screen for the user to view. Another mode is to extract and show previously captured images or videos from memory and display these images on the miniature display screen.

Figure 18A:
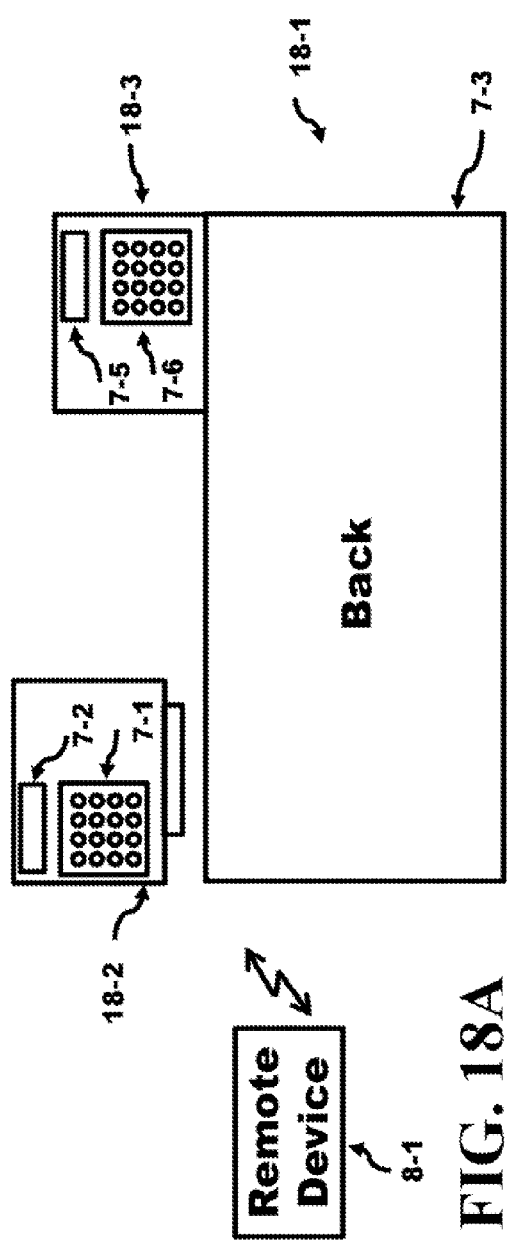
FIG. 18A illustrates the back of a smart phone and two attachable units each comprising a plenoptic camera and an eye port, one in contact and the other segregated from the wireless unit in accordance with the present invention.

FIG. 18A illustrates an apparatus 18-1 comprising a smart phone 7-3 and two attachable units 18-2 and 18-3. The back of the smart phone is indicated (opposite the display screen) but the smart phone can be flipped to show the front side and still be used in the same manner. The attachable unit 18-2 comprises a plenoptic camera 7-1 and an eye port 7-2 while the attachable unit 18-3 comprises a plenoptic camera 7-6 and eye port 7-5. The first attachable unit 18-2 has a first mating surface, the smart phone 7-3 has a plurality of mating surfaces, and the second attachable unit 18-3 has a second mating surface. The first mating surface and the second mating surface are coupled to one of the plurality of mating surfaces of the smart phone 7-3. The size of these attachable units is reduced when compared to the previous attachable units. At least one of these attachable units comprises a source and detector unit 1-8, an accommodation test system, and an accommodation system. The attachable units are capable of directly communicating with the remote device 8-1 or indirectly communicating through the smart phone 7-3. The user can look through the eye ports and focus the LFP image to various POD's since at least one of the attachable units comprises a source and detector 1-8 and an accommodation test system which is used to measure the accommodation of the eyes so that the image can be focused to different POD's. The remote device 8-1 is wirelessly coupled to the Internet, the intranet, the cloud, or any servers that can transfer data to/from the attachable unit 18-2, 18-3 and the smart phone 7-3. The communication link can be cellular, Wi-Fi, Bluetooth, or any other known wireless standard that can transfer data between two locations.

Figure 18B:
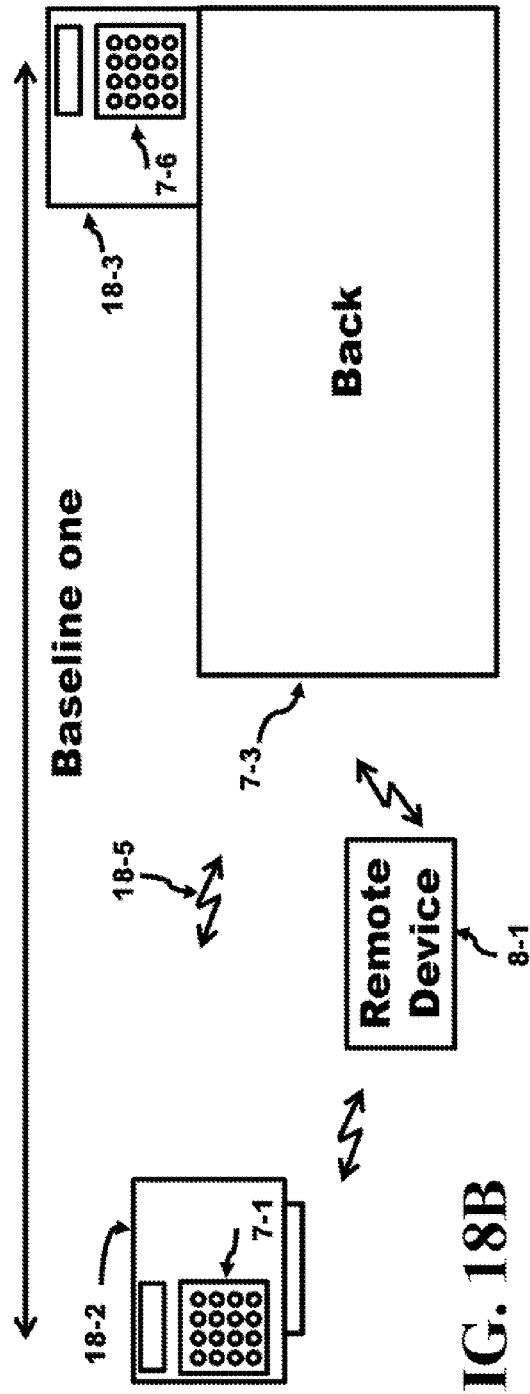
FIG. 18B depicts the back of a smart phone and two attachable units each comprising a plenoptic camera and an eye port, one in contact and the other segregated from the wireless unit by a distance and wirelessly connected to wireless unit in accordance with the inventive technique.

FIG. 18B illustrates the system of FIG. 18A with the exception that that at attachable unit 18-2 has been moved a greater distance than the width of the smart phone 7-3. This distance is shown as baseline one distance and offers the ability of the LFP images detected by the plenoptic cameras 7-1 in attachable unit 18-2 and 7-6 in attachable unit 18-3 to develop a larger range of stereoscopic 3-D images that can be focused to different PODs for the user. The attachable unit 18-2 has a wireless interface to/from the smart phone. The remote device 8-1 in FIG. 18A and FIG. 18B are wirelessly coupled to the Internet, the intranet, the cloud, or any servers that can transfer data to/from the attachable units 18-2, 18-3, or the smart phone 7-3. The communication link can be cellular, Wi-Fi, Bluetooth, or any other known wireless standard that can transfer data between two locations. The remote device 8-1 is coupled to the smart phone 7-3.

FIG. 19A illustrates the system 19-1 of FIG. 18B with the exception that that at both attachable units 18-2 and 18-3 has been moved a greater distance than the width of the smart phone 7-3. This distance is shown as baseline two distance which is greater than baseline one distance and offers the ability of the LFP images detected by the plenoptic cameras 7-1 and 7-6 to develop an even larger range of stereoscopic 3-D images that can be focused to different PODs for the user. The remote device 8-1 is wirelessly coupled to the Internet, the intranet, the cloud, or any servers that can transfer data to/from the attachable units 18-2, 18-3, or the smart phone 7-3. The communication link can be cellular, Wi-Fi, Bluetooth, or any other known wireless standard that can transfer data between two locations. The remote device 8-1 is coupled to the smart phone 7-3. Both attachable units 18-2 and 18-3 are wirelessly coupled to the smart phone 7-3. The attachable unit 18-2 can communicate via wireless link 19-2 to the attachable unit 18-3.

FIG. 19B illustrates an apparatus 19-3 where the attachable units 18-2 and 18-3 are coupled to an eyeglass frame 19-5. In one case, the attachable unit 18-3 is coupled to the top of the frame 19-5 while the attachable unit 18-2 is flipped and coupled to the front of the frame 19-5. The eye port 7-2 overlays the left eye. The incident and reflected electromagnetic radiation is generated by a source and detect unit 1-8 located inside the input eye port 7-2. The results of the source and detector 1-8 are part of the accommodation test system which is used to measure the accommodation of the left eye and an accommodation system so that the image can be focused to different POD's. The transparent material 1-19 is coupled to an accommodation system which is used to measure the accommodation of the right eye so that the image can be focused to different POD's. This is a potential system for adjusting each eye individually. The remote device 8-1 is coupled to the eyeglasses 19-3. The communication link 19-4 couples the attachable units together.

FIG. 20A illustrates a possible block diagram for the smart phone along with some components, both internal or external, that perform the function of focusing an LFP image to different PODs. The processor 8-3 couples to all of the major components presented within the smart phone. A voice recognition 20-1 can detect spoken words or generate spoken words. An accelerometer 20-2 can be used by the smart phone to determine movement. A touchscreen 20-3 can be used to enter data into the smart phone. A wireless interface 20-4 interfaces the smart phone to the external world by a communication network. A first plenoptic camera 7-1 is coupled to the processor, and earphone and speaker 20-5 can be used to listen privately or listen in a conference mode. A display screen 7-4 fills a large portion of one side of the smart phone and this particular portion is where the physical keypad is presented to the user via the touchscreen 20-3. A bus 20-6 interfaces the processor 8-3 to memory 8-4. It also interfaces to a communication link 20-8 which can be a secondary way in and out of the chip to the communication network. The memory 8-4 can be subdivided into different memories and or located off chip through the communication link 20-8. The accommodation test system 20-7*a* is used to measure the accommodation of the eye so that an accommodation table can be generated. The accommodation table is used in the accommodation system 20-7*b* to focuses the LFP image to a different POD's. A second plenoptic camera 7-6 is coupled to the processor. The first plenoptic camera 7-1 and the second plenoptic camera 7-6 are at the periphery of one side of the smart phone, preferably near opposing sides of the display screen 7-4. The distance between the first plenoptic camera 7-1 and the second plenoptic camera 7-6 is called the first baseline and additional cameras can be coupled to the processor and placed such that they surround the display screen 7-4 to perform additional features. A first eye port 20-10 can be viewed by the user since the eye port contains a projection system (LCD, LED, Laser projection, etc.) that focus the image on the surface of the retina of a first eye. A second eye port 20-11 can be viewed by the user since the eye port contains a projection system (LCD, LED, Laser projection, etc.) that focus the image on the surface of the retina of a second eye. One or both of the eye ports may contain the accommodation test system and accommodation system to initialize and/or adjust the POD of the captured LFP image. The computer algorithm is embedded in the electronics system 20-12 illustrated in FIG. 21.

Figure 20B:
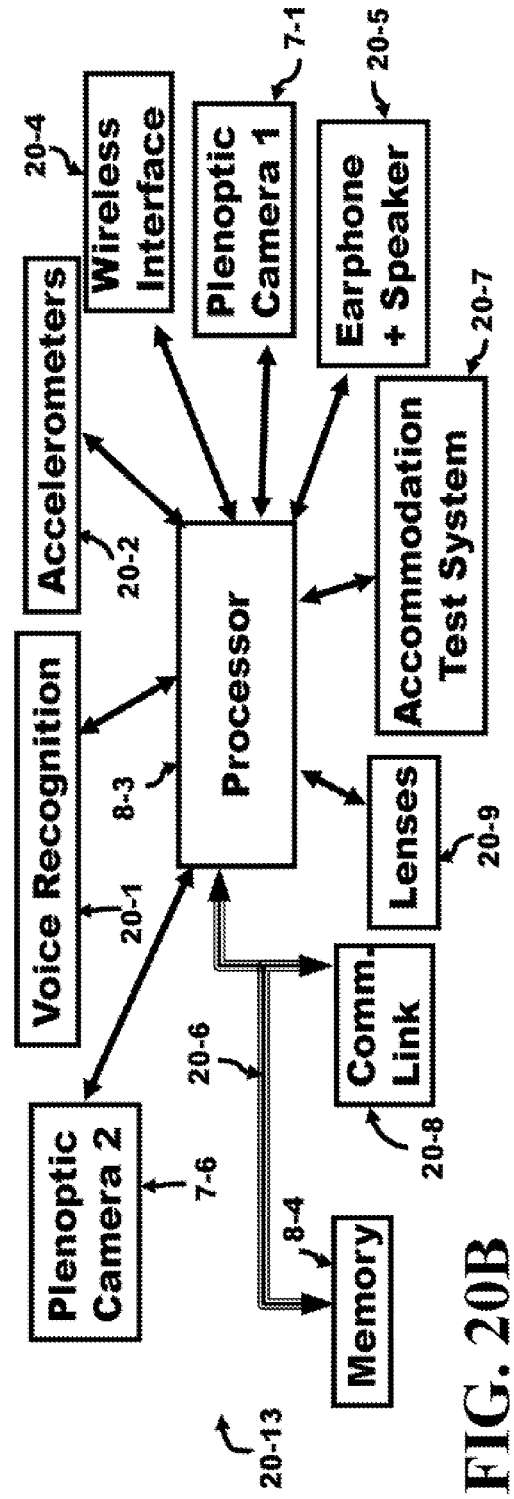
FIG. 20B shows a block diagram of an eyeglass in accordance with this inventive technique.
Figure 21:
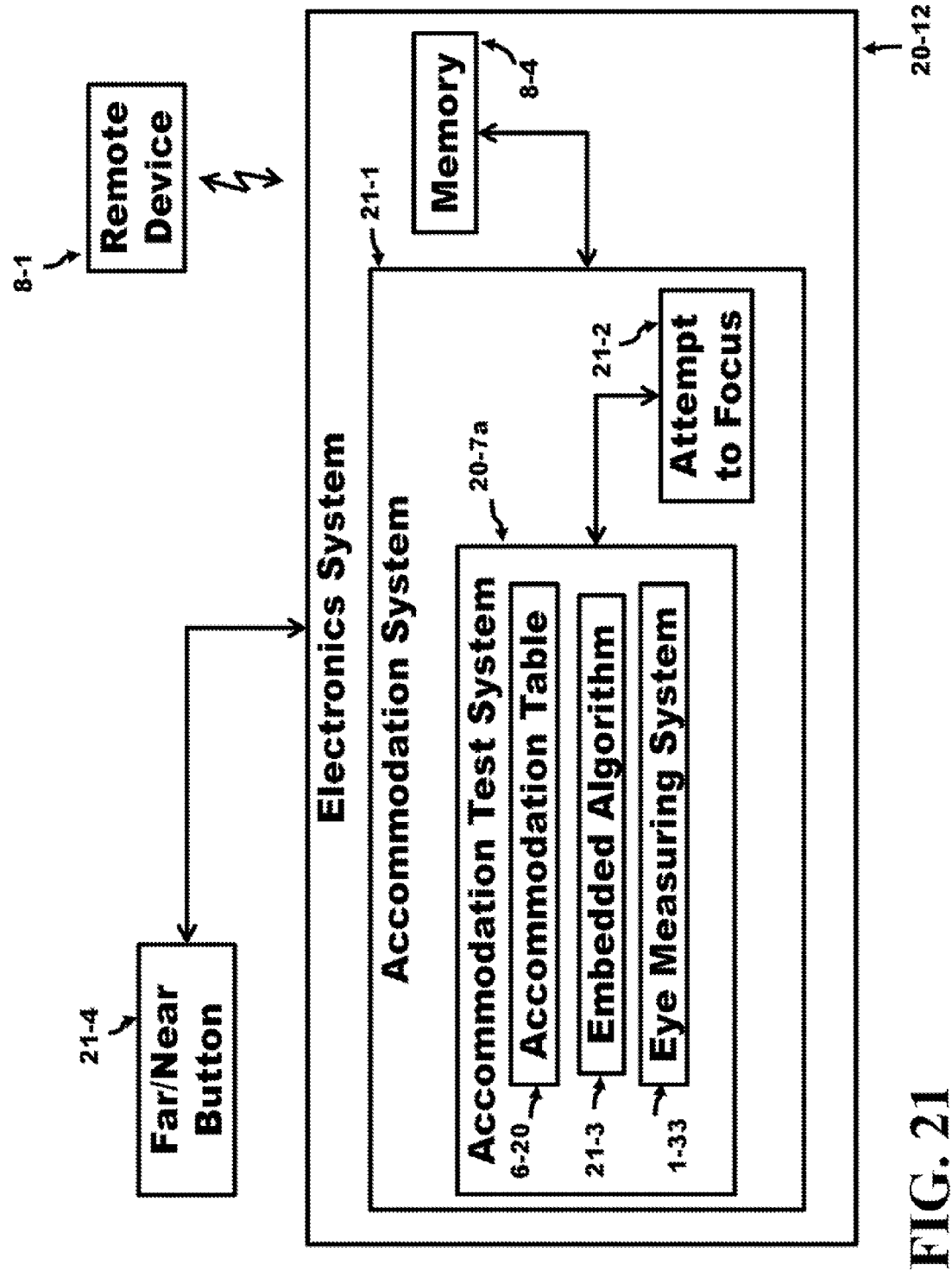
FIG. 21 shows a hierarchal block diagram of an Electronics System in accordance with this inventive technique.

FIG. 20B illustrates a possible block diagram for the eyeglasses along with some components, both internal or external, that perform the function of focusing an LFP image to different PODs. The processor 8-3 couples to all of the major components presented within the eyeglasses. A voice recognition 20-1 can detect spoken words or generate spoken words. An accelerometer 20-2 can be used by the eyeglasses to determine movement. A wireless interface 20-4 interfaces the eyeglasses to the external world by a communication network. A first plenoptic camera 7-1 is coupled to the processor, and earphone and speaker 20-5 can be used to listen privately or listen in a conference mode. The accommodation test system 20-7 is used to measure the accommodation of the eye. An accommodation system (not shown) is used to focus the LFP image to different POD's. Lenses 20-9 can be used in the eyeglasses. A bus 20-6 interfaces the processor 8-3 to memory 8-4. It also interfaces to a communication link 20-8 which can be a secondary way in and out of the chip to the communication network. The memory 8-4 can be subdivided into different memories and or located off chip through the communication link 20-8. A second plenoptic camera 7-6 is coupled to the processor. The first plenoptic camera 7-1 and the second plenoptic camera 7-6 are at the periphery of one side of the smart phone, preferably near opposing sides of the display screen 7-4. The distance between the first plenoptic camera 7-1 and the second plenoptic camera 7-6 is called the baseline distance and additional cameras can be coupled to the processor and placed such that they surround the display screen 7-4 to perform additional features.

FIG. 21A illustrates a block diagram for an Electronics System 20-12 in a portable wireless unit. The Electronics System 20-12 comprises a memory 8-4 that can be in the portable unit or shared between a remote device 8-1 and an Accommodation System 21-1. The Accommodation System 21-1 where a flowchart was illustrated in FIG. 6B comprises the Accommodation Test System 20-7a (a flowchart was illustrated in FIG. 6A) and an "Attempt to Focus" block 21-2. This Accommodation System 21-1 focuses an LFP image to a different POD by measuring the parameters of the eye via the Eye Measuring System 1-33. The Accommodation Test System 20-7a generates the Accommodation Table 6-20 using the Embedded Algorithm 21-3 and the Eye Measuring System 1-33. The Embedded Algorithm 21-3 alters the LFP image from a first POD to a second POD. Several different algorithms are known in the art to perform the embedded algorithm. The Eye Measuring System 1-33 uses a source and a detector 1-8 of electromagnetic radiation to measure the total flight path of the electromagnetic radiation propagation. The Embedded Algorithm 21-3 and the Eye Measuring System 1-33 are used to generate the Accommodation Table 6-20 via the Accommodation Test System 20-7a. Once the Accommodation Table 6-20 is generated, the Accommodation System 21-1 can be used to re-focus the LFP image at the original POD into a new LFP image that is focused at a new POD after the eye Attempts to Focus 21-2 on an unfocused plane containing the new LFP image at the new POD. A far/near button 21-4 is coupled to the electronics system to override the eye measuring system 1-33, if used. The far/near button 21-4 performs a manual control of the LFP focus.

Figure 22:
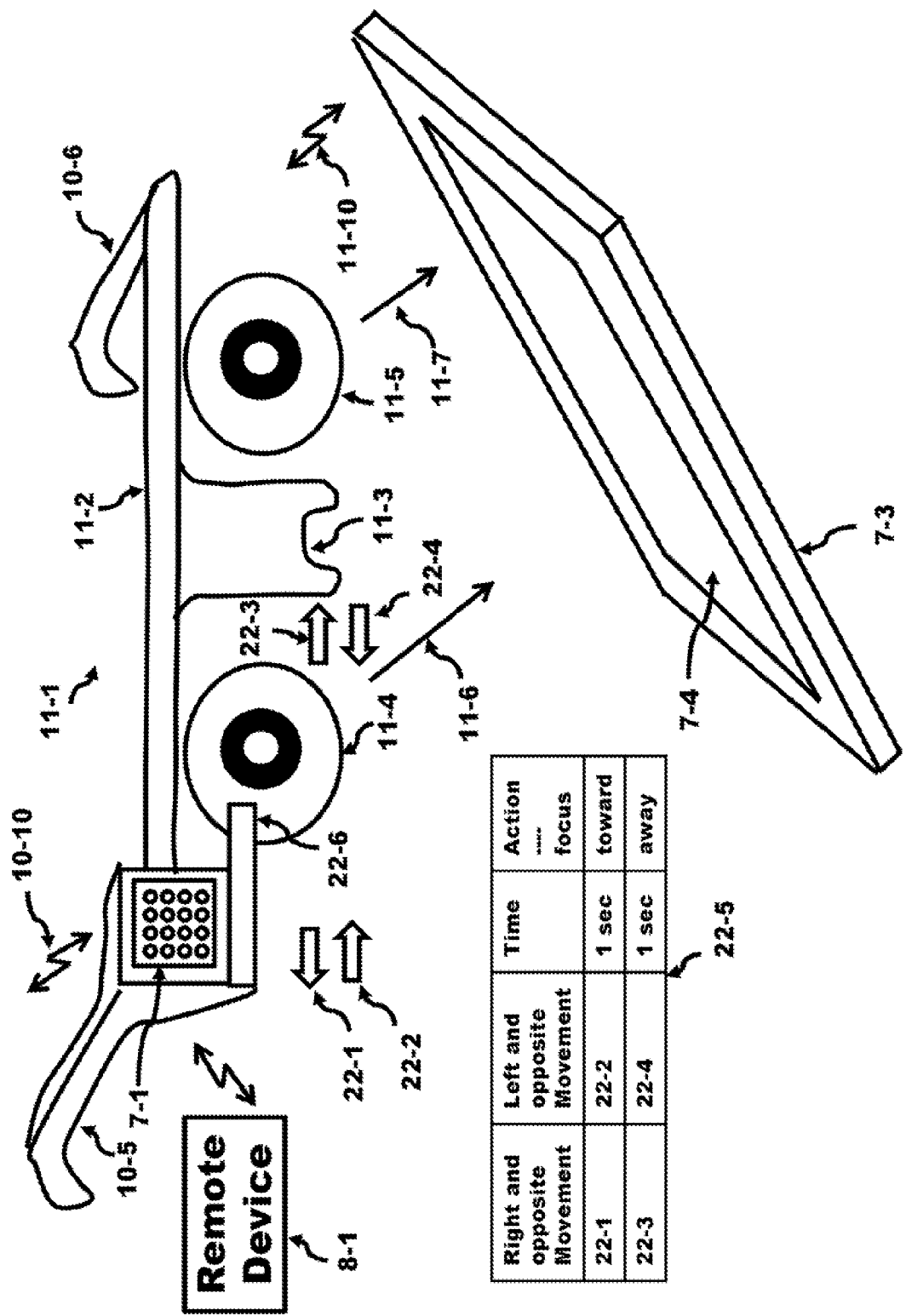
FIG. 22 shows the manual control using an eye movement to adjust the POD in an LFP image in accordance with this inventive technique.

FIG. 22 illustrates a user using the combination of eyeglasses 11-1 and smart phone 7-3 with a display screen 7-4 to view an LFP image. The eyeglasses do not have lens but provide a frame 11-2 to hold the transparent material 21-6 to probe the user's pupil position and a wireless interface 10-10 that couples the eyeglasses of the user to the other apparatus. The display screen 7-4 of the smart phone 7-3 is coupled to the user's eyeglasses by wireless interconnect 11-10. The user's right eye 11-4 views 11-6 the image on the display screen of the wireless unit while the user's left eye 11-5 views 11-7 the image on the display screen 7-4 of the wireless unit 7-3. The glasses contained a frame 11-2 with a nose rest 11-3 and arms 10-5 and 10-6 when open are perpendicular to plane comprising 11-2. An assembly in the arm 10-5 comprises the electronics to operate the glasses, the camera, the remaining portion of the pupil location system, a speaker and earphone (not illustrated), a module for voice recognition, and voice generation. On the frame 11-2 is a plenoptic camera 7-1 and a transparent bar 22-6. The remote device 8-1 can be the Internet, the intranet, the cloud, or any servers that can transfer data to/from the eyeglasses 1-1.

This system uses a voluntary procedure to adjust the focus of the POD for an LFP image of one or more plenoptic cameras. In this case, the Eye Measuring System 1-33 of the accommodation system is not used instead the transparent material 22-6 has a detector which follows the pupil of the eye. This system can be used in place of the Eye Measuring System 1-33. The user focus the POD of an LFP image by shifting their eye quickly from the optical axis starting point in one direction and return quickly in the opposite direction back to the optic axis starting point in under a second. An example is illustrated by the arrows 22-1 and 22-2. When the right 11-4 eye moves to the right 22-2 quickly and returns 22-2, the POD focus move toward the user. When the right 11-4 eye moves to the left 22-3 quickly and returns 22-4, the POD focus move away from the user. The table in 22-5 presents a tabulated form of the control described above. Also possible is for the eye to move in the vertical directions instead of the horizontal directions to adjust the focus of the LFP image.

Finally, it is understood that the above description are only illustrative of the principles of the current invention. It is understood that the various embodiments of the invention, although different, are not mutually exclusive. In accordance with these principles, those skilled in the an may devise numerous modifications without departing from the spirit and scope of the invention. Although the portable aspect of the wireless system has been presented, the same techniques can be incorporated in non-portable systems therein. The camera could be a still image camera taking single pictures or a video camera taking multiple pictures per second proving the illusion of continuous motion when replaced to a user therewith. A camera is comprises a single main lens focused on an image sensor. A camera can be as simple as a pinhole and an image sensor. A plenoptic camera comprises of an array of microlenses is placed at the focal plane of the camera main lens. The image sensor is positioned slightly behind the microlenses. Thus, a plenoptic camera is a camera with an array of microlenses between the main lens and the image sensor. A plenoptic camera can be as simple as an array of microlenses and at least one image sensor. A smart phone is discussed and described in this speciation; however, the smart phone can imply any portable wireless unit such as a tablet, smart phone, eyeglass, notebook, cameras, etc. that are portable and wireless coupled to a communication system. When an image is described as being used in the system, there is no restriction that only images can be used, instead videos can also be presented. Particularly since a video is made up of many images each shown for a fraction of a second. In some cases, the portable wireless unit may not, in fact, be portable, for example, an airport scanner. The processor comprises a CPU (Central Processing Unit), microprocessor, DSP, Network processor, video processor, a front end processor, multi-core processor, or a co-processor. All of the supporting elements to operate these processors (memory, disks, monitors, keyboards, etc.) although not necessarily shown are known by those skilled in the art for the operation of the entire system. In addition, other communication techniques can be used to send the information between all links such as TDMA (Time Division Multiple Access), FDMA (Frequency Division Multiple Access), CDMA (Code Division Multiple Access), OFDM (Orthogonal Frequency Division Multiplexing), UWB (Ultra Wide Band), WiFi, etc.

What is claimed is:

1. A time difference apparatus comprising:
a plurality of Plane of Depths (PODs) in an Light Field Photograph (LFP) image;
a first thickness of a crystalline lens of an eye focused on a first plane at a first POD;
an electromagnetic radiation propagates through the first thickness in a first measured delay time;
wherein
the crystalline lens of the eye varies to a second thickness when attempting to focus on a second unfocused plane selected from the remaining plurality of PODs;
the electromagnetic radiation propagates through the second thickness in a second measured time; and
a time difference in propagation delay between the first measured delay time and the second measured delay time indicates a POD variation.

2. The apparatus of claim 1, further comprising:
a laser to generate the electromagnetic radiation.

3. The apparatus of claim 1, further comprising:
at least one Schottky diode configured to detect the time difference in the propagation delay between the first measured delay time and the second measured delay time.

4. The apparatus of claim 1, wherein
the LFP image presents the focused plane at the first POD and presents as plurality of unfocused planes from the plurality of PODs that remain.

5. The apparatus of claim 1, further comprising:
an algorithm stored in memory applies the time difference to an image processing system configured to focus the LFP image of the second unfocused plane into focus by compensating for the POD variation.

6. The apparatus of claim 1, further comprising:
an eyeglass image generated by an eyeglass presents the focused plane at the first POD and the second unfocused plane at the second POD.

7. The apparatus of claim 6, further comprising:
an algorithm stored in memory applies the POD variation to a mechanical system configured to bring the second unfocused plane at of the eyeglass image into focus.

8. A time difference apparatus comprising:
a plurality of Plane of Depths (PODs) in an Light Field Photograph (LFP) image;
a first plane at a first POD is in focus, wherein a crystalline lens of an eye is characterized by a first thickness;
an electromagnetic radiation propagates through the first thickness in a first delay time, wherein a second unfocused plane selected from the remaining plurality of PODs becomes focused by adjusting the crystalline lens of the eye to a second thickness;
the electromagnetic, radiation propagates through the second thickness in a second delay time; and
a time difference in propagation delay between the first delay time and the second delay time,
wherein the time difference corresponds to a depth variation between the first plane and the unfocused plane.

9. The apparatus of claim 8, further comprising:
a laser to generate the electromagnetic radiation.

10. The apparatus of claim 8, further comprising:
at least one Schottky diode configured to detect the time difference in propagation delay between the first delay time and the second delay time.

11. The apparatus of claim 8, wherein
the LFP image presents the focused plane at the first POD and presents a plurality of unfocused planes from the plurality of PODs that remain.

12. The apparatus of claim 11, farther comprising:
an algorithm stored in memory configured to apply the time difference in the propagation delay to an image processing system configured to focus the LFP image from the focused plane at the first POD to the second unfocused plane of the LFP image selected from the remaining plurality of PODs.

13. The apparatus of claim 8, further comprising:
an eyeglass, a lens of the eyeglass presents an image of the focused plane at the first POD and the second unfocused plane selected from the remaining plurality of PODs.

14. The apparatus of claim 13, further comprising:
an algorithm stored in memory configured to apply the depth variation due to the propagation delay to a mechanical system, the mechanical system configured to bring the image due to the lens of the eyeglass into focus.

15. A time difference apparatus comprising:
a plurality of Plane of Depths (PODs) in an Light Field Photograph (UP) image;
a first plane at a first POD is in focus, wherein a lens configured to present the image is at a first thickness;
a first delay time, wherein the first time delay is for an electromagnetic radiation to propagate through the lens;
a second plane selected from the remaining plurality of PODs, wherein the lens is configured to adjust to a second thickness;
the electromagnetic radiation propagates through the lens in a second delay time; and
a time difference in propagation delay between the first delay time and the second delay time, wherein the time difference corresponds to a lens thickness variation.

16. The apparatus of claim 15, further comprising:
a laser to generate the electromagnetic radiation.

17. The apparatus of claim 15, further comprising:
at least one Schottky diode configured to detect the time difference in the propagation delay between the first delay time and the second delay time.

18. The apparatus of claim 15, further comprising:
the LFP image presents the focused plane at the first POD and presents a plurality of unfocused planes from the plurality of PODs that remain.

19. The apparatus of claim 15, farther comprising:
an algorithm stored in memory configured to apply the time difference to an image processing system, the image processing system configured to focus the LFP image of the second unfocused plane into focus by compensating for the lens thickness variation.

20. The apparatus of claim 15, further comprising:
an eyeglass, the eyeglass presents an image of the focused plane at the first POD and the second unfocused plane at the second POD.

21. The apparatus of claim 20, further comprising:
an algorithm stored in memory configured to apply the lens thickness variation to a mechanical system, the mechanical system configured to bring the second unfocused plane into focus by an adjustment of the lens according to the lens thickness variation.

* * * * *